US012752190B2

(12) United States Patent
Templon

(10) Patent No.: US 12,752,190 B2
(45) Date of Patent: Oct. 6, 2026

(54) SYSTEMS AND METHODS FOR AUTOMATIC MEDIA GENERATION FOR GAME SESSION PREVIEWS

(71) Applicant: GameChanger Media, Inc., New York, NY (US)

(72) Inventor: John Robert Templon, New York, NY (US)

(73) Assignee: GameChanger Media, Inc., New York, NY (US)

( * ) Notice: Subject to any disclaimer, the term of this patent is extended or adjusted under 35 U.S.C. 154(b) by 228 days.

(21) Appl. No.: 18/648,189

(22) Filed: Apr. 26, 2024

(65) Prior Publication Data

US 2024/0367052 A1 Nov. 7, 2024

Related U.S. Application Data

(63) Continuation-in-part of application No. 18/142,880, filed on May 3, 2023, now Pat. No. 12,496,524.

(60) Provisional application No. 63/539,267, filed on Sep. 19, 2023.

(51) Int. Cl.
*A63F 13/60* (2014.01)

(52) U.S. Cl.
CPC .................................... *A63F 13/60* (2014.09)

(58) Field of Classification Search
None
See application file for complete search history.

(56) References Cited

U.S. PATENT DOCUMENTS

| | | | |
|---|---|---|---|
| 8,228,372 | B2 | 7/2012 | Griffin |
| 8,688,434 | B1 | 4/2014 | Birnbaum et al. |
| 8,775,161 | B1 | 7/2014 | Nichols et al. |
| 8,843,363 | B2 | 9/2014 | Birnbaum et al. |
| 8,886,520 | B1 | 11/2014 | Nichols et al. |
| 8,892,417 | B1 | 11/2014 | Nichols et al. |

(Continued)

FOREIGN PATENT DOCUMENTS

| | | |
|---|---|---|
| EP | 3 915 658 | 12/2021 |
| IN | 2010MU00549 | 7/2010 |
| KR | 20170022122 A | 3/2017 |

OTHER PUBLICATIONS

Arev, I., "Automatic Editing of Footage from Multiple Social Cameras," (2015) The Interdisciplinary Center, Herzlia EFI Arazi School of Computer Science, 44 pgs.

(Continued)

*Primary Examiner* — Jason T Yen

(74) *Attorney, Agent, or Firm* — Foley & Lardner LLP

(57) ABSTRACT

In some aspects, the disclosure is directed to systems and methods for automatic media generation for game sessions. A system may include one or more processors that are configured to store one or more identifications of a plurality of game sessions, data corresponding to one or more events of the plurality of game sessions, and a plurality of time-stamps indicating when the plurality of game sessions occurred or are scheduled to occur; detect a future game session of the plurality of game sessions; retrieve data for one or more historical game sessions associated with the first entity or the second entity; determine a set of criteria is satisfied based at least on the retrieved data; select one or more media segments based on the satisfied set of criteria; and generate a media content item for the future game session.

11 Claims, 12 Drawing Sheets

(56) References Cited

U.S. PATENT DOCUMENTS

| | | | |
|---|---|---|---|
| 9,202,526 B2 | 12/2015 | Hohteri et al. | |
| 9,396,168 B2 | 7/2016 | Birnbaum et al. | |
| 9,519,635 B2 | 12/2016 | Allen et al. | |
| 9,535,879 B2 | 1/2017 | Allen | |
| 9,576,009 B1 | 2/2017 | Hammond et al. | |
| 9,602,858 B1 | 3/2017 | Kaiser et al. | |
| 9,697,197 B1 | 7/2017 | Birnbaum et al. | |
| 9,720,899 B1 | 8/2017 | Birnbaum et al. | |
| 9,807,283 B1 | 10/2017 | Kaiser et al. | |
| 10,025,986 B1 | 7/2018 | Grieb et al. | |
| 10,185,477 B1 | 1/2019 | Paley et al. | |
| 10,212,325 B2 | 2/2019 | Lokshin et al. | |
| 10,262,692 B2 | 4/2019 | Tamir et al. | |
| 10,321,208 B2 | 6/2019 | Lokshin et al. | |
| 10,659,672 B2 | 5/2020 | Lokshin et al. | |
| 10,699,079 B1 | 6/2020 | Paley et al. | |
| 10,747,823 B1 | 8/2020 | Birnbaum et al. | |
| 10,762,304 B1 | 9/2020 | Paley et al. | |
| 10,897,659 B2 | 1/2021 | Lokshin et al. | |
| 10,970,554 B2 | 4/2021 | Oz et al. | |
| 10,990,767 B1 | 4/2021 | Smathers et al. | |
| 11,023,688 B1 * | 6/2021 | Holmdahl | G06F 40/30 |
| 11,023,689 B1 | 6/2021 | Sippel et al. | |
| 11,042,713 B1 | 6/2021 | Platt et al. | |
| 11,087,095 B1 | 8/2021 | Long et al. | |
| 11,188,759 B2 | 11/2021 | Elder et al. | |
| 11,310,418 B2 | 4/2022 | Taxbãl et al. | |
| 11,516,557 B2 | 11/2022 | Lokshin et al. | |
| 11,553,126 B2 | 1/2023 | Lokshin et al. | |
| 11,562,146 B2 | 1/2023 | Paley et al. | |
| 11,615,621 B2 | 3/2023 | Stojancic et al. | |
| 11,704,892 B2 | 7/2023 | Velardo | |
| 2008/0076519 A1 | 3/2008 | Chim | |
| 2009/0315978 A1 | 12/2009 | Wãrmlin et al. | |
| 2012/0038776 A1 | 2/2012 | Ahiska et al. | |
| 2013/0337889 A1 | 12/2013 | Gagner et al. | |
| 2014/0376874 A1 | 12/2014 | Aman et al. | |
| 2016/0188172 A1 | 6/2016 | Hohteri et al. | |
| 2016/0241768 A1 | 8/2016 | Lokshin et al. | |
| 2017/0001111 A1 * | 1/2017 | Willette | A63F 13/49 |
| 2017/0118539 A1 | 4/2017 | Lokshin et al. | |
| 2017/0157512 A1 * | 6/2017 | Long | A63F 13/86 |
| 2017/0266568 A1 | 9/2017 | Lucas et al. | |
| 2017/0300477 A1 | 10/2017 | Long et al. | |
| 2018/0132011 A1 | 5/2018 | Shichman et al. | |
| 2018/0361235 A1 * | 12/2018 | Hunter | H04L 67/5681 |
| 2019/0182417 A1 | 6/2019 | Lokshin et al. | |
| 2019/0222776 A1 | 7/2019 | Carter et al. | |
| 2019/0261065 A1 | 8/2019 | Lokshin et al. | |
| 2020/0082276 A1 | 3/2020 | Nichols et al. | |
| 2020/0125879 A1 | 4/2020 | Diehl | |
| 2020/0218901 A1 | 7/2020 | Elder et al. | |
| 2020/0275008 A1 | 8/2020 | Lokshin et al. | |
| 2020/0298113 A1 | 9/2020 | Smithers | |
| 2021/0093969 A1 | 4/2021 | Mccoy et al. | |
| 2021/0097232 A1 | 4/2021 | Long et al. | |
| 2021/0136466 A1 | 5/2021 | Lokshin et al. | |
| 2021/0287118 A1 | 9/2021 | Pierce et al. | |
| 2022/0027631 A1 | 1/2022 | Stojancic et al. | |
| 2022/0171957 A1 | 6/2022 | Sahai et al. | |
| 2022/0319103 A1 | 10/2022 | Lucas | |
| 2023/0053724 A1 | 2/2023 | Birnbaum et al. | |
| 2023/0077815 A1 | 3/2023 | Lokshin et al. | |
| 2023/0092774 A1 | 3/2023 | Velardo | |
| 2023/0099034 A1 | 3/2023 | Le | |
| 2023/0109572 A1 | 4/2023 | Nichols et al. | |
| 2023/0142035 A1 | 5/2023 | Lokshin et al. | |
| 2023/0252653 A1 | 8/2023 | Stuurman et al. | |
| 2023/0290144 A1 | 9/2023 | Oz et al. | |
| 2024/0017179 A1 * | 1/2024 | Dorn | A63F 13/795 |

OTHER PUBLICATIONS

International Search Report and Written Opinion for International Application No. PCT/US2024/048665, dated Jan. 8, 2025, 20 pgs.

Le et al., "Deep Reinforcement Learning in Computer Vision: A Comprehensive Survey," arxiv.org, Cornell University Library, 201 Olin Library, Cornell University, Ithaca, NY 14853, Aug. 25, 2021, 103 pgs.

Li et al., "Automatic Detection and Analysis of Player Action in Moving Background Sports Video Sequences," (2010) IEEE Transactions on Circuits and Systems for Video Technology, vol. 20, No. 3, Mar. 2010, 14 pgs.

Non-Final Office Action on U.S. Appl. No. 18/142,880 DTD May 2, 2025.

Guo et al., "Conditional Text Generation for Harmonious Human-Machine Interaction," (2021) ACM Transactions on Intelligent Systems and Technology, vol. 12, No. 2, Article 14 (Feb. 2021), 50 pages.

Partial International Search Report in International Application No. PCT/US2024/047256, dated Dec. 10, 2024.

PCT International Search Report and Written Opinion in International Application No. PCT/US2024/047256 dated Feb. 3, 2025.

* cited by examiner

600

Aidan Risse Leads La Jolla Country Day Torreys Varsity Past Mira Mesa. Aidan Risse collected three hits in three at bats, as La Jolla Country Day Torreys Varsity defeated Mira Mesa 16-0 on Wednesday. An early lead helped propel La Jolla Country Day Torreys Varsity to victory. La Jolla Country Day Torreys Varsity scored two runs on a single in the first inning. A single by Vincenzo Lucia, an error, a wild pitch, and a wild pitch helped La Jolla Country Day Torreys Varsity extend their early lead in the second. A fielder's choice by Vincenzo Lucia, and a single by Johnny Luetzow helped La Jolla Country Day Torreys Varsity extend their early lead in the third. La Jolla Country Day Torreys Varsity added three more runs in the bottom of the fourth inning on three hits. Joseph Cetale doubled, scoring one run, and Aidan Risse homered, scoring two runs. Ben Pajak and Alvaro Partida each appeared in relief for La Jolla Country Day Torreys Varsity. Joseph Cetale and Aidan Risse each collected three hits for La Jolla Country Day Torreys Varsity. Johnny Luetzow and Zach Schwartzberg each drove in three runs for La Jolla Country Day Torreys Varsity. Jake Bold, Chris Esquivel, Vincenzo Lucia, Johnny Luetzow, and Zach Schwartzberg each stole multiple bases for La Jolla Country Day Torreys Varsity. La Jolla Country Day Torreys Varsity didn't commit a single error in the field. Joseph Cetale had the most chances in the field with 10. Tyler King led Mira Mesa with one hit in three at bats.

FIG. 6

FIG. 10
1002
Pears Takes Timely Hitting Into Game Against Oranges 16U
1004
Pears has been able to drive runners home from the base paths this season, hitting 0.360 with runners in scoring position. Pears will look to use that to their advantage when they go up against Oranges 16U on Wednesday.
1006
Last Time Out:
1014
Pears topped Oranges 16U in a tight pitcher's duel, 3-2. Oranges 16U defeated Pears in a 5-4 walkoff thanks to a home run by Valencia with two outs in the fifth inning.
1008
Player Highlight:
1016
Starkrimson hits and pitches for Pears. When they're in the field their primary position is right field. Starkrimson drove in one run last game as they went 1-1 at the plate. Starkrimson has hit for power this season with one home run and one triple among their two hits. Starkrimson gets ahead in the count fast on the bump. Starkrimson has thrown first pitch strikes to 14 of the 16 batters they've faced this season.
1010
About Pears:
1018
Pears has a 6-13-1 record this season. Green Anjou's 1.845 OPS leads Pears. The outfielder has a 0.545 OBP and a 1.300 slugging percentage this season. Anjou leads Pears with 12 and two-thirds innings pitched. The starting pitcher has a 9.39 ERA this season. Bartlett leads Pears with 14 total fielding chances this season. Their primary position is first base.
1012
About Oranges 16U:
1020
Oranges 16U has an 11-7-1 record this season. L Mandarin's 2.134 OPS leads Oranges 16U. The second baseman has a 0.708 OBP and a 1.429 slugging percentage this season. A Navel leads Oranges 16U with 14 innings pitched. The starting pitcher has a 12.00 ERA this season. Seville leads Oranges 16U with 19 total fielding chances this season. Their primary position is catcher.

SYSTEMS AND METHODS FOR AUTOMATIC MEDIA GENERATION FOR GAME SESSION PREVIEWS

CROSS-REFERENCE TO RELATED APPLICATIONS

This application claims the benefit of priority as a continuation-in-part to U.S. patent application Ser. No. 18/142,880, filed May 3, 2023, the entirety of which is incorporated by reference herein. This application also claims the benefit of priority to U.S. Provisional Application No. 63/539,267, filed Sep. 19, 2023, the entirety of which is incorporated by reference herein.

BACKGROUND OF THE DISCLOSURE

Media generation systems, such as Natural Language Processing (NLP) systems, have become increasingly important in recent years as more businesses and individuals rely on digital communication and automation. Media generation systems can use computer algorithms to analyze, interpret, and generate human language, enabling computers to interact with humans in a more natural and intuitive way.

One challenge that media generation systems face is generating situation or context-specific content. For example, an NLP system may be configured or trained to generate text summaries or descriptions of different situations based on data regarding the situations. The NLP system may generate the same text summaries or descriptions regardless of any background information that is unique to each situation. Without taking such background information into account, the NLP may generate summaries or descriptions that are incorrect or inappropriate for the individual situations.

SUMMARY OF THE DISCLOSURE

In one aspect, the present disclosure describes one or more non-transitory computer-readable media for automatic text generation for game sessions, the non-transitory computer readable media including instructions which, when executed by one or more processors, cause the one or more processors to store an identification of a game session and data corresponding to one or more events of the game session, the game session corresponding to one or more characteristics of individuals participating in the game session; determine, based on the one or more characteristics of the individuals participating in the game session, a set of criteria for selecting a set of media segments, wherein different criteria of the set of criteria correspond to different media segments; determine which of the set of criteria is satisfied based on the stored data corresponding to the one or more events of the game session; select one or more media segments based on the satisfied criteria; and responsive to determining an occurrence of a predetermined event, generate a media content item for at least a portion of the game session based on the selected one or more media segments.

In another aspect, the present disclosure describes a system for automatic media generation for game sessions. The system can include one or more processors coupled to one or more computer-readable storage media, the one or more processors can be configured to execute instructions stored on the one or more computer-readable storage media to store an identification of a game session and data corresponding to one or more events of a game session, the game session corresponding to a type of game and at least one of an age, an age range, or an experience level of individuals participating in the game session; determine a threshold based on the type of game and the at least one of the age, the age range, or the experience level of individuals participating in the game session, the threshold corresponding to a media segment; determine the threshold is satisfied based on the stored data for the game session; and responsive to determining that the game session has ended, generate a media content item for the game session based at least on the media segment.

In another aspect, the present disclosure describes a method for automatic media generation for game sessions. The method can include storing, by one or more processing circuits, an identification of a game session and data corresponding to one or more events of the game session, the game session corresponding to one or more characteristics of individuals participating in the game session; determining, by the one or more processing circuits and based on the one or more characteristics of the individuals participating in the game session, a set of criteria for selecting a set of media segments, wherein different criteria of the set of criteria correspond to different media segments; determining, by the one or more processing circuits, which of the set of criteria is satisfied based on the stored data corresponding to the one or more events of the game session; and responsive to determining an occurrence of a predetermined event, generating, by one or more processing circuits, a media content item for at least a portion of the game session based on the one or more media segments.

In another aspect, the present disclosure describes one or more non-transitory computer-readable media for automatic text generation for game sessions, the non-transitory computer readable media including instructions which, when executed by one or more processors, cause the one or more processors to store an identification of a game session and data corresponding to one or more events of the game session, the game session corresponding to one or more characteristics of individuals participating in the game session; determine, based on the one or more characteristics of the individuals participating in the game session, a set of criteria for generating a set of media segments, wherein different criteria of the set of criteria correspond to different media segments; determine which of the set of criteria is satisfied based on the stored data corresponding to the one or more events of the game session; populate, with values from the stored data corresponding to the one or more events of the game session, portions of one or more media segments that correspond with the satisfied criteria; and responsive to determining an occurrence of a predetermined event, generate a media content item for at least a portion of the game session based on the one or more media segments populated with the values from the data corresponding to the one or more events of the game session.

In some embodiments, execution of the instructions causes the one or more processors to determine the set of criteria by determining a threshold for a category based on the one or more characteristics; and wherein execution of the instructions causes the one or more processors to determine a criterion of the set of criteria is satisfied responsive to determining a value of the category in the data corresponding to the one or more events exceeds the threshold. In some embodiments, execution of the instructions causes the one or more processors to determine the threshold for the category by retrieving one or more values for the category from stored data corresponding to one or more events of one or more game sessions completed prior to the game session and corresponding to the one or more characteristics of individuals participating in the game session; and calculating the threshold for the category based on the retrieved one or more values.

In some embodiments, execution of the instructions causes the one or more processors to calculate the threshold for the category by generating a distribution of the retrieved values for the category of the stored data corresponding to the one or more events of the one or more game sessions; and determining a threshold value at a defined percentile of the distribution to be the threshold. In some embodiments, the one or more characteristics include an age or an age range.

In some embodiments, the one or more media segments that correspond with the satisfied criteria correspond to a priority value; and wherein execution of the instructions causes the one or more processors to generate the media content item by selecting a subset of the one or more media segments based on the priority values of the one or more media segments; and generating the media content item from only the subset of the one or more media segments. In some embodiments, the one or more media segments each correspond to one of a plurality of categories, the plurality of categories including a game session summary category, a sequence category, and a team summary category.

In some embodiments, execution of the instructions causes the one or more processors to store a first rule indicating only a defined number of media segments that correspond with the game session summary category can be used in a media content item; and store a second rule indicating any number of media segments that correspond with the sequence category or the team summary category can be used in a media content item. In some embodiments, the media segments that correspond with the team summary category correspond with thresholds determined based on characteristics of participants of game sessions. In some embodiments, execution of the instructions causes the one or more processors to receive an indication of a beginning of the game session; generate the identification for the game session in response to receiving the indication of the beginning of the game session; transmit the identification for the game session to a computing device; and receive, from the computing device, a message including the identification for the game session and an indication of an ending of the game session; and determining the occurrence of the predetermined event responsive to the indication of the ending of the game session.

In some embodiments, execution of the instructions causes the one or more processors to receive the data corresponding to the one or more events of the game session in a plurality of messages between a first time at the beginning of the game session and a second time at the ending of the game session, each of the plurality of messages including the identification for the game session; and store an association between the identification for the game session and the data corresponding to the one or more events of the game session responsive to identifying the identification for the game session in each of the plurality of messages. In some embodiments, each media segment is a text string, an audio segment, or a video segment.

In some embodiments, execution of the instructions causes the one or more processors to generate the media content item for the game session by selecting a template from a plurality of templates, each template corresponding to a different order in which to insert media segments into a media content item; and generating the media content item according to the selected template using the one or more media segments populated with the values from the data corresponding to the one or more events of the game session.

In some embodiments, execution of the instructions causes the one or more processors to generate the media content item for the game session by concatenating the one or more media segments together. In some embodiments, execution of the instructions causes the one or more processors to transmit the media content item to a computing device. In some embodiments, execution of the instructions causes the one or more processors to generate the media content item for the game session in response receiving an identification of the predetermined event for the game session.

In another aspect, the present disclosure describes a method for automatic text generation for game sessions. The method may include storing, by one or more processing circuits, an identification of a game session and data corresponding to one or more events of the game session, the game session corresponding to one or more characteristics of individuals participating in the game session; determining, by the one or more processing circuits and based on the one or more characteristics of the individuals participating in the game session, a set of criteria for generating a set of media segments, wherein different criteria of the set of criteria correspond to different media segments; determining, by the one or more processing circuits, which of the set of criteria is satisfied based on the stored data corresponding to the one or more events of the game session; populating, by the one or more processing circuits with values from the stored data corresponding to the one or more events of the game session, portions of one or more media segments that correspond with the satisfied criteria; and responsive to determining an occurrence of a predetermined event, generating, by one or more processing circuits, a media content item for at least a portion of the game session based on the one or more media segments populated with the values from the data corresponding to the one or more events of the game session.

In some embodiments, determining the set of criteria includes determining, by the one or more processing circuits, a threshold for a category based on the one or more characteristics; and wherein determining a criterion of the set of criteria is satisfied includes determining, by the one or more processing circuits, the criterion is satisfied responsive to determining a value of the category in the data corresponding to the one or more events of the game session exceeds the threshold. In some embodiments, determining the threshold for the category includes retrieving, by the one or more processing circuits, one or more values for the category from stored data corresponding to one or more events of one or more game sessions completed prior to the game session and corresponding to the one or more characteristics of individuals participating in the game session; and calculating, by the one or more processing circuits, the threshold for the category based on the retrieved one or more values.

In another aspect, the present disclosure describes a system for automatic text generation for game sessions. The system may include one or more processors coupled to one or more computer-readable storage media, the one or more processors configured to execute instructions stored on the one or more computer-readable storage media to store an identification of a game session and data corresponding to one or more events of a game session, the game session corresponding to a type of game and at least one of an age, an age range, or an experience level of individuals participating in the game session; determine a threshold based on the type of game and the at least one of the age, the age range, or the experience level of individuals participating in the game session, the threshold corresponding to a media segment; determine the threshold is satisfied based on the stored data for the game session; populate, with one or more values from the stored data for the game session, portions of the media segment responsive to determining the threshold is satisfied; and responsive to determining that the game session has ended, generate a media content item for the game session based at least on the media segment.

In some embodiments, the experience level includes one or more of a participation level of a plurality of participation levels of an organization, an amount of time an individual has participated in game sessions of the type of game, a skill rating, a skill rating range, a number of game sessions an individual has participated in game sessions of the type of game, a type of an organization, or an identifier of an organization.

In an aspect, one or more non-transitory computer-readable media for automatic media generation for game sessions, the non-transitory computer readable media comprising instructions which, when executed by one or more processors, cause the one or more processors to store one or more identifications of a plurality of game sessions, event data corresponding to one or more events of the plurality of game sessions, and a plurality of timestamps indicating when the plurality of game sessions occurred; retrieve event data of one or more game sessions responsive to the one or more game sessions corresponding to one or more timestamps within a defined time period; determine a set of criteria is satisfied based on the retrieved event data of the one or more game sessions corresponding to one or more timestamps within the defined time period, wherein different criteria of the set of criteria correspond to different media segments; select one or more media segments based on the satisfied set of criteria; and generate a media content item for the one or more game sessions of the defined time period based on the selected one or more media segments.

In some embodiments, execution of the instructions causes the one or more processors to retrieve the event data of the one or more game sessions by querying memory based on an organization identifier; and retrieving the one or more game sessions further responsive to the one or more game sessions corresponding to the organization identifier. In some embodiments, execution of the instructions causes the one or more processors to retrieve the event data of the one or more game sessions by querying memory based on a competition identifier; and retrieving the one or more game sessions further responsive to the one or more game sessions corresponding to the competition identifier. In some embodiments, the plurality of timestamps correspond to one or more beginnings of the one or more game sessions. In some embodiments, the one or more media segments comprise one or more text segments.

In some embodiments, execution of the instructions further causes the one or more processors to aggregate event data from the one or more game sessions; and determine the event data of the one or more game sessions satisfies the set of criteria based on the aggregated event data satisfying the set of criteria. In some embodiments, execution of the instructions further causes the one or more processors to generate a media content item for the one or more game sessions of the defined time period by generating a game session media segment for a game session of the one or more game sessions; and include the game session media segment in the media content item for the one or more game sessions.

In an aspect, one or more non-transitory computer-readable media for automatic media generation for game sessions, the non-transitory computer readable media comprising instructions which, when executed by one or more processors, causes the one or more processors to store one or more identifications of a plurality of game sessions, data corresponding to one or more events of the plurality of game sessions, and a plurality of timestamps indicating when the plurality of game sessions occurred or are scheduled to occur; determine a future game session of the plurality of game sessions scheduled to occur at time subsequent to a current time, the future game session between a first entity and a second entity; retrieve data for one or more historical game sessions associated with the first entity or the second entity; determine one or more criteria of a set of criteria are satisfied based at least on the retrieved data for the one or more game sessions associated with the first entity or the second entity, wherein different criteria of the set of criteria correspond to different media segments, and wherein the set of criteria comprises a plurality of subsets of criteria each corresponding to a different section of a media content item template; select and/or generate one or more media segments based on the satisfied one or more criteria; and generate a media content item for the future game session with the selected and/or generated one or more media segments according to the media content item template by inserting each of the selected one or more media segments in a section of the media content item corresponding to the subset of criteria containing the satisfied criterion for the selected media segment.

In some embodiments, execution of the instructions further causes the one or more processors to query memory based on an identifier of the first entity; retrieve a media content item previously generated for a game session involving the first entity based on the query; and identify a participant that was identified in the previously generated media content item, wherein the instructions cause the one or more processors to select the one or more media segments by selecting the one or more media segments based at least on the identification of the participant that was identified in the previously generated media content item.

In some embodiments, execution of the instructions causes the one or more processors to select the one or more media segments by selecting the one or more media segments based at least on the one or more media segments not identifying the identified participant. In some embodiments, execution of the instructions further causes the one or more processors to query memory based on an identifier of the first entity; and retrieve data of a set of game sessions involving the first entity based on the query, wherein the instructions cause the one or more processors to determine the set of criteria is satisfied by determining the set of criteria is satisfied based further on the retrieved entity data of the set of game sessions involving the first entity.

In some embodiments, execution of the instructions causes the one or more processors to determine the set of criteria is satisfied by aggregating data generated for a second plurality of game sessions of the set of game sessions; and determining one or more criteria of the set of criteria is satisfied based at least on the aggregated data. In some embodiments, execution of the instructions causes the one or more processors to generate the media content item for the future game session by generating text comprising one or more text segments corresponding to the set of satisfied criteria.

In some embodiments, execution of the instructions further causes the one or more processors to query memory based on an identifier of the first entity; retrieve data of a set of game sessions involving the first entity based on the query; and aggregate data generated for a second plurality of game sessions of the set of game sessions, wherein execution of the instructions causes the one or more processors to generate the text by generating a first set of text segments of the one or more text segments based only on the retrieved data for a previous game session between the first entity and the second entity; generating a second set of text segments of the one or more text segments based only on the aggregated data generated for a second plurality of game sessions associated with the first entity; and inserting the first set of text segments in a first section of the media content item and the second set of text segments in a second section of the media content item.

In some embodiments, execution of the instructions causes the one or more processors to generate the text by separating the first set of text segments from the second set of text segments with a text header corresponding to the second set of text segments. In some embodiments, execution of the instructions causes the one or more processors to generate the text by generating a title separate from the first set of text segments and the second set of text segments identifying the first entity and based on the aggregated data.

In some embodiments, execution of the instructions further causes the one or more processors to select the one or more media segments based on each of the one or more media segments corresponding to a satisfied criterion of the set of satisfied criteria with a stored association in memory. In some embodiments, execution of the instructions causes the one or more processors to identify, the set of criteria for selecting a set of media segments based on one or more characteristics of individuals participating in the future game session.

In an aspect, a method for automatic media generation for game sessions includes storing, by one or more processors, one or more identifications of a plurality of game sessions, data corresponding to one or more events of the plurality of game sessions, and a plurality of timestamps indicating when the plurality of game sessions occurred or are scheduled to occur; determining, by the one or more processors, a future game session of the plurality of game sessions scheduled to occur at time subsequent to a current time, the future game session between a first entity and a second entity; retrieving, by the one or more processors, data for one or more historical game sessions associated with the first entity or the second entity; determining, by the one or more processors, one or more criteria of a set of criteria are satisfied based at least on the retrieved data for the one or more game sessions associated with the first entity or the second entity, wherein different criteria of the set of criteria correspond to different media segments, and wherein the set of criteria comprises a plurality of subsets of criteria each corresponding to a different section of a media content item; selecting and/or generating, by the one or more processors, one or more media segments based on the satisfied one or more criteria; and generating, by the one or more processors, a media content item for the future game session with the selected and/or generated one or more media segments by inserting each of the selected one or more media segments in a section of the media content item corresponding to the subset of criteria containing the satisfied criterion for the selected media segment.

In some embodiments, execution of the instructions further causes the one or more processors to querying, by the one or more processors, memory based on an identifier of the first entity; retrieving, by the one or more processors, a media content item previously generated for a game session involving the first entity based on the query; and identifying, by the one or more processors, a participant that was identified in the previously generated media content item, wherein selecting the one or more media segments comprises selecting, by the one or more processors, the one or more media segments based at least on the identification of the participant that was identified in the previously generated media content item.

In some embodiments, selecting the one or more media segments comprises selecting, by the one or more processors, the one or more media segments based at least on the one or more media segments not identifying the identified participant. In some embodiments, the method further includes querying, by the one or more processors, memory based on an identifier of the first entity; and retrieving, by the one or more processors, data of a set of game sessions involving the first entity based on the query, wherein determining the set of criteria is satisfied comprises determining, by the one or more processors, the set of criteria is satisfied based further on the retrieved entity data of the set of game sessions involving the first entity.

In some embodiments, determining the set of criteria is satisfied comprises aggregating, by the one or more processors, data generated for a second plurality of game sessions of the set of game sessions; and determining, by the one or more processors, one or more criteria of the set of criteria is satisfied based at least on the aggregated data. In some embodiments, generating the media content item for the future game session comprises generating, by the one or more processors, text comprising one or more text segments corresponding to the set of satisfied criteria.

In some embodiments, the method further comprises querying, by the one or more processors, memory based on an identifier of the first entity; retrieving, by the one or more processors, data of a set of game sessions involving the first entity based on the query; and aggregating, by the one or more processors, data generated for a second plurality of game sessions of the set of game sessions, and wherein generating the text comprises generating by the one or more processors, a first set of text segments of the one or more text segments based only on the retrieved data for the previous game session between the first entity and the second entity; generating, by the one or more processors, a second set of text segments of the one or more text segments based only on the aggregated data generated for a second plurality of game sessions; and inserting, by the one or more processors, the first set of text segments in a first section of the media content item and the second set of text segments in a second section of the media content item.

In an aspect, a system for automatic media generation for game sessions includes one or more processors coupled to one or more computer-readable storage media, the one or more processors configured to execute instructions stored on the one or more computer-readable storage media to store one or more identifications of a plurality of game sessions, data corresponding to one or more events of the plurality of game sessions, and a plurality of timestamps indicating when the plurality of game sessions occurred or are scheduled to occur; store one or more identifications of a plurality of game sessions, data corresponding to one or more events of the plurality of game sessions, and a plurality of timestamps indicating when the plurality of game sessions occurred or are scheduled to occur; determine a future game session of the plurality of game sessions scheduled to occur at time subsequent to the current time, the future game session between a first entity and a second entity; retrieve data for one or more historical game sessions associated with the first entity or the second entity; determine, based on one or more characteristics of the first entity or the second entity, a set of criteria for selecting a set of media segments, wherein different criteria of the set of criteria correspond to different media segments, and wherein the set of criteria comprises a plurality of subsets of criteria each corresponding to a different section of a media content item template; determine one or more criteria of the set of criteria are satisfied based at least on the retrieved data for the one or more game sessions associated with the first entity or the second entity; select and/or generate one or more media segments based on the satisfied one or more criteria; and generate a media content item for the future game session with the selected and/or generated one or more media segments by inserting each of the selected one or more media segments in a section of the media content item corresponding to the subset of criteria containing the satisfied criterion for the selected media segment.

In some embodiments, the one or more processors are further configured to query memory based on an identifier of the first entity; retrieve a media content item previously generated for a game session involving the first entity based on the query; and identify a participant that was identified in the previously generated media content item, wherein the instructions cause the one or more processors to select the one or more media segments by selecting the one or more media segments based at least on the identification of the participant that was identified in the previously generated media content item.

BRIEF DESCRIPTION OF THE DRAWINGS

Various objects, aspects, features, and advantages of the disclosure will become more apparent and better understood by referring to the detailed description taken in conjunction with the accompanying drawings, in which like reference characters identify corresponding elements throughout. In the drawings, like reference numbers generally indicate identical, functionally similar, and/or structurally similar elements.

FIG. 6 depicts an example text summary generated by a system for automatic media generation, according to some implementations;

Figure 1:
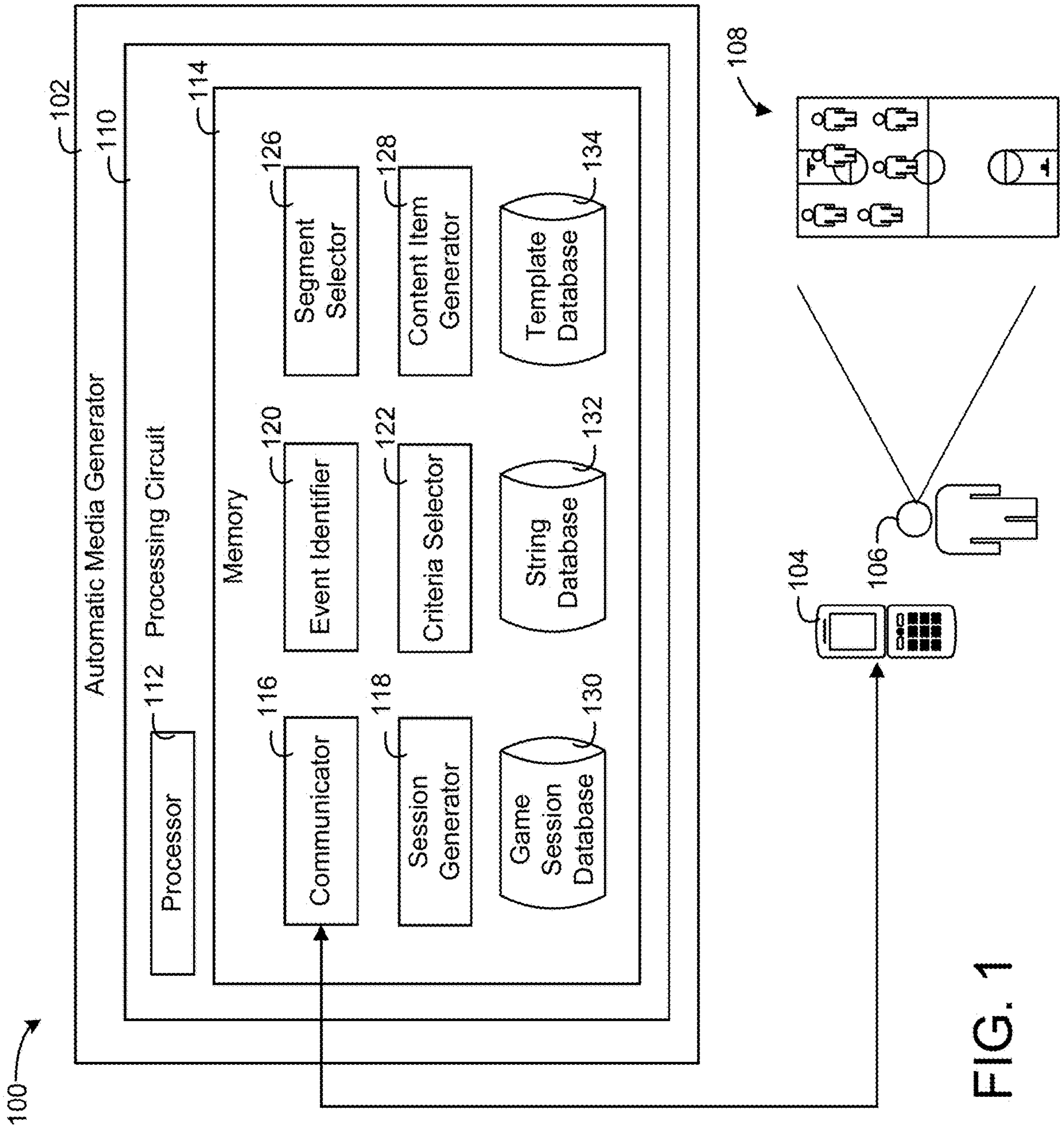
FIG. 1 is a block diagram of a system for automatic media generation for game sessions, according to some implementations.

The details of various embodiments of the methods and systems are set forth in the accompanying drawings and the description below.

DETAILED DESCRIPTION

For purposes of reading the description of the various embodiments below, the following descriptions of the sections of the specification and their respective contents may be helpful:

Section A describes embodiments of systems and methods for automatic media generation for game sessions; and Section B describes a computing environment which can be used for practicing embodiments described herein.

A. Systems and Methods for Automatic Media Generation for Game Sessions

Media generation systems may be configured to generate media content items (e.g., text summaries (e.g., descriptions), audio summaries or audio files, video summaries or video files, etc.) of game sessions. Game sessions may be, for example, sessions of activities in which participants compete, play, or participate to accomplish a goal, either individually or in teams. Examples of such activities can include sports (e.g., soccer, basketball, tennis, hockey, football, golf, etc.), electronic sports (E-sports) (e.g., competitive video games), games (e.g., chess, checkers, board games, etc.), or other activities. In one example, an NLP system may generate descriptions of events that occur during a game session by processing statistics or values regarding the game session and generating a text output. The NLP system may collect data regarding how individuals and/or teams performed during the game session and/or the end result of the game session. The NLP system may implement machine learning or other techniques using the statistics or values to output strings of sentences to generate a summary of what occurred during the game session.

Different media content items may be appropriate for game sessions with participants that have different characteristics. For example, basketball teams with younger players may not score as many points as basketball teams with older players because the teams with younger players may play shorter games or may have more difficulty shooting a basketball through a hoop. In another example, soccer teams that are more experienced may score fewer goals because the teams are playing other teams with higher experience that make scoring goals more difficult. In another example, the participants of an amateur organization may score fewer points in football than participants of a professional organization. Because of the differences in characteristics between participants of game sessions, different descriptions of the game sessions may be appropriate (e.g., a score for a game session played by younger players may be described as a high scoring game while the same score for a game session played by older players may be considered a low scoring game session). However, conventional NLP or other media generation systems may not be able to differentiate between such game sessions and generate identical or similar summaries or media content items regardless of the characteristics of the participants.

A computer implementing the systems and methods described herein may overcome these technical deficiencies. For example, the computer may execute an application programming interface (API) to communicate with a client device. The client device may transmit an indication to the computer indicating the start of a game session, in some cases with one or more characteristics (e.g., age, age range, gender, or experience level) of the participants of the game session. The client device may generate and/or transmit values or statistics for different types of statistics or events that occur during the game session. For instance, for a basketball game session, the client device may transmit indications of points, rebounds, and assists by different individuals participating in the basketball game session to the computer. The computer may identify the characteristics associated with or corresponding to the individuals participating in the game session. The computer may determine or identify criteria (e.g., one or more rules and/or thresholds) that correspond to the characteristics of the individuals. The computer can determine which of the identified criteria is satisfied based on the statistics and/or values that the client device transmitted to the computer over the course of the game session. The computer can identify media segments (e.g., strings of sentences, strings of audio, video clips, etc.) that correspond with the satisfied criteria. The computer can generate a media content item for the game session using the identified media segments and the values or statistics that the client device transmitted to the computer.

The computer can generate a media content item for a game session responsive to determining an occurrence of a predetermined event. A predetermined event can be, for example, a defined time of a game session (e.g., an end of a quarter, half, or game), a defined value or sequence of values (e.g., an individual making three three-pointers in a row in basketball, a double play in baseball, a free kick goal in soccer, etc.), an input or request for a media content item from a client device or computing device, etc. When generating a media content item in response to determining the occurrence of the predetermined event, the computer can generate the media content items using the values or statistics that the computer has received for the game session since the start of the game session (e.g., all of the data the computer has stored with an association with an identification for the game session). The computer can generate the media content item based on the characteristics of the individuals participating in the game session. In this way, the computer can generate custom media content items for game sessions that are relevant to the participants.

Referring now to FIG. 1, a block diagram of a system 100 for automatic media generation for game sessions is shown, according to some implementations. The system 100 may include an automatic media generator 102 and a client device 104, in some embodiments. The client device 104 may communicate with the automatic media generator 102 over a network. The client device 104 may transmit indications of the beginning of game sessions, characteristics of the participants, and/or values or statistics for events of the game sessions (e.g., inputs from a client device that include data for something that occurred in a game session or the occurrences themselves) to the automatic media generator 102. The automatic media generator 102 can generate records (e.g., data structures dedicated to the individual game sessions, such as a file, document, table, listing, message, notification, etc.) and store the data corresponding to the events that the automatic media generator 102 receives for the game sessions in the records. The automatic media generator 102 can also store characteristics of the individuals participating in the game session in the records for the respective game sessions. The automatic media generator 102 can generate media content item or content items (e.g., game summaries or descriptions, video clips, audio clips, etc.) that are customized for the individual game sessions based on the characteristics of the participants. The automatic media generator 102 can do so using the data for the respective game sessions. The automatic media generator 102 can transmit the media content items to client devices (e.g., the client device 104) for display or execution (e.g., execute a video file or file to play the video or audio). The automatic media generator 102 can transmit media content items to the same client devices that transmit the data to generate the media content items or to different client devices.

The client device 104 may be or include any type and/or form of media device or computing device, including a desktop computer, laptop computer, portable computer, tablet computer, wearable computer, embedded computer, smart television, set top box, console, Internet of Things (IoT) device or smart appliance, or any other type and form of computing device. Computing device(s) may be referred to variously as a client, device, client device, computing device, anonymized computing device or any other such term. In some cases, the client device 104 can be recording hardware that is not a personal mobile device. Computing devices and intermediary modulators may receive media streams via any appropriate network, including local area networks (LANs), wide area networks (WANs) such as the Internet, satellite networks, cable networks, broadband networks, fiber optic networks, microwave networks, cellular networks, wireless networks, or any combination of these or other such networks. In many implementations, the networks may include a plurality of subnetworks which may be of the same or different types, and may include a plurality of additional devices (not illustrated), including gateways, modems, firewalls, routers, switches, etc.

The client device 104 be accessed by a user 106. The user 106 may be a person watching a game session 108. The game session 108 may be, for example, a game for a sport, such as basketball, soccer, football, etc., or any other type of game session. At the beginning of the game session 108, the user 106 may input (e.g., via a user interface) an indication of the beginning of the game session 108 to the client device 104. In some embodiments, in addition to the input indication, the user 106 can input values or identifications of characteristics (e.g., age, age range, gender, experience level, etc.) of the individuals (e.g., players) participating in the game session 108, and/or the type of game (e.g., basketball, soccer, tennis, football, chess, backgammon, or any other activity or game session) of the game session 108. The client device 104 can receive the input and transmit the input to the automatic media generator 102.

The automatic media generator 102 may include a processing circuit 110, a processor 112, and a memory 114. The processing circuit 110, the processor 112, and/or the memory 114 can correspond to or be the same as components described with reference to FIGS. 7A and 7B. In some embodiments, the automatic media generator 102 can operate in the cloud as one or more cloud servers. The automatic media generator 102 can communicate with the client device 104 and other client devices or computing devices over a network (e.g., a synchronous or asynchronous network).

The memory 114 may include a communicator 116, a session generator 118, an event identifier 120, a criteria selector 122, a segment selector 126, a content item generator 128, a game session database 130, a string database 132, and/or a template database 134. Memory 114 may include any number of components. Each of these components may operate to generate customized media content items for game sessions.

The communicator 116 can include instructions performed by one or more servers or processors (e.g., the processing circuit 110), in some embodiments. The communicator 116 may be or include an application programming interface (API) that facilitates communication between the automatic media generator 102 and other computing devices.

The communicator 116 can establish connections with computing devices (e.g., the client device 104). The communicator 116 can establish connections with the computing devices over a network. To do so, the communicator 116 can communicate with the computers across the network. In one example, the communicator 116 can transmit syn packets to the computers (or the computers can transmit syn packets to the communicator 116) and establish the connections using a TLS handshaking protocol. The communicator 116 can use any handshaking protocol to establish connections with the computers.

The client device 104 can transmit messages (e.g., indications of the beginning of the game session 108) to the automatic media generator 102 over the communication session the client device 104 established through the communicator 116. For example, the client device 104 can initiate the communication session with the communicator 116 when the client device 104 activates (e.g., responsive to a user input at the client device 104) an application executed by the client device 104. Upon execution, the client device 104 can transmit a message to the automatic media generator 102 to begin or establish a communication session. After establishing the communication session, the client device 104 can transmit messages to the automatic media generator 102, such as messages that indicate a beginning of the game session 108. At the beginning of the game session 108, the user 106 may input (e.g., via a user interface) an indication of the beginning of the game session 108 and/or characteristics (e.g., age, gender, age range, etc.) for the game session to the client device 104. Characteristics of individuals can be or include an experience level of the individuals. Experience levels can include one or more of (e.g., a combination of) a participation level of a plurality of participation levels of an organization (e.g., a club or organization may have different leagues dedicated to participants of different skill levels), an amount of time an individual has participated in game sessions of the type of game, a skill rating, a skill rating associated with a team, a skill rating associated with a league, a skill rating range associated with a team, a skill rating associated with a league, a number of game sessions an individual has participated in game sessions of the type of game, a type of an organization, or an identifier of an organization. Examples of experience levels and/or age ranges can include elementary, intermediate, club middle, high school, club high, or adult. The user 106 can input the type of game of the game session 108. The client device 104 can receive the input and transmit the input to the automatic media generator 102. The user 106 can be the same or different from individuals who are playing or participating in the game session 108.

The session generator 118 can include instructions performed by one or more servers or processors (e.g., the processing circuit 110), in some embodiments. The session generator 118 can be configured to generate records for game sessions. The records can be or include data structures (e.g., tables with field-value pairs that correspond with different types of data for the game sessions). The session generator 118 can generate identifications of game sessions (e.g., numeric or alphanumeric strings that individually identify the game sessions), such as by using a pseudo-random number generator or by sequentially generating the identifications based on the identifications of prior game sessions (e.g., incrementing a value of the most recently generated identification of a game session). In some cases, the identifications can already be stored in the memory 114 and the session generator 118 can retrieve the identifications from the memory 114. In response to receiving the indication of the beginning of the game session 108, the session generator 118 can generate an identification for the game session 108 and store the identification for the game session 108 in the record. The session generator 118 can store characteristics and/or a type of game of the game session 108 in the record. The session generator 118 can store the record in the memory 114, such as in the game session database 130.

The game session database 130 can be a graphical database or a relational database configured to store data for individual game sessions. The game session database 130 may store multiple records or data structures that each correspond to a different game session. In one example, the game session database 130 can store each record with an identification for the game session to which the record corresponds. In some embodiments, the records can additionally or instead include identifications of competitions and/or organizations under which the respective game sessions of the records were completed. In some embodiments, the records can additionally or instead include timestamps indicating when the respective game sessions of the records occurred (e.g., began). The identifications for the game sessions, competitions, and/or organizations, and/or the timestamps can be used as keys in a look-up when querying the game session database 130 for data of individual game sessions or a location to insert received data of game sessions.

The records for game sessions can each include one or more field-value pairs (e.g., event field-value pairs). Each event field-value pair may include a field for an identification of an event (e.g., a number of points scored, an identification of a made basket, a steal, a rebound, a total number of rebounds, an individual rebound, a blocked shot, a total number of blocked shots, etc.). The event field-value pairs may be for specific players, for entire teams, or for individual plays. For example, an event field value pair may be for an individual player and indicate a total number of points the player has scored for a game. An event field-value pair may be for the team on which the player is playing and indicate the total number of points the team has scored. An event field-value pair may be for a single made basket and indicate the basket occurred. The field-value pairs may be updated or added to a record for a game session over time as the automatic media generator 102 receives identifications of events that occur over the course of the game session and generates new field-value pairs for the events or updates values in the currently stored field-value pairs of the record. The game session database 130 may store any number of records for game sessions and each record may include any number of event field-value pairs.

Upon generating the identification for the game session 108, the session generator 118 can transmit the identification for the game session 108 to the client device 104. The client device 104 can receive the identification for the game session 108 and store the identification for the game session 108 in memory. The client device 104 can include the identification for the game session 108 in messages that the client device 104 transmits to the automatic media generator 102 to indicate the game session 108 to which the message pertains.

As the user 106 watches the game session 108, the user 106 may input values or identifications of events that occur or occurred during the game sessions into the client device 104. For example, the game session 108 may be a basketball game between Team A and Team B. As players from Team A and Team B score points or otherwise perform other tasks in the basketball game (e.g., gather rebounds, record steals, generate assists, block shots, etc.), the user 106 can input values or identifications of the performed tasks as events. In the input for each event, the user 106 can include an identification of the player that performed the event, the team of the player that performed the event, the time of the event, and/or any other characteristics about the event (e.g., the number points the player scored with the made basket of the event). The client device 104 can record or store the input values in memory 114 (e.g., in a cache in memory 114). In some embodiments, certain identifications (e.g., times of the events, teams, or players) may be automatically generated based on an individual's input.

The client device 104 can transmit messages for the input events to the automatic media generator 102. For example, the client device 104 can receive values and/or identifications of an event from a user input (e.g., an input at an input/output device of the client device 104, such as a touch screen of the client device 104 or a mouse or keyboard connected with the client device 104). The client device 104 can generate a message in one or more data packets that include the received values and/or identifications in the payloads. The client device 104 can also include the identification for the game session 108 in one of the payloads of the data packets for the message. The client device 104 can transmit the message to the automatic media generator 102.

The event identifier 120 can include instructions performed by one or more servers or processors (e.g., the processing circuit 110), in some embodiments. The event identifier 120 can be configured to receive and store data (e.g., event data) for events of game sessions. The event identifier 120 can receive (e.g., via the communicator 116) messages that contain data of events from the client device 104. For example, the event identifier 120 can receive a message from the client device 104 that includes the identification for the game session 108 and one or more values or identifications of an event as input by the user 106. The event identifier 120 can receive the message and parse the message to identify or extract the identification for the game session 108 and the one or more values or identifications of the event from the message. The event identifier 120 can identify the record from the game session database 130 that corresponds to the game session 108 using the identification for the game session 108 in a look-up through the game session database 130. The event identifier 120 can identify the record in the game session database 130 that contains the identification for the game session 108 and store the data (e.g., the values or the identifications of the event) in the record.

In some cases, the event identifier 120 can store video clips or audio clips in the records for game sessions. For example, over the course of a game session (e.g., the game session 108), a recording device (e.g., the client device 104 or another computing device with a microphone and/or camera) can capture video and/or audio data of the game session. The recording device can transmit or stream the video and/or audio data to the automatic media generator 102 over time. The automatic media generator 102 can receive the video and/or audio data and store the video and/or audio data in the memory 114, such as in the record for the game session being recorded. The automatic media generator 102 can store the video and/or audio data as a file in the record. The automatic media generator 102 can store timestamps indicating the times of the beginning and/or the ending of the recording (e.g., the video and/or audio recording) of the game session.

The automatic media generator 102 can parse or segment video and/or audio data for a game session into clips of video and/or audio. The automatic media generator 102 can do so based on events for which a client device transmits messages containing data corresponding to the events to the automatic media generator 102. For example, the automatic media generator 102 can receive a video and/or audio recording or stream from a computing device (e.g., the client device 104 or another computing device) recording the game session 108. The automatic media generator 102 can also receive messages from the client device 104 that include data for events that occur in the game session. Each message that the automatic media generator 102 receives can include correspond to a timestamp (e.g., a timestamp indicating the time automatic media generator 102 receives the message, a timestamp indicating the time the client device 104 transmitted the message to the automatic media generator 102 as metadata in the message, and/or a timestamp input by the user 106 that caused the client device 104 to transmit the message). The automatic media generator 102 can store the timestamp that corresponds to the event in the record for the game session 108 to have a stored association with the event (e.g., data for the event).

The automatic media generator 102 can identify a portion or segment (e.g., a portion or segment of a defined length) of the video and/or audio recording of the game session that corresponds with the timestamp of the event. The automatic media generator 102 can do so by identifying a time of the video and/or audio recording of the game session 108 that corresponds with the timestamp of the event. The automatic media generator 102 can identify the time of the video and/or audio recording of the game session 108 that corresponds with the timestamp of the event by determining the time based on the beginning or end time of the recording (e.g., identifying the time of the event from the recording by identifying the end time of the recording and the timestamp of the event and identifying the instance in the event that corresponds with the difference between the end time and the time of the event) or by identifying a timestamp of a recording that corresponds or is within a defined range of the timestamp of the event. The automatic media generator 102 can identify the instant of the recording that corresponds with the timestamp of the event and capture or generate a segment (e.g., a segment having a defined length) of the video and/or audio data that includes the instant of the timestamp at the beginning, the end, the middle, or another defined portion of the segment of the video and/or audio data. The automatic media generator 102 can parse out or otherwise extract the video and/or audio data as a media segment. The automatic media generator 102 can store the extracted media segment in the memory 114, such as in the record of the game session 108.

The automatic media generator 102 can store the extracted media segment with an association with the event that corresponds with the segment (e.g., the event for which the media segment was generated). In some embodiments, the automatic media generator 102 can label or include as metadata with the media segment an identification of the event (e.g., the event field-value pair for the event) for which the media segment was generated. The automatic media generator 102 can generate and/or store media segments for events in this way for any number of events of game sessions.

The event identifier 120 can update records for game sessions using received data that correspond to events of the game sessions. For example, the event identifier 120 can identify the record that corresponds to the game session 108 based on the identification for the game session 108 in the record. The event identifier 120 can identify the event field-value pair or pairs in the record that correspond to the value or values of the event. The event identifier 120 can update or insert the received value or identification for the event in the identified event field-value pair or pairs. For example, an event field-value pair may correspond to a number of points player A has scored over the course of the game session 108 and an event field-value pair may correspond to a total number of three pointers player A has scored over the course of the game session 108. The event identifier 120 may identify data of an event that indicates player A scored three points through a three pointer. Responsive to identifying the data, the event identifier 120 can increment the event field-value pair (e.g., a value of the event field-value pair) for the total number of points player A has scored by three and increment the field-value pair indicating the total number of three pointers player A has scored by one. In some cases, the event identifier 120 can similarly increment corresponding field-value pairs for the team on which player A is playing. The event identifier 120 can also update event field-value pairs for events that indicate the end of a defined time period. For instance, responsive to receiving an indication of a defined time period (e.g., a quarter, half, period, inning, defined inning (e.g., seventh inning), game, etc.), the event identifier 120 can update an event field-value pair that corresponds to the time period by inserting a value (e.g., a binary value, such as one) that indicates the end of the defined time period. The event identifier 120 can similarly update the record for the game session 108 using data the event identifier 120 receives for the game session 108 from the client device 104. The event identifier 120 can similarly update any number of field-value pairs for the game session 108 any number of times.

In some cases, the event identifier 120 can generate new event field-value pairs in the record from data the event identifier 120 receives for game sessions. For example, the event identifier 120 can generate event field-value pairs that correspond to individual events. One example is a "play-by-play" sequence that keeps track of events as the events occur over the course of a game session. For instance, the event identifier 120 can generate a field-value pair in the record for the game session 108 that indicates player A made a three pointer. Another example of such events is an event that indicates an ending or a beginning of a defined period. For instance, the event identifier 120 can receive an indication of an end of a quarter, half, game, or other period of the game session 108. Responsive to receiving the indication, the event identifier 120 can generate a new field-value pair with a binary value (e.g., one) that indicates the end of the defined period. The event identifier 120 can generate event field-value pairs for any type or number of events.

In some cases, the event identifier 120 can include metadata regarding events (which may be included in the message that client device 104 transmitted to the automatic media generator 102 for the event) in the records for game sessions. Metadata may include, for example, an indication of the time in which the event occurred, the score of the game session after the event occurred, etc. Users, such as the user 106, can input values or identifications of metadata for events with the values or identifications for the events. Client devices, such as the client device 104, can include the metadata in the messages that the client devices transmit to the automatic media generator 102. The event identifier 120 can insert the metadata in the records for the game sessions as metadata for the particular events (e.g., in separate fields that correspond to (e.g., are in the same rows as) the event field-value pairs and/or in separate records).

The criteria selector 122 can include instructions performed by one or more servers or processors (e.g., the processing circuit 110), in some embodiments. The criteria selector 122 can be configured to determine or select criteria (e.g., a set of criteria) to use to generate media segments (e.g., a set of media segments) for media content items of portions of game sessions. The criteria selector 122 can be configured to determine or select criteria based on characteristics of the participants. For example, different criteria can be stored in the string database 132. Each criterion of the criteria can have a stored association within the string database 132 with one or more characteristics of individuals. The criteria selector 122 can identify the characteristics of a game session (e.g., the game session 108) from the record for the game session in the game session database 130. The criteria selector 122 can compare the characteristics to one or more of the criteria in the string database 132. Based on the comparison, the criteria selector 122 can identify the criteria that have a stored association with characteristics that match or that are identical to the characteristics of individuals for the game session in the record. The criteria selector 122 can identify, select, or determine to use the identified criteria to use to generate media content items for all or portions of individual game sessions. The criteria selector 122 may determine or select the criteria without identifying the identities of individuals, but rather select the criteria based on anonymized characteristics of individually or in the aggregate, such as the age range of the individuals without knowing the identities of the individuals.

For example, a criterion can correspond to (e.g., have a stored association in the string database 132 with) the characteristics of 17 years old and a male gender. The criteria selector 122 can determine whether to select the criterion by retrieving the age characteristic of a game session and a gender characteristic of the game session from the record for the game session. The criteria selector 122 can compare the retrieved age characteristic and gender characteristic for the game session to the stored characteristics for the criterion. Responsive to determining the age characteristic and gender characteristic match the characteristic for the criterion, the criteria selector 122 can determine to select or identify the criterion. Different criteria can correspond to different and/or a varying number of characteristics. The criteria selector 122 can select any number of criteria in this manner to use to generate media content items for game sessions.

In some embodiments, criteria can correspond to types of games. For example, criteria can be stored in the string database 132 with stored associations with different types of games. In some cases, each type of game can have a dedicated table with different criteria. The criteria selector 122 can identify the type of game of the game session from the record for the game session and determine which criteria to select based on the criteria having a stored association with the type of game of the game session.

In some cases, criteria can be adjustable or configured to be determined based on characteristics of individuals participating in a game session (e.g., participants). For example, the criteria selector 122 can determine a threshold for a category (e.g., an event category). The category may be an event or a type of event, such as points scored, number of rebounds, assists scored, etc. The criteria selector 122 can determine the threshold for a game session based on the characteristics of the participants of the game session. For instance, the string database 132 can store a table for the category. The table can indicate different values for the threshold for different sets or variations of characteristics of individuals participants in game sessions. The criteria selector 122 can determine the threshold by comparing the characteristics of the participants in the game session with the table and identifying the value for the threshold based on the comparison.

In another example, the criteria selector 122 can determine a threshold of a category of a criterion based on the data of game sessions that were completed prior to the game session for which the criteria selector 122 is determining the threshold. For example, the criteria selector 122 can identify one or more of the characteristics of the game session from the record for the game session in the game session database 130. The criteria selector 122 can query the game session database 130 using the one or more characteristics in a look-up to identify records that have matching characteristics to the characteristics of the game session. Based on the query, the criteria selector 122 can identify multiple records for game sessions with matching characteristics. The criteria selector 122 can identify a defined or predetermined number of the identified game sessions, in some cases by identifying the records for game sessions that occurred most recently compared to the game session (e.g., identify the defined or predetermined number of records that contain the latest timestamps). The criteria selector 122 can identify the records for the game sessions that occurred most recently compared to the game session and retrieve the data (e.g., values) for the category from the identified records.

The criteria selector 122 can determine the threshold based on the retrieved data for the category from the identified records. For example, the criteria selector 122 can perform a function on the retrieved values for the category, such as by aggregating, determining a median, determining an average, aggregating and determining a percentage of, etc., the retrieved values. The output of the function can be the threshold for the category.

For example, the criteria selector 122 can determine a threshold for points scored by a team for a game session played by individuals of 19 years of age. To do so, the criteria selector 122 can identify a defined or predetermined number of records from the game session database 130 for game sessions played by individuals of 19 years of age. The criteria selector 122 can retrieve the points scored by each team from the identified records. The criteria selector 122 can perform a function on the retrieved points to calculate the threshold.

In one example, the criteria selector 122 can calculate a threshold for a category by using a distribution. For instance, the criteria selector 122 can generate a distribution of values that the criteria selector 122 retrieved for a category. From the distribution, the criteria selector 122 can identify a value that corresponds to a defined or predetermined percentile (e.g., 70%) of the distribution. The identified value can be the threshold for the category.

In some embodiments, the criteria selector 122 can determine a threshold based on a user input. For example, the criteria selector 122 can receive an input threshold value and an identification of a category of data from the client device 104. In response to receiving the input threshold, the criteria selector 122 can identify a criterion in the string database 132 that corresponds to a threshold for a category of data. The criteria selector 122 store a value for the threshold to be input threshold value received from the client device 104. The input threshold value can be used to generate a media content item for the game session 108, but may not, in some cases, be used to generate a media content item for a different game session. In some embodiments, the criteria selector 122 can store an identification of the client device 104 with the threshold value. In such embodiments, the criteria selector 122 can use the threshold to generate future media content items for the client device 104.

The string database 132 can be a graph or relational database that is configured to store strings of text or other segments of media. Strings of text can each be or include a string of characters. Strings of characters can each form a sentence (e.g., have the syntax of a sentence, such as a subject and a verb). In some cases, one or more of the strings can include blank or populatable portions that are configured to be updated with data from a game session. For example, a string may include a form of "[Player Name] scored [Number of Points] during the game today." In the example string, the brackets may indicate portions of the string that can be updated with values from a game session. In this example, the populatable form [Player Name] can be replaced with a player's name and the populatable form [Number of Points] can be replaced with the number of points the player scored during the game session. Different strings can correspond with different populatable portions for different types of data and/or any number of populatable portions.

In some embodiments, different strings can correspond with (e.g., have a stored association with) different criteria within the string database 132. For example, the string database 132 can store a number of media segments with different variations of populatable portions. The different strings can correspond with different criteria (e.g., the criteria as described above). The criteria can indicate whether to use the strings corresponding to the criteria when generating a media content item (e.g., a text summary) for a game session (e.g., at least a portion of the game session). Upon determining a criterion is satisfied based on data of a game session (e.g., the game session 108), the automatic media generator 102 (e.g., via the segment selector 126) can identify the string that has a stored association with the satisfied criterion to use to generate a media content item for the game session.

In some embodiments, strings can be stored in the string database 132 with associations with different categories. Examples of such categories can include, but are not limited to, a game session summary category, a sequence category, and a team summary category. Strings in the game session summary category can be or include a description of the main thrust of what happened over the course of a game session. Strings in the sequence category can indicate the general contours of what happened over the course of a game session, such as different runs that occurred, halftime scores, etc. The strings that correspond with the team summary category (or any other category) can correspond with thresholds determined based on characteristics of participants of game sessions, as described herein.

The segment selector 126 can include instructions performed by one or more servers or processors (e.g., the processing circuit 110), in some embodiments. The segment selector 126 can be configured to generate strings of text for a media content item for the game session 108 (e.g., at least a portion of the game session). The segment selector 126 can retrieve data from the record for the game session 108. The segment selector 126 can compare the retrieved data with the criteria in the string database 132. Based on the comparison, the segment selector 126 can identify or determine criteria from the string database 132 that is satisfied. The segment selector 126 can generate the strings by identifying the strings that have stored associations with the satisfied criteria in the string database 132.

In one example, the segment selector 126 can determine a criterion is satisfied response to determining a threshold (e.g., a threshold calculated based on the characteristics of individuals participating in the game session 108) is satisfied. For instance, the criteria selector 124 can calculate or determine a threshold for a category of a number of points scored by an individual player. The segment selector 126 can retrieve (e.g., from event field-value pairs that correspond to total number of points in the record for the game session 108) the points scored by each individual player of the game session. The segment selector 126 can compare the retrieved total number of points for each player to the threshold. Responsive to determining one of the total number of points exceeds or otherwise satisfies the threshold, the segment selector 126 can determine the criterion is satisfied.

In another example, the segment selector 126 can determine a criterion is satisfied based on an identification of an event. For example, the segment selector 126 can determine a player a game winning basket of a basketball game of the game session 108 by retrieving a value from a field value pair that indicates a player scored a game winning basket. In some cases, the segment selector 126 can make such a determination by retrieving the final score, an identification of the last scored basket (e.g., the last event prior to the ending) of the game session 108, and a timestamp of the event. The segment selector 126 can compare the score, the identification, and the timestamp to a criterion that is satisfied if a player scores a basket within the last second (or another defined time period) and wins by the points associated with the basket or less.

In one example, the segment selector 126 can identify a satisfied criterion based on a sequence of events. For example, the segment selector 126 can identify event field-value pairs that correspond with individual events. The segment selector 126 can compare values from the field-value pairs with a criterion that corresponds with a single team that scored a number of baskets or a number of points in a row without the other team scoring or scoring a number of points or a number of baskets below another threshold. The segment selector 126 can compare the values of sequential events (e.g., which the segment selector 126 may determine based on sequential timestamps associated with the events) with the criterion to determine if the criterion is satisfied.

In some embodiments, the segment selector 126 can generate one or more strings (e.g., strings of text) by populating one or more media segments that correspond with satisfied criteria with values. The segment selector 126 can identify text springs with populatable portions. The segment selector 126 can identify the type of data that corresponds with the populatable portions. Examples of such types of data include, but are not limited to, name, number of points, number of rebounds, defined time period, a portion of defined time period (e.g., beginning or end of a quarter, half, inning, match, or game, etc.), etc. The segment selector 126 can retrieve the values from the record of the types of data for the populatable portions. The segment selector 126 can insert the retrieved values into the respective populatable portions of a string to generate the string. The segment selector 126 can generate any number of strings with any number of populatable portions in this manner.

In some embodiments, the string database 132 can store multiple variations (e.g., variations in wording or syntax) for individual strings. Each variation of a media segment can correspond to the same criterion. In some cases, each variation can include the same populatable portions (e.g., populatable portions for the same type of data). The segment selector 126 can select (e.g., pseudo-randomly select or select based on one or more rules, such as in sequence) one of the variations of the strings upon determining the criterion for the media segment is satisfied. The segment selector 126 can select different variations over time to reduce the repetitiveness of potentially using the same media segment in each media content item that the automatic media generator 102 generates.

In some embodiments, the string database 132 can store media segments that include indicators that individual words within the strings can be replaced by synonyms or other words. For example, a string can include the word "defeated" with a "-" symbol in front of the word. The string database 132 can store one or more synonyms or other replacement words for the word defeated, such as "bested," "topped," or "overcame." When the segment selector 126 processes the strings, the segment selector 126 can identify the - symbol in front of the defeated word and determine that the defeated word can be replaced with another word. In response to the determination, the segment selector 126 can identify the list of words in memory that correspond with defeated and select (e.g., pseudo-randomly select or select based on one or more rules, such as in sequence) a word from the list. In some cases, the word itself can be included in the list, thus keeping open the possibility of selecting the same word that appears in the original string. Strings can include any number of such replaceable words and the string database 132 can include any number of media segments with replaceable words. The replaceable words can increase variability between text summaries as the same string can be said in different ways.

The segment selector 126 can select media segments (e.g., video and/or audio segments) based on satisfied criteria. For example, the segment selector 126 can identify which criteria of the set of criteria identified by the criteria selector 122 are satisfied. Responsive to identifying the satisfied criteria, the segment selector 126 can identify any audio and/or video clips that are associated with the satisfied criteria. The segment selector 126 can do so by identifying the events from the record that correspond with the data that used to determine the criteria is satisfied. The segment selector 126 can identify the audio and/or video segments that were generated for the events from the memory 114. The segment selector 126 can tag the identified audio and/or video segments with an indication that the audio and/or video segments are associated with satisfied criteria.

The content item generator 128 can include instructions performed by one or more servers or processors (e.g., the processing circuit 110), in some embodiments. The content item generator 128 can be configured to generate media content items for game sessions (e.g., portions of game sessions). The content item generator 128 can generate the media content items based on the media segments that are generated by the segment selector 126. For example, the content item generator 128 can identify the media segments that the segment selector 126 generates. The content item generator 128 can concatenate, append, merge, stitch, join, or otherwise group all or a portion of the media segments together to form a media content item from the media segments.

Upon generating a media content item for the game session 108, the content item generator 128 can transmit the media content item to a client device, such as the client device 104 or another client device. The client device to which the content item generator 128 transmitted the media content item can receive the media content item. The client device can display the media content item on a display. Accordingly, in embodiments in which the automatic media generator 102 generates text summaries, the client device can display a summary of the game session 108 as generated by the automatic media generator 102 using natural language processing.

In some embodiments, the content item generator 128 only uses a portion (e.g., not all) of the media segments generated by the segment selector 126 or that correspond with satisfied criteria to generate text summaries. In such embodiments, the content item generator 128 can be configured to generate media content items with a defined or predetermined number of media segments. The content item generator 128 can be configured to select which media segments to use based on priority values that correspond with the media segments. For example, different strings or other media segments can be stored with priority values in the string database 132. The priority values can be values within a defined range (e.g., 1-10, 1-100, 0.0-1.0, etc.). The priority values can be predetermined (e.g., configured by an administrator). The content item generator 128 can identify the priority values of the strings or other media segments generated by the segment selector 126. The content item generator 128 can compare the priority values with each other. The content item generator 128 can identify the defined or predetermined number of media segments (e.g., a subset of media segments) with the highest priority (e.g., highest priority relative to the priority of other media segments). The content item generator 128 can generate the media content item for the game session with only the identified defined or predetermined number of media segments.

In some embodiments, the criteria stored in string database 132 can correspond with priority values. In such embodiments, the content item generator 128 can select which media segments to include in a media content item by identifying the priority of criteria that was used to select or identify the media segments. The content item generator 128 can identify a defined number or predetermined number of criteria that correspond with the highest priority criteria similar to above and identify the media segments that correspond with the satisfied criteria. In cases in which satisfied criteria corresponds to multiple media segments, the content item generator 128 can identify a defined or predetermined number of media segments of the satisfied criteria that corresponds to the highest priority.

In some embodiments, the content item generator 128 can select which media segments to use to generate a media content item according to a template. For example, the template database 134 can be a graph or relational database that is configured to store templates that each indicate different categories and/or orders of media segments to include in a media content item for a game session. One example of a template can include a rule (e.g., a first rule) that indicates a defined number (e.g., two) of media segments of the game summary category can be used in the media content item, a rule (e.g., a second rule) that indicates that any number of media segments of the sequence category can be used in the media content item, and/or a rule (e.g., a third rule) that indicates that any number of media segments in the team summary category can be used in the media content item. The content item generator 128 can select the defined number of media segments with the highest priority values of the categories to generate the media content items. Each template database 134 can include a different number of categories and/or a different number of media segments for each category. The content item generator 128 can select (e.g., randomly or pseudo-randomly select) templates for each media content item that the content item generator 128 generates to provide variation in the text summaries that the content item generator 128 generates.

In some embodiments, the content item generator 128 can generate media content items in response to determining a predetermined event occurred. Predetermined events may be or include triggers for the content item generator 128 to generate media content items for game sessions. Predetermined events can, for example, correspond to a specific time of a game (e.g., an end of a game, quarter, half, period, etc.), or other events that may occur during a game session (e.g., a specific player scored 10 points in a row). The automatic media generator 102 (e.g., any component of the automatic media generator 102) can determine a predetermined event occurred in response to receiving an identification of the predetermined event from a client device (e.g., the client device 104). The automatic media generator 102 can determine a predetermined event occurred for a game session (e.g., the game session 108) and retrieve the data for the game session from the record for the game session. The criteria selector 122 can determine which criteria applies or corresponds to the game session based on characteristics of the individuals participating in the game session. The segment selector 126 can determine which of the determined criteria is satisfied based on the data that corresponds with events of the game session and identify the media segments that correspond with the satisfied criteria. In cases in which the media segments are text strings, the segment selector 126 can populate portions of the identified text strings with data that has been stored and identified from the record for the game session up until the determination of the occurrence of the predetermined event. The content item generator 128 can generate a media content item with the media segments (e.g., the populated text strings and/or other media segments that the segment selector 126 has selected). Any part of the media content item generation process can be performed in response to the automatic media generator 102 determining the occurrence of a predetermined event. The content item generator 128 can generate a media content item at any point of a game session. Accordingly, the automatic media generator 102 can automatically generate media content items without any human input.

In a non-limiting example, the automatic media generator 102 can automatically generate a media content item for the game session 108 in response to determining the game session 108 has ended. For instance, through the communicator 116 and from the client device 104, the session generator 118 can receive an indication of a beginning of the game session 108 and characteristics of the individuals participating in the game session 108. In response to receiving the indication, the session generator 118 can generate an identification for the game session 108. The session generator 118 can store the identification for the game session 108 in a record and transmit the identification for the game session 108 to the client device 104. Over the course of the game session 108, the client device 104 can transmit, in messages, values or identifications of events that occurred over the course of the game session 108. The event identifier 120 can receive each message and store the data from the messages in the record for the game session 108. The event identifier 120 can do so based on the messages containing the identification for the game session 108 that matches the identification for the game session 108 in the record for the game session 108. The event identifier 120 can receive a message that includes an indication of an occurrence of a predetermined event (e.g., an ending of the game session)

The event identifier 120 can determine the occurrence of the predetermined event based on the indication of the occurrence of the predetermined event. The criteria selector 122 can determine the criteria for the game session 108 based on the characteristics of the game session 108, in some cases in response to the determining of the occurrence of the predetermined event. The segment selector 126 can determine which criteria are satisfied based on the data of the events of the game session 108, identify the media segments that correspond with the satisfied criteria, and, in the cases of strings, populate portions of the strings (e.g., the populatable portions of the strings) with data that corresponds with the events of the game session 108. The content item generator 128 can generate a media content item based on the populated strings and/or other media segments that the segment selector 126 identifies. The content item generator 128 can transmit, through the communicator 116, the media content item to the client device 104 for display.

In some embodiments, the automatic media generator 102 can implement or use the systems and methods described herein to generate previews (e.g., media content item previews) for upcoming or future game sessions. For example, the game session database 130 can store records for game sessions that have not occurred or that have yet to occur. The records can include timestamps indicating times in which the game sessions are scheduled to occur. The session generator 118 can store the records for the future or upcoming game sessions in the game session database 130 in response to receiving input data from a computing device (e.g., an administrative computing device accessed by a user or administrator) regarding the game sessions. The input data can include data regarding the respective game sessions, such as entities (e.g., teams or participants) participating in the game sessions, timestamps indicating the times (e.g., start times) of the game sessions, and/or any other data regarding the game sessions. The session generator 118 can receive the input data from the computing device and generate a record in the game session database 130 for each of the respective game sessions. The session generator 118 can generate a game session identification for each game session and include the generated game session identification in the respective records, as described herein. In some embodiments, the event identifier 120 can store received data for the game sessions in the generated records in the game session database 130.

The criteria selector 122 (or the content item generator 128) can detect when to initiate generation of a media content item for an upcoming or future game session. The criteria selector 122 can do so based on the current time. For example, the criteria selector 122 can maintain an internal clock in memory. The internal clock can indicate the current time. The criteria selector 122 can increment the internal clock at set time intervals (e.g., every second or minute). For each increment or for every interval of a defined number of increments, the criteria selector 122 can compare the count of the internal clock to timestamps of future game sessions (e.g., timestamps corresponding to times after the current time on the internal clock). The criteria selector 122 can determine differences between the current time and each of the timestamps of the future game sessions. Responsive to determining a future game session corresponds to a timestamp within a threshold (e.g., a predetermined threshold) of the current time, the criteria selector 122 can determine for the automatic media generator 102 to generate a media content item preview for the future game session.

Responsive to determining the current time is within the threshold of the timestamp for the future game session, the criteria selector 122 can select a set of criteria to use to generate the media content item previewing the future game session. For example, the future game session can correspond to two entities (e.g., teams or participants), a first entity and a second entity. The criteria selector 122 can select a set of criteria to use to generate the media content item, for example, by identifying characteristics (e.g., age, age range, gender, or experience level) of participants of the entities of the future game session and selecting a set of criteria based on the identified characteristics of the participants using the methods as described herein. The selected set of criteria can include one or more thresholds or rules that are specific to or that correspond to the identified characteristics of the participants of the future game session. Using the characteristics of the participants to select the set of criteria can cause the preview media content item that the automatic media generator 102 generates to be relevant to the participants of the game session. The criteria selector 122 can identify the set of criteria based on the characteristics of the participants of the two entities of the future, game sessions, and the segment selector 126 can use the selected set of criteria to select media segments to include in a media content item previewing the future game session.

The segment selector 126 can retrieve data from records stored in the game session database 130 of the game sessions in which one or both entities of the future game session participated. The segment selector 126 can do so by using identifications of the entities to query the game session database 130 for records for game sessions that contain one or both of the identifications of the two entities. The segment selector 126 can identify records with matching identifications and retrieve data for the game sessions from the identified records. The segment selector 126 can compare the retrieved data to the set of criteria to identify criteria of the set of criteria that are satisfied by the data for the game sessions. The segment selector 126 can identify media segments that correspond to the satisfied criteria and select the identified media segments for the content item generator 128 to use to generate a media content item previewing the future game session.

In some embodiments, the segment selector 126 can use a media content item template to determine which text segments to select for inclusion in the media content item previewing the future game session. For example, the media content item template can include or identify different sections or portions of a media content item preview. Each section or portion can correspond to a different subset of criteria of the satisfied criteria such that if a criterion is satisfied a media segment corresponding to the satisfied criterion can be placed into the section or portion of the media content item that corresponds to the subset of criteria of the satisfied criterion. The segment selector 126 can identify one or more criteria that are satisfied, if any, for each of the sections of the media content item template and select a media segment that corresponds to the satisfied criteria.

For example, the media content item template can include a section for media segments relating to a previous game session (e.g., a most recent game session) between the two entities of the future game session, a section highlighting a particular participant (e.g., player) of the future game session, a section including information for one entity participating in the game session, and/or another section including information for another entity participating in the game session. Each of the sections can correspond to a different subset of criteria. The different subsets of criteria can be satisfied based on different types of data from game sessions, such as data specific to game sessions involving one or both of the entities and/or particular participants of the entities.

For instance, the section for media segments relating to a previous game session between the two entities of the future game session may be updated to include data from a particular game session in which both of the entities participated. The segment selector 126 can query the game session database 130 for game sessions containing identifications of the two entities participating in the game session. The segment selector 126 can identify one or more records of game sessions containing the identifications of the two entities participating in the game session. The segment selector 126 can identify a timestamp in each of the identified records for the game sessions and compare the timestamps between each other. Based on the comparison, the segment selector 126 can identify the record of the game session with the latest timestamp. The segment selector 126 can retrieve data from the record of the game session with the latest timestamp. The segment selector 126 can compare the retrieved data (e.g., only the retrieved data) with the subset of criteria that corresponds with the section of the media content item template for a previous game session between the two entities of the future game session. The segment selector 126 can determine which criteria of the subset of criteria is satisfied based on the comparison. The segment selector 126 can identify a set of media segments (e.g., text segments) that correspond to the satisfied criteria of the subset of criteria for the content item generator 128 to use to generate a media content item.

The section highlighting a particular participant of the future game session may be updated to include data from one or more game sessions in which the participant participated. The segment selector 126 can query the game session database 130 for game sessions containing an identification of one of the two entities of which the participant is a part. The segment selector 126 can identify one or more records of game sessions containing the identification of the entity participating in the game session based on the query. The segment selector 126 can identify data indicating or regarding the participant from records of the game sessions containing the identification of the entity. The segment selector 126 can generate aggregated data from the identified data indicating or regarding the participant. The segment selector 126 can compare the aggregated data and/or data of individual game sessions indicating or regarding the participant to a subset of criteria that corresponds with the section of the media content item template corresponding to highlighting a particular player or participant of the future game session. The segment selector 126 can determine which criteria of the subset of criteria is satisfied based on the comparison. The segment selector 126 can identify a set of media segments (e.g., text segments) that correspond to the satisfied criteria of the subset of criteria for the content item generator 128 to use to generate a media content item.

The segment selector 126 can select a participant to highlight based on the entity of the future game session for which the automatic media generator 102 is generating the media content item. For example, the automatic media generator 102 may generate a media content item for the first entity of the future game session. In doing so, the automatic media generator 102 may identify participants of the first entity that the automatic media generator 102 has previously described or included in the participant highlighting section of a defined number (e.g., one or more) of historical media content item previews (e.g., previously generated media content item previews). Based on the identification, the automatic media generator 102 may select media segments of a player that was identified in the defined number of historical media content item previews to include in the media content item previewing the future game session. In some cases, the automatic media generator 102 may select media segments for participants in a cycle such as to highlight different participants for the first entity over time and avoid redundant participant highlighting sections between media content items.

In some cases, the segment selector 126 may select a participant to highlight according to a set of rules for participant selection. For example, the segment selector 126 may apply data of game sessions for individual participants of the first entity to the set of rules. In doing so, the segment selector 126 can apply such data for one or more or a defined number of the most recently completed game sessions to the set of rules. The set of rules can include different thresholds or rules that, if satisfied, can indicate to select a particular participant to describe or include in the participant highlighting section of the media content item previewing the future game session. For example, the set of rules can include a threshold for a total number of points scored in the previous five games. Responsive to determining a participant corresponds to data of game sessions within the previous five games that satisfies the rule, the segment selector 126 can identify the participant and select media segments regarding the participant to include in the participant highlighting section of the media content item. In some embodiments, the segment selector 126 can use a ranking system to rank the participants based on the number of rules or thresholds that are satisfied. In some cases, the rules can be weighted and the segment selector 126 can rank the participants according to a weighted average or sum of the satisfied rules for each participant. The segment selector 126 may select the highest ranked participant for media content item and/or the highest ranked participant that is not filtered or restricted from being included based on being included in a previous media content item preview as described above.

The section including information for one entity (e.g., a team) participating in the game session may be updated to include data from one or more game sessions in which the entity participated. The segment selector 126 can query the game session database 130 for game sessions containing an identification of the entity of which the participant is a part. The segment selector 126 can identify one or more records of game sessions containing the identification of the entity participating in the game session. The segment selector 126 can identify data indicating or regarding the entity from records of the game sessions containing the identification of the entity. The segment selector 126 can generate aggregated data from the identified data indicating or regarding the entity. The segment selector 126 can compare the aggregated data and/or data of individual game sessions indicating or regarding the entity to a subset of criteria that corresponds with the section of the media content item template corresponding to information for the entity participating in the game session. The segment selector 126 can determine which criteria of the subset of criteria is satisfied based on the comparison. The segment selector 126 can identify a set of media segments (e.g., text segments) that correspond to the satisfied criteria of the subset of criteria for the content item generator 128 to use to generate a media content item. The segment selector 126 can similarly update the other section corresponding to information for the other entity of the game session with data of game sessions in which the other entity participated.

The media content item template can include a headliner section. The headliner section can be configured to include a single media segment. The segment selector 126 can select the single media segment based on data of a single game session regarding the first entity or based on aggregated data of multiple game sessions. In some embodiments, the segment selector 126 can only include aggregated data from a set number of the most recent game sessions or the most recent game session that occurred within a defined time period, which the segment selector 126 may determine or identify based on timestamps in the records containing data for the respective game sessions. The segment selector 126 can compare the data and/or aggregated data to a subset of criteria for the headliner section and identify a criterion that is satisfied based on the comparison. The segment selector 126 can identify a text segment that corresponds to the satisfied criterion for inclusion in the media content item.

The media content item template can include a preview section. The preview section can be configured to include media segments indicating one or more trends (e.g., recent trends) of the first entity from one or more previous game sessions (e.g., one or more of the most recently completed game sessions). The segment selector 126 can select one or more media segments for inclusion in the media content item based on data of a single game session regarding the first entity or based on aggregated data of multiple game sessions regarding the first entity. In some embodiments, the segment selector 126 can only include aggregated data from a set number of the most recent game sessions or the most recent game session that occurred within a defined time period similar to the headliner section, which the segment selector 126 may determine or identify based on timestamps in the records containing data for the respective game sessions. The segment selector 126 can compare the data and/or aggregated data to a subset of criteria for the preview section and identify one or more criteria that are satisfied based on the comparison. The segment selector 126 can identify one or more media segments that correspond to the satisfied criteria for inclusion in the media content item.

The segment selector 126 can select text segments to include in individual sections of the media content item based on satisfied criteria of subsets that correspond to the individual sections using the systems and methods described herein. For example, each section may correspond to a number (e.g., a predetermined number) of media segments to include in the section. The media segments or criteria that correspond to the respective media segments may correspond to ranking values that rank the media segments or criteria against each other. The ranking values may be specific to the criteria or media segments of individual sections. In some cases, criteria or media segments may be included for multiple sections. In such cases, the criteria or media segments may have separate rankings of each section to which the criteria or media segments correspond. The segment selector 126 can identify the satisfied criteria and/or the media segments that correspond to the satisfied criteria of a section and compare the rankings of the identified satisfied criteria and/or media segments. Based on the comparison, the segment selector 126 can identify a number (e.g., a defined number) of the highest ranked media segments to include in the section as indicated for the section. The segment selector 126 can select the highest ranked media segments to include in each section in this way.

In some embodiments, the segment selector 126 can avoid including the same text segments in consecutively generated media content item previews for game sessions. For example, in addition to or instead of using rankings to select text segments for inclusion in a media content item for a preview of a game session, the segment selector 126 can identify the text segments or satisfied criteria that was used in a previously generated media content item preview for the same entity. The segment selector 126 can identify the text segments for the most recently generated media content item preview, for a defined number of the most recently generated media content items, and/or for any media content item previews that the segment selector 126 generated within a defined time period of the current time (e.g., within the past day, month, year, etc.). The segment selector 126 may not select such text segments for inclusion in the media content item and instead select the next highest ranked media segment that corresponds to satisfied criteria of the same section. The segment selector 126 can similarly increase the variations in generated media content item previews of any number of the sections of the media content item and/or any number of media content item previews.

The media content item template can include static portions. The static portions can be headings of the individual sections of the media content item template. The static portions may not depend on data of previous game sessions. Instead, the static portions can include text strings describing or introducing the sections below the respective static portions. In some cases, the text strings can include populatable portions that may vary depending on entities participating in the respective game sessions. For example, the media content item template can include a heading for inclusion above the section for describing the previous game session between two entities with a string of "Last Time Out." The media content item template can include a heading for inclusion above the participant highlighting section with a string of "Player Highlight." The media content item template can include a heading for inclusion above the section for including information about one entity with a string of "About {insert entity 1 name}," with a populatable portion for the automatic media generator 102 to populate with an identification or name of the entity. The media content item template can include a heading for inclusion above the section for including information about the other entity with a string of "About {insert entity 2 name}," with a populatable portion for the automatic media generator 102 to populate with an identification or name of the other entity. Such headings can divide the media content item and make it easier to read or view. The media content item template can include any number of static portions.

The content item generator 128 can generate a media content item preview for the future game session based on the media segments that the segment selector 126 selected. For example, the content item generator 128 can identify the media segments that the segment selector 126 selected and the sections of the media content item template for which the segment selector 126 selected the media segments. The content item generator 128 can concatenate or otherwise combine the identified media segments for each section. The content item generator 128 can position or place the combined or concatenated media segments for each section into a media content item according to the media content item template for media content item previews. The content item generator 128 can additionally or instead include the headliner that the segment selector 126 selected and/or the static portions of the media content item template in the media content item. The content item generator 128 can populate the static portions with the corresponding data for the media content item. Accordingly, the content item generator 128 can generate the media content item preview based on the selected media segments and/or according to the media content item template.

In some embodiments, the content item generator 128 can populate the selected media segments when including the selected media segments in the media content item. The content item generator 128 may do so as described herein by populating the populatable portions of the media segments with portions of the data that the segment selector 126 used to select the respective media segments.

The automatic media generator 102 can transmit the media content item to client devices associated with the future game session. For example, the automatic media generator 102 can store a record of electronic accounts, client devices, or users that are associated with the entities of the future game session (e.g., family members, participants, or other viewers or stakeholders of the future game session). The record can include identifying information of the electronic accounts or client devices (e.g., email addresses, phone numbers, Internet Protocol (IP) addresses, etc.) that the data processing system can use to transmit messages to the respective electronic accounts or client devices. The automatic media generator 102 can generate the media content item and transmit the generated media content item to the electronic accounts or client devices using the stored identifying information of the respective electronic accounts or client devices.

The automatic media generator 102 can generate separate media content item previews for the two entities that are participating in the future game session. For example, responsive to determining to generate a media content item preview for the future game session, the segment selector 126 can apply data of game sessions in which one or both of the entities of the game session participated. The segment selector 126 can retrieve data of game sessions for the first entity and data of game sessions for the second entity. The segment selector 126 can separately compare the retrieved data to the set of criteria to select media segments that follow the media content item template for each of the entities. In one example, the segment selector 126 can select media segments to highlight a participant of the first entity for the media content item preview being generated for the first entity and media segments to highlight a participant of the second entity for the media content item preview being generated for the second entity. In some embodiments, the segment selector 126 can additionally select media segments for the previewing section and/or the headliner section of the media content item using only data from the entity for which the automatic media generator 102 is generating the media content item. Doing so can facilitate the automatic media generator 102 providing content that is relevant to the individuals that view the media content items. The automatic media generator 102 can transmit the generated media content items generated for the separate entities to the electronic accounts or electronic devices associated with (e.g., correspond to an identifier of in the accounts or data structures of) the respective entities.

Figure 2:
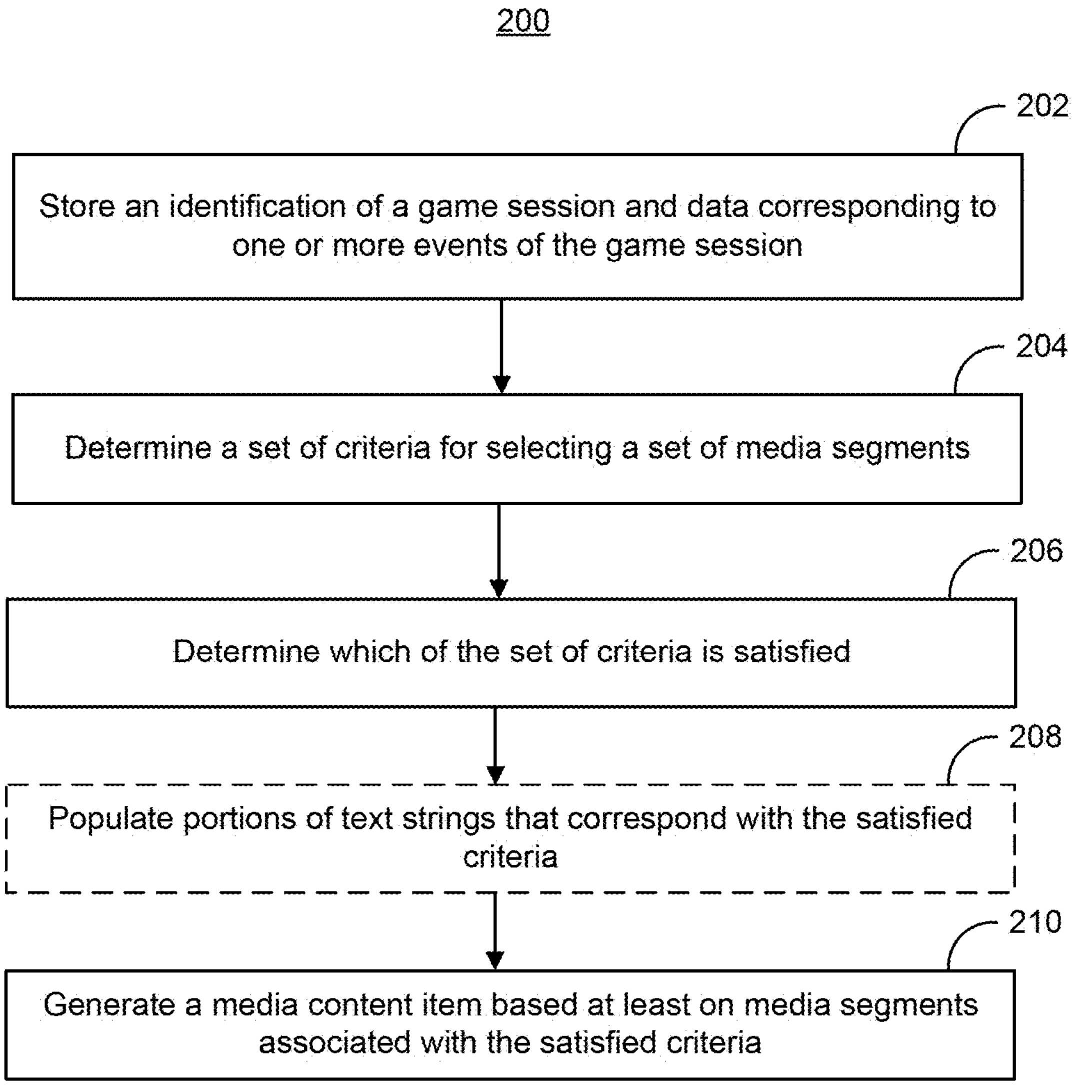
FIG. 2 is a flow chart of an implementation of a method for automatic media generation for game sessions, according to some implementations.

FIG. 2 is a flow chart of an implementation of a method 200 for automatic generation of media content items of game sessions, according to some implementations. The method 200 may be performed by individual devices within a natural language processing system. For example, the method 200 may be performed by a data processing system, such as the automatic media generator 102, shown and described with reference to FIG. 1. The method 200 may include any number of steps and the steps may be performed in any order. The data processing system may perform the method 200 to automatically generate media content items for game sessions. The data processing system may customize the media content items based on the characteristics of the participants, such as by varying the criteria that the data processing system uses to select media segments for the media content items based on the characteristics of the participants. Accordingly, the data processing system may offer a method of context-specific natural language processing or media generation to generate text summaries or other media content items that are more relevant to the situations that the text summaries or media content items depict.

At step 202, the data processing system may store an identification of a game session in memory. The data processing system can store the identification for the game session in memory in response to receiving an indication of the game session (e.g., indicating the beginning of the game session) from a client device. The data processing system can receive the indication for the game session from the client device and generate the identification for the game session. The data processing system can generate the identification for the game session by using a random number generation technique or sequentially based on an identification the data processing system generated for a previous game session (e.g., a game session of the same type, such as the same sport or activity). In some cases, the data processing system can also receive characteristics of individuals participating in the game session from the client device. The data processing system can store the identification for the game session and/or the characteristics in memory, such as in a record in a database. The data processing system can transmit the identification for the game session to the client device.

Over the course of the game session, the data processing system can receive messages from the client device. Each message can include the identification for the game session and data that corresponds to events that occurred during the game session (e.g., statistics for individual players participating in the game session, statistics for one or more of the teams participating in the game session, the occurrence of defined events of the game session (e.g., end of a defined time period), etc.).

The data processing system can receive each message. The data processing system can identify or extract the data from the messages and identify the identification for the game session from each message. For each message, the data processing system can compare the identification for the game session in the message with identifications for game sessions in memory. The data processing system can identify a record that includes a matching identification to the identification for the game session in the message. The data processing system can store the data that corresponds to events in the messages in the record that contains the matching identification for the game session.

At step 204, the data processing system can determine a set of criteria for generating a set of media segments. The data processing system can determine the set of criteria based on the characteristics of the individuals that are participating in the game session. For example, the data processing system can store criteria in a database in memory of the data processing system. Each criterion can correspond to (e.g., have a stored association with) one or more characteristics of participants of game sessions. The data processing system can identify the characteristics of individuals participating in the game session and compare the identified characteristics with the characteristics that correspond to the individual criteria. The data processing system can identify the criteria that correspond to one or more characteristics that match the characteristics of individuals participating in the game session. The identified characteristics can be included in the set of criteria.

In some embodiments, the data processing system can determine one or more criteria of the set of criteria by calculating the criteria. The data processing system can calculate a threshold for a category of data that corresponds to events of the game session. In one example, the data processing system can calculate the threshold by comparing the characteristics of the individuals participating in the game session to a table and identifying the value of the threshold for the category from the table. In another example, the data processing system can calculate the threshold by identifying records that correspond to the same characteristics as the characteristics of the game session, retrieving values for the category from the identified records, and performing a function on the retrieved values (e.g., an averaging function, a median function, calculating a percentile, etc.) from the retrieved values to calculate the threshold. The data processing system can calculate such thresholds for any number of categories. The data processing system can determine the set of criteria to have any combination of thresholds or other types of criteria based on the characteristics of the individuals participating in the game session.

Different criteria of the set of criteria can correspond with different media segments. For example, each criterion can have a stored association with a media segment in the database. One or more of such media segments (e.g., strings) can include portions that can be populated with values (e.g., names, words, and/or numerical values). Such media segments can be populated and/or used to generate media content items for game sessions.

At step 206, the data processing system can determine which of the set of criteria is satisfied. The data processing system can determine satisfied criteria from the set by comparing the data (e.g., values) that corresponds to events of the game session that is stored in the record for the game session to the criteria. Based on the comparison, the data processing system can identify which of the criteria is satisfied.

At step 208, the data processing system can populate the media segments that correspond with the satisfied criteria. The data processing system can populate portions (e.g., populatable portions) of the media segments (e.g., strings) with values that correspond to portions from the data in the record for the game session. For example, a media segment may include a populatable portion that corresponds to a name of an individual and a populatable portion that corresponds to an amount of points the named individual scored in the game session. The data processing system can retrieve a value of a name of a player and a value indicating the amount of points the player scored in the game session and populate the respective populatable portions in the media segment. The data processing system may similarly populate any number of media segments from the media segments that correspond with the satisfied criteria of the set of criteria.

At step 210, the data processing system can generate a media content item for the game session. The data processing system can generate the media content item based at least on the populated media segments and/or other media segments associated with satisfied criteria. For example, the data processing system can identify the populated media segments and/or any media segments without populatable portions that correspond to the satisfied criteria of the set of criteria. The data processing system can concatenate, merge, stitch, append, or otherwise join the populated media segments and/or any other media segments that are associated with satisfied criteria together to generate a media content item.

In some embodiments, the data processing system can generate the media content item for the game session in response to determining an occurrence of a predetermined event. A predetermined event can be, for example, an ending of a defined or predetermined time period (e.g., a quarter, a half, or an entire game) of a game session, or any other event. In some cases, the data processing system can determine the predetermined event occurred based on a sequence of events (e.g., determine the occurrence of the predetermined event responsive to identify multiple identifications in a row that correspond to a criterion that indicates, upon being satisfied, the predetermined event occurred). The data processing system can determine the occurrence of such a predetermined event responsive to identifying such an identification from a message that contains the identification for the game session. The data processing system can generate the media content item in response determining the occurrence of a predetermined event. The data processing system may perform any of the steps of the method 200 in response to determining the occurrence of the predetermined event.

Figure 3:
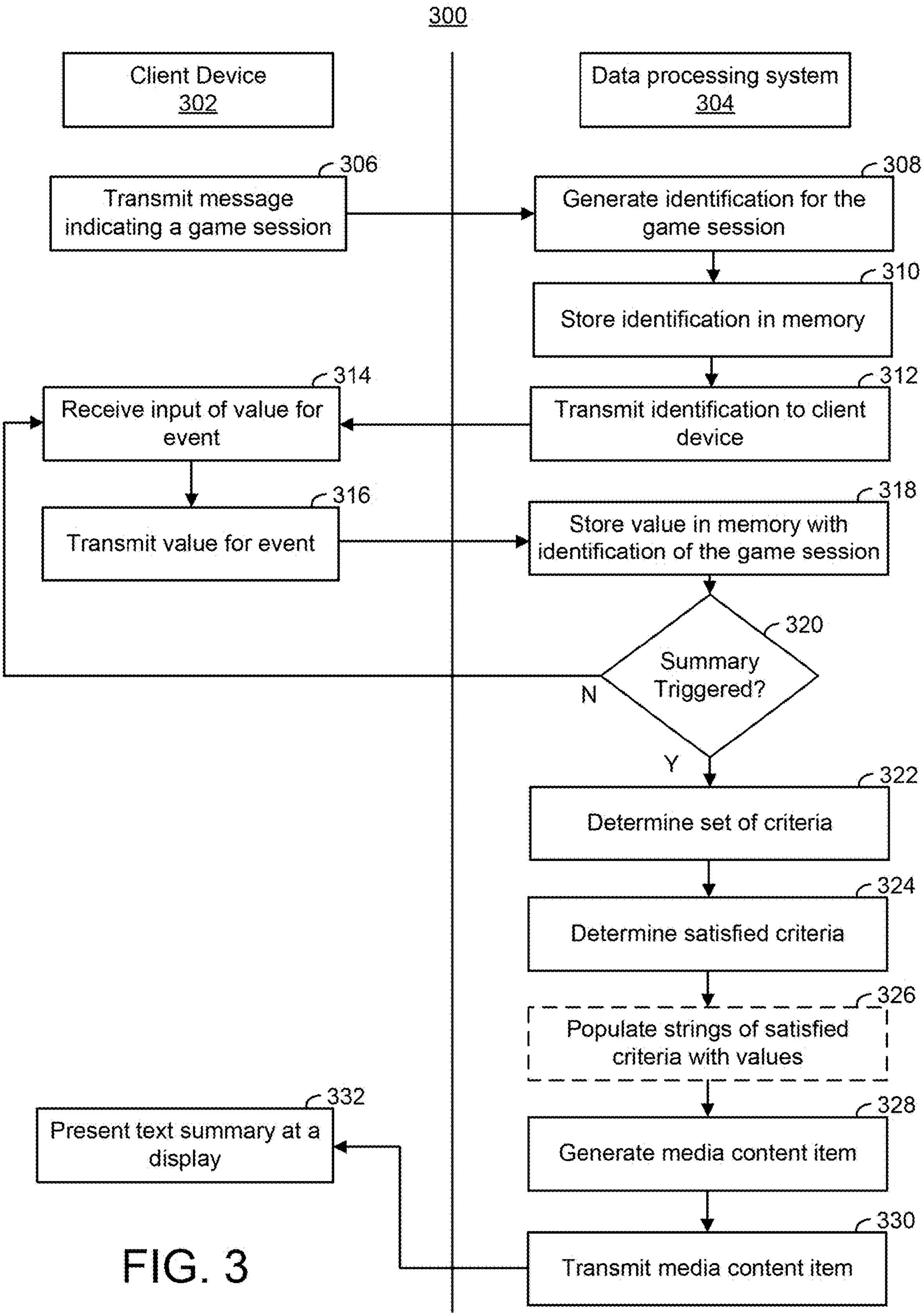
FIG. 3 is a flow chart of an implementation of a method for automatic media generation for game sessions, according to some implementations.

FIG. 3 is a flow chart of an implementation of a method 300 for automatic generation of media content items for game sessions, according to some implementations. The method 300 may be performed by individual devices within a natural language processing system or any other content generation system. For example, the method 200 may be performed by a client device 302 and a data processing system 304. The client device 302 and the data processing system 304 can be the same as or similar to the client device 104 and the automatic media generator 102, shown and described with reference to FIG. 1. The method 300 may include any number of steps and the steps may be performed in any order. The data processing system can perform the method 300 as a part of the method 200.

At step 306, the client device 302 can transmit a message to the data processing system 304. The message can indicate that a game session has begun or is starting. At step 308, the data processing system 304 can generate an identification for the game session. At step 310, the data processing system 304 can store the identification for the game session in memory. The data processing system 304 can store the identification for the game session in a record in memory. At step 312, the data processing system 304 can transmit the identification for the game session to the client device 302. The client device 302 can receive the identification for the game session and store the identification for the game session in memory. At step 314, the client device 302 can receive an input value for an event. The event may be an event that occurred within the game session. The input value may be an identification of the event and/or a statistic that corresponds to the event. At step 316, the client device 302 can transmit the input value for the event to the data processing system 304. The client device 302 can transmit the input value to the data processing system 304 in a message that contains the identification for the game session. At step 318, the data processing system 304 can store the value in memory. The data processing system 304 can store the value in the record that contains the same identification for the game session. At step 320, the data processing system 304 can determine whether a predetermined event occurred that corresponds to a media content item for the game session to be generated. The data processing system 304 can compare the received value for the event to values of one or more predetermined events that the data processing system 304 has stored in memory. Responsive to determining there is not a match, the method can return to the step 314. The client device 302 and the data processing system 304 can respectively perform the steps 314-320 until the data processing system 304 determines a predetermined event occurred.

Responsive to identifying a match between a value received from the client device 302 and a value that corresponds to a predetermined event (e.g., determining a predetermined occurred), at step 322, the data processing system 304 can determine a set of criteria. The data processing system 304 can determine the set of criteria based on characteristics of individuals participating in the game session. The data processing system 304 can identify such characteristics from the record for the game session (e.g., the data processing system 304 can receive the characteristics from the client device 302 and store the characteristics in the record) or directly from a message from the client device 302. In some cases, the data processing system 304 can identify the characteristics in the same message as the message that the data processing system 304 retrieved a value to determine the predetermined event. The data processing system 304 can determine or calculate a set of criteria based on the characteristics. Each criterion of the set of criteria can correspond to a media segment (e.g., a text string, video data, and/or audio data).

At step 324, the data processing system 304 can determine which of the set of criteria is satisfied. The data processing system 304 can retrieve values from the record for the game session and compare the retrieved values to the set of criteria. Based on the comparison, the data processing system 304 can identify or determine criteria that are satisfied. The data processing system 304 can identify the media segments that correspond with the satisfied criteria.

At step 326, in cases in which the media segments include one or more text strings, the data processing system 304 can populate one or more of the strings that correspond with the satisfied criteria. The data processing system 304 can identify strings of the media segments and identify the type of data that corresponds to the different populatable portions. The data processing system 304 can retrieve the identified type of data from the record for the game session and insert or otherwise populate the populatable portions with the corresponding retrieved data. At step 328, the data processing system 304 can generate a media content item. The data processing system 304 can generate the media content item based on the media segments that correspond to populated portions and/or any other media segments that correspond with satisfied criteria. The data processing system 304 can concatenate, append, merge, stitch, or join such media segments along to generate the media content item. At step 330, the data processing system 304 can transmit the media content item to the client device 302. At step 332, the client device 302 can present or display the media content item on a display of or user interface of the client device 302.

Figure 4:
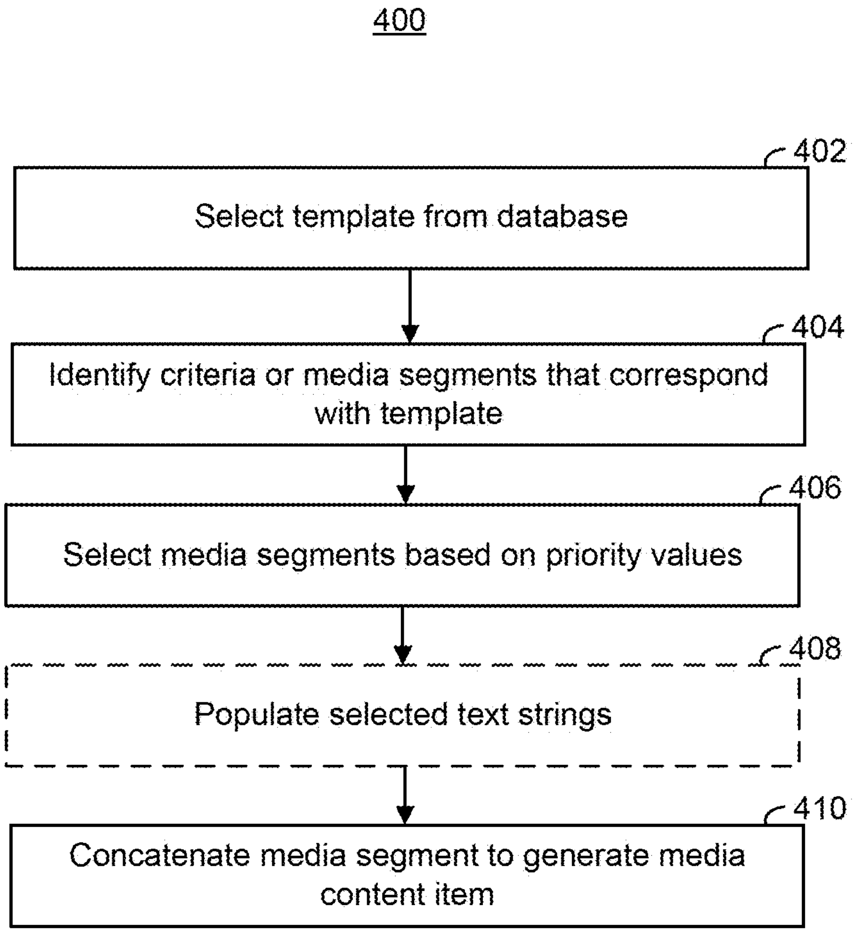
FIG. 4 is a flow chart of an implementation of a method for automatic media generation for game sessions, according to some implementations.

FIG. 4 is a flow chart of an implementation of a method 400 for automatic generation of media content items of game sessions, according to some implementations. The method 400 may be performed by individual devices within a natural language processing system or another media generation system. For example, the method 400 may be performed by a data processing system, such as the automatic media generator 102, shown and described with reference to FIG. 1. The method 400 may include any number of steps and the steps may be performed in any order. The data processing system may perform the method 400 to automatically generate media content items for game sessions. The data processing system may perform the method 400 as a part of one or more of the steps 204-210 of the method 200 or 320-328 of the method 300.

At step 402, the data processing system can select a template from a database. The database can include multiple templates. The data processing system can select the template to use to generate a media content item for a game session. The template can indicate an order of different categories of media segments to include in the media content item. The data processing system can select the template pseudo-randomly from the database. Accordingly, the data processing system may select different templates over time for variation between the media content items that the data processing system generates.

At step 404, the data processing system can identify criteria or media segments that correspond with the template. The data processing system can identify the criteria or media segments that correspond with the template based on identifications of categories that are stored with the criteria or the media segments. In some embodiments, the data processing system may only identify criteria or media segments that the data processing system has determined to be satisfied based on data that corresponds to events of the game session.

At step 406, the data processing system can select media segments based on priority values of the media segments or criteria. For example, each of the identified media segments can be stored with a priority value. The template can indicate a number of each category of media segments to include in the media content item. The data processing system can identify the number of media segments for each category that have the highest priority value of the identified media segments. For instance, the template can indicate to include two media segments of a first category of media segments, four media segments of a second category of media segments, and three media segments of a third category. The data processing system can identify and select the two media segments of the first category that have the highest priority value of media segments associated with the first category and associated with satisfied criteria, four media segments of the second category that have the highest priority value of media segments associated with the second category and associated with satisfied criteria, and three media segments of the third category that have the highest priority value of media segments associated with the third category and associated with satisfied criteria.

At step 408, in cases in which the media segments include strings, the data processing system can populate the selected media segments. The data processing system can populate portions of the media segments that can be populated with data or values of that correspond to events of the game session. The data processing system can determine or identify the types of data to include in the portions of the media segments. The data processing system can insert or populate the portions of the media segments with the respective types of data from the record for the game session.

At step 410, the data processing system can concatenate the media segments. The data processing system can concatenate or append the media segments that correspond to satisfied criteria and that were selected based on the selected template to generate the media content item. In some cases, the data processing system can concatenate, stitch, or append the populated media segments with other media segments that are not populatable but that the data processing system identified based on the template. The data processing system can concatenate the media segments in the order specified by the template.

In some embodiments, the data processing system can vary the media content items (e.g., vary the media segments of the media content item) that the data processing system generates for the same team over time. For example, the data processing system can generate a first media content item for a first game session in which a team participated. The data processing system can then generate a second media content item for a second game session in which the team participated. In generating the second media content item, the data processing system can identify the types of data that were used to select media segments to use to generate the first media content item. The data processing system can identify different types of data that satisfy criteria for the second media content item and select media segments that correspond with the satisfied criteria. Because different types of data are used to generate the second media content item than the first media content item, the second media content item may inherently differ from the first media content item.

In another example, the data processing system can identify the media segments that were used to generate the first media content item and select different media segments to use to generate the second media content item. The data processing system can do so, for example, by identifying media segments with the highest priority values for the different categories of a template that correspond with satisfied criteria for the second game session and that were not used to generate the first media content item. The different media segments may be different from the media segments of the first media content in one or more of content, grammar, syntax, format, etc. The data processing system can generate the second media content item from the selected media segments. The data processing system can similarly generate any number of media segments to avoid reusing media segments from the immediately previous media content item and/or any defined number of previous media content items to vary the content of the media content items.

Figure 5:
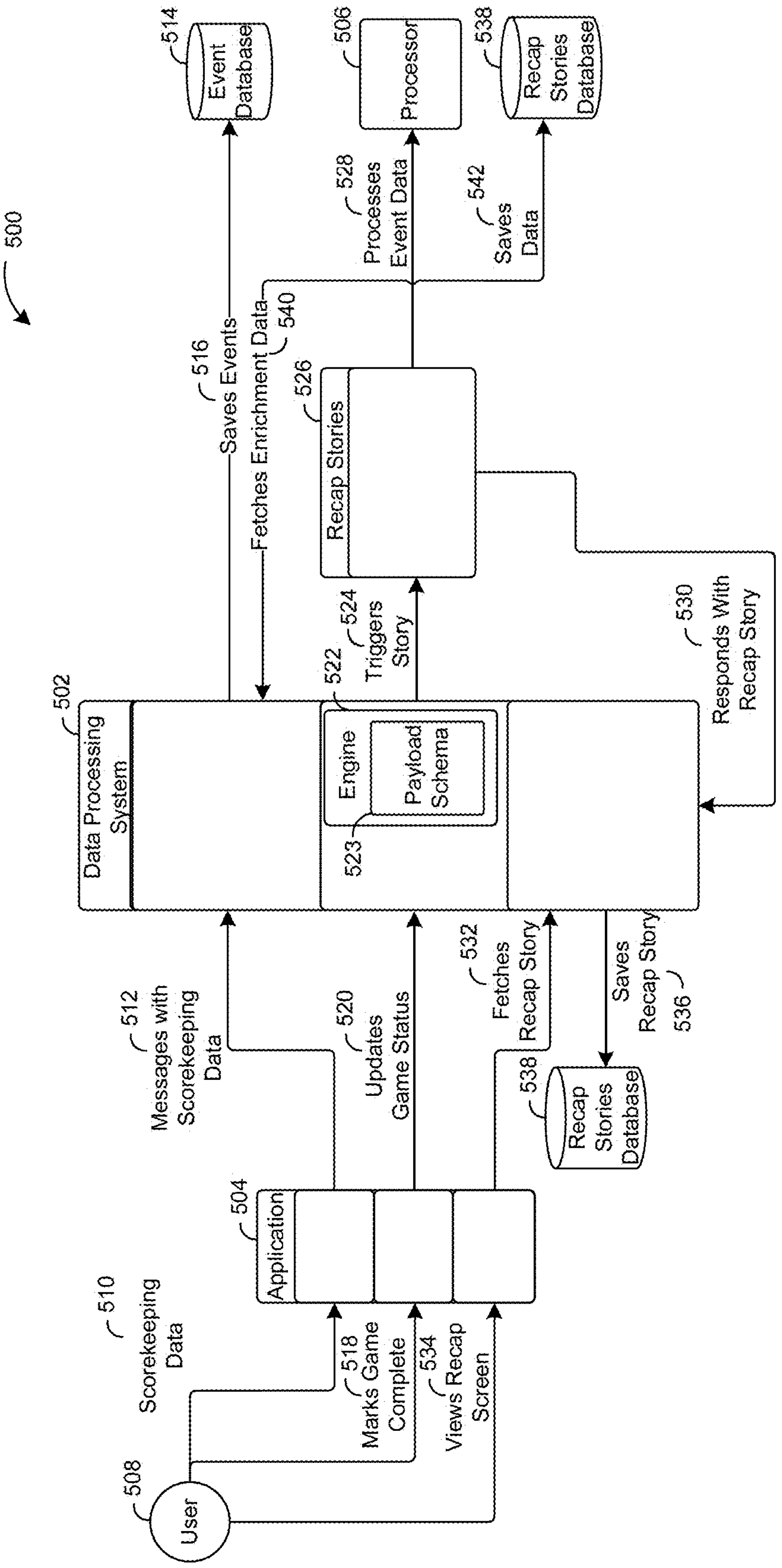
FIG. 5 is a block diagram of a system for automatic media generation for game sessions, according to some implementations.

FIG. 5 is a block diagram of a system 500 for automatic media content item generation for game sessions, according to some implementations. The system 500 can include a data processing system 502, an application 504, and a processor 506. The data processing system can be the same as or similar to the automatic media generator 102. The application 504 can be an application executed by a client device (e.g., the client device 104). The processor 506 can be a processor external to or a part of the data processing system 502. A user 508 can access the application 504 through an input/output device (e.g., a mouse, keyboard, and/or touchscreen) of or connected to the client device executing the application 504.

The user 508 can input scorekeeping data 510 into the application 504. The scorekeeping data 510 can be or include values or identifications of events that occur during or over the course of a game session. The application 504 can receive the scorekeeping data 510 and transmit the scorekeeping data 510 to the data processing system 502 in messages 512. The data processing system 502 can receive the messages and store the data in an event database 514 as individual events 516 that each correspond to a different message the data processing system 502 receives from the application 504.

The user 508 can provide an input 518 to the application 504 that marks the ending of the game session. Responsive to receiving the input 518, the application 504 can transmit an indication 520 of the input 518 to the data processing system 502. The indication 520 can update the status of the game session to be an ending of the game session. An engine 522 of the data processing system 502 can execute a payload schema 523 to trigger 524 generation of a story (e.g., a media content item) 526 of the game session. The processor 506 can process event data 528 of the game session using the natural language processing techniques and/or other processing techniques described herein to generate the story 526. The processor 506 can transmit 530 the story 526 to the data processing system 502. The application 504 can fetch 532 the story 526 and display the story 526 at a user interface of the client device executing the application 504. The data processing system 502 can save (e.g., store) 536 the story 526 in a recap stories database 538.

In some cases, subsequent to saving the story in the recap stories database 538, the data processing system can use the story to enrich 540 the data that the data processing system 502 uses to generate a subsequent story (e.g., a subsequent story for another game session by one of the same teams of the game session). The data processing system 502 can save 542 data that was used to generate the story 526 in the recap stories database 538 and later retrieve the data for the story 526 to use to generate a story for another game session. In doing so, the data processing system 502 may be able to identify stories regarding consecutive games such as a player that scores 20 points multiple games in a row or a winning streak of a team that spans multiple games.

FIG. 6 depicts an example text summary 600 generated by a system for media generation, according to some implementations. The text summary 600 can be generated by a data processing system (e.g., the automatic media generator 102). Each sentence of the text summary 600 can correspond to satisfied criteria for a game session.

A computer implementing the systems and methods described herein can generate a media content item (e.g., a single media content item) for multiple game sessions. For example, the computer can receive messages for different game sessions over time. The game sessions may correspond with different competitions, organizations, and/or teams. The messages may include timestamps indicating when the game sessions occurred and/or when the messages were sent. The computer can store event data that the computer retrieves from the messages in records for the game sessions for which the messages were transmitted. The event data can correspond to events or other statistics for the game sessions.

The computer can generate a media content item (e.g., a text summary) of game sessions that occurred within a set time period. The computer can do so by retrieving stored event data in the records that contain timestamps within the set time period. The computer can compare the event data with stored criteria. In some embodiments, the computer can determine the criteria to compare with the event data based on characteristics of the participants of the game sessions, as described herein. The criteria can correspond with different media segments (e.g., text segments, video clips, audio clips, etc.). The computer can determine criteria that is satisfied by the retrieved data. The computer can identify and/or select media segments that correspond with the satisfied criteria. The computer can generate a media content item from the selected media segments. The computer can transmit the media content item to a client device. The client device can display or otherwise play the media content item. In this way, the computer can use natural language processing techniques to generate individual custom media content items for multiple game sessions.

Figure 7:
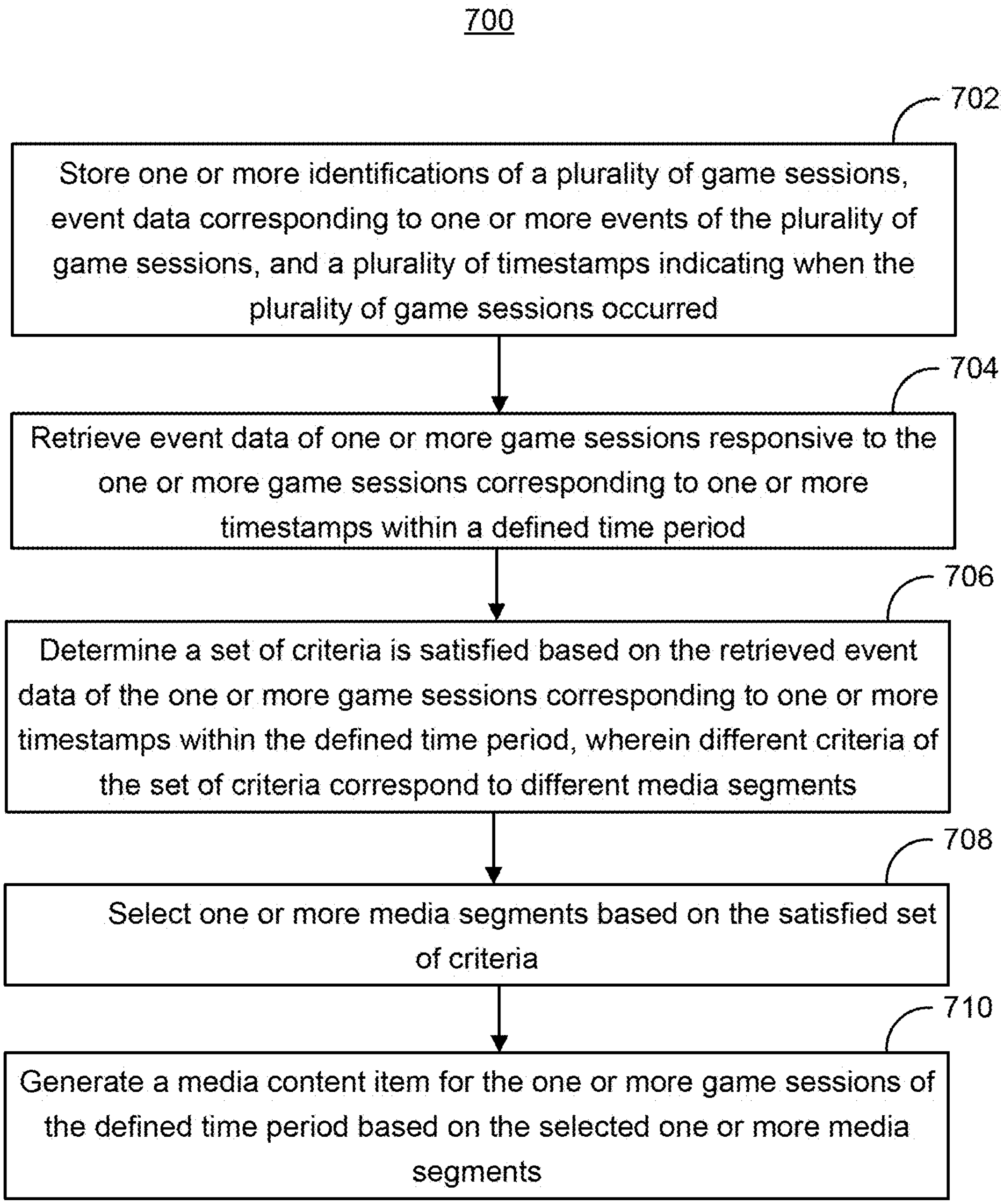
FIG. 7 is a flow chart of an implementation of a method for automatic media generation for multiple game sessions of a time period, according to some implementations.

FIG. 7 is a flow chart of an implementation of a method 700 for multiple game sessions of a time period, according to some implementations. The method 700 may be performed by individual devices within a natural language processing system. For example, the method 700 may be performed by a data processing system, such as the automatic media generator 102, shown and described with reference to FIG. 1. The method 700 may include any number of steps and the steps may be performed in any order. The data processing system may perform the method 700 to automatically generate individual media content items for multiple game sessions of a time period (e.g., a defined time period). The data processing system may generate the media content items by retrieving and storing data of events (e.g., event data) that occur during different game sessions over time in a database. The data processing system can query the database for event data of game sessions that occurred within a defined time period. The data processing system can aggregate the event data of the game sessions within the defined time period together. The data processing system can determine a set of criteria is satisfied based on the aggregated event data. The data processing system can select media segments based on the criteria that was satisfied. The data processing system can generate a media content item (e.g., a text summary) based on the selected media segments. Accordingly, the data processing system may perform a method of natural language processing or media generation to generate text summaries or other media content items for multiple game sessions that occurred within a defined time period.

At step 702, the data processing system may store data for a plurality of game sessions in memory. The data processing system may do so, for example, by storing identifications of a plurality of game sessions, event data corresponding to one or more events that occurred in the individual game sessions, and timestamps indicating when the individual game sessions occurred. For example, the data processing system can store identifications for game sessions in memory in response to receiving indications of the game sessions (e.g., indicating the beginnings of the game sessions) from different client devices. The data processing system can receive the identifications for the game sessions from the client devices and generate the identifications for the game sessions. The data processing system can generate the identifications for the game sessions by using a random number generation technique or sequentially based on identifications the data processing system generated for previous game sessions (e.g., previous game sessions of the same type, such as the same sport or activity). In some cases, the data processing system can also receive characteristics of individuals participating in the game session from a client device. The data processing system can store the identification for the game session and/or the characteristics in memory, such as in a record in a database. The data processing system can transmit the identification for the game session to the client device.

Over the course of the game sessions, the data processing system can receive messages from the client devices. Each message can include the identification for the game session for which the message is being generated and event data that corresponds to events that occurred during the game session (e.g., statistics for individual players participating in the game session, statistics for one or more of the teams participating in the game session, the occurrence of defined events of the game session (e.g., end of a defined time period), etc.).

The data processing system can receive each message. The data processing system can identify or extract the data from the messages and identify the identification for the game session for which the data was generated from each message. For each message, the data processing system can compare the identifications for the game sessions in the messages with identifications for game sessions in memory. The data processing system can identify records that include a matching identifications to the identifications for the game sessions in the messages. The data processing system can store the data that corresponds to events in the messages in the records that contain the matching identifications for the game sessions.

The data processing system can also store timestamps that indicate when the different game sessions occurred. For example, the data processing system can receive a message indicating a new game session (e.g., a game session for which the data processing system had not previously generated a record to store data) from a client device. The message can include a timestamp. The timestamp can be the time of the beginning of the game session or a time that the client device transmitted the message, for example. The data processing system can generate a record in response to receiving the message and store the timestamp in the record. The data processing system can similarly generate records for game sessions and store timestamps in the records for any number of game sessions. Accordingly, the data processing system can keep track of the game sessions for which the data processing system receives data and when the game sessions began or otherwise occurred.

In some embodiments, the data processing system can include identifications of competitions in the records for the game sessions. The competitions can be any form of competition in which players or participants can partake that includes one or more game sessions. For example, a competition can be a tournament, a season, a double-header, a friendly, etc. In one example, the data processing system can receive a message indicating a new game session (e.g., a game session for which the data processing system had not previously generated a record to store data) from a client device. The message can include an identification of a competition. The identification of the competition can indicate a specific competition of which the game session is a part. The data processing system can generate a record in response to receiving the message and store the identification of the competition in the record. The data processing system can similarly generate records for game sessions and store identifications of competitions in the records for any number of game sessions and/or competitions. Accordingly, the data processing system can maintain a record of game sessions that occur in different competitions and separate the event data of game sessions of the different competitions.

In some embodiments, the data processing system can include identifications of organizations in the records for the game sessions. Organizations can be or include any group entity that hosts or sponsors different competitions and/or game sessions. For example, an organization can host a soccer tournament, a soccer season, and/or a soccer friendly in which different teams participate in game sessions. For example, the data processing system can receive a message indicating a new game session (e.g., a game session for which the data processing system had not previously generated a record to store data) from a client device. The message can include an identification of an organization. The identification of the organization can indicate a specific organization that is hosting the game session. The data processing system can generate a record in response to receiving the message and store the identification of the organization in the record. The data processing system can similarly generate records for game sessions and store identifications of organizations in the records for any number of game sessions and/or organizations. Accordingly, the data processing system can maintain a record of game sessions that occur under different organizations and separate the event data of game sessions between different organizations.

In some embodiments, the data processing system can include identifications of organizations, competitions, and/or timestamps in individual records stored in memory. For example, the data processing system can receive a message indicating a new game session (e.g., a game session for which the data processing system had not previously generated a record to store data) from a client device. The message can include an identification of an organization, an identification of a competition, and/or a timestamp. The data processing system can generate a record in response to receiving the message and store the identification of the organization, the identification of the competition, and/or the timestamp in the record. The data processing system can similarly generate records for game sessions and store such data in the records for any number of game sessions, competitions, and/or organizations. Accordingly, the data processing system can maintain a record of game sessions that occur under different organizations and/or competitions and separate the event data of game sessions between the different organizations and/or competitions.

At step 704, the data processing system can retrieve event data of one or more game sessions from memory. The data processing system can retrieve the event data from the one or more game sessions responsive to the one or more game sessions corresponding to one or more timestamps within a defined time period. For example, the data processing system can query memory for records that contain timestamps that are within a defined time period. The defined time period can be a specific day, a specific month, a specific year, or any other time period. The data processing system can identify any records that contain a timestamp within the defined time period. The data processing system can retrieve event data from the identified records.

In some embodiments, the data processing system can retrieve event data of game sessions responsive to the one or more game sessions corresponding to a specific organization and/or competition. For example, the data processing system can query memory for records that contain an identification of a specific organization. The organization may have hosted a season of game sessions for a particular sport. The data processing system can identify any records that contain the identification of the specific organization. The data processing system can retrieve event data from the identified records.

In another example, the data processing system can query memory for records that contain an identification of a specific competition. The competition may be a tournament or season of game sessions. The data processing system can identify any records that contain the identification of the specific competition. The data processing system can retrieve event data from the identified records.

In another example, the data processing system can query memory for records that contain an identification of a specific organization, an identification of a specific competition, and/or a timestamp within a defined time period. For example, the data processing system can use a look-up technique using each of an identification of an organization, an identification of a competition, and/or a defined time period to search memory. In doing so, the data processing system can identify one or more records that contain each of the identification of the organization, the identification of the competition, and/or a timestamp within the defined time period. The data processing system can retrieve event data from the identified records.

The data processing system can retrieve event data from the identified records responsive to detecting an end to the defined time period. For example, the data processing system can be configured to periodically generate media content items (e.g., text summaries or video clips) for game sessions that have occurred within defined time periods. The data processing system can maintain an internal clock and detect an end to the defined time period based on a time or value of the internal clock. In doing so, the data processing system can retrieve data from records with timestamps within a defined time period that ends at the time at which the data processing system is generating a summary and begins at a time a defined length of time before the time at which the data processing system is generating the media content item (e.g., the time at which the data processing system previously generated a media content item). The data processing system can query memory and identify records that contain timestamps within the defined time period. The data processing system can retrieve data from the identified records. The data processing system can perform such queries for different competitions and/or organizations (e.g., perform such periodic queries with identifications of competitions and/or organizations) and retrieve data for the different competitions and/or organizations. The data processing system can periodically perform such queries after a set duration of time.

In some embodiments, instead of retrieving data for specific time periods, the data processing system can retrieve data for specific competitions and/or organizations. For example, the data processing system can query memory and identify records that contain an identification of a competition and/or an organization. The data processing system can retrieve data from the identified records. The data processing system can perform such queries for different competitions and/or organizations (e.g., perform such periodic queries with identifications of competitions and/or organizations) and retrieve data for the different competitions and/or organizations without regard to any timestamps on the record. The data processing system can perform such queries, for example, upon receiving an input or otherwise determining that the competition has ended or the competition for the organization has ended.

In some embodiments, the data processing system can retrieve data for specific game sessions. For example, the data processing system can query memory and identify records that contain identifications of specific game sessions. The data processing system can retrieve data from the identified records. The data processing system can perform such queries, for example, upon receiving an input indicating to generate a media content item for the specific game session.

In some embodiments, the data processing system can retrieve records from memory for individual teams. For example, when querying memory for records, in addition to or instead of any of the data as described above, the data processing system can query the memory for records that contain an identification of a team. The data processing system can retrieve data from the records that contain an identification of the team. The data processing system can perform such queries for different competitions, time periods, and/or organizations. The data processing system can perform such queries, for example, upon receiving an input.

In some embodiments, the data processing system can retrieve data from records for a team in response to receiving a request for a media content item for a team. For example, the data processing system can receive a request for a media content item for team A that summarizes game sessions team A participated in for a particular day, for a tournament, and/or under an organization. The data processing system can retrieve any records from memory that satisfy this criteria and retrieve data from the retrieved records. The data processing system can use the retrieved data to generate a media content item as requested by the client device.

The data processing system can query memory for records responsive to any condition being satisfied. For example, the data processing system can query memory at set time intervals, responsive to a user input, responsive to a game session ending (e.g., the last game session of a competition), etc. The data processing system can perform such queries for one or more competitions, time periods, and/or organizations.

At step 706, the data processing system can determine that a set of criteria is satisfied. The set of criteria can be or include one or more criteria similar to the criteria described above that can be satisfied based on event data indicating the criteria is satisfied. The data processing system can determine the set of criteria is satisfied by comparing the event data (e.g., values of the event data) that corresponds to events of the game sessions of the retrieved data to criteria stored in a database (e.g., the database in which the records are stored or a different database). Based on the comparison, the data processing system can identify which of the criteria is satisfied to determine the set of criteria that is satisfied.

The different criteria of the set of criteria (e.g., the set of satisfied criteria) can correspond to different media segments. For example, each criterion of the set of criteria can have a stored association with a media segment in the database. One or more of such media segments (e.g., strings) can include portions that can be populated with values (e.g., names, words, and/or numerical values). Such media segments can be populated and/or used to generate media content items.

In some embodiments, the data processing system can use aggregated data from the retrieved records to determine the set of criteria is satisfied. In doing so, the data processing system can aggregate data that the data processing system retrieved from multiple records. For example, the data processing system can retrieve event data of multiple game sessions of a tournament that occurred during a day. The data processing system can combine the event data such as by indicating when the same team won multiple games in a row or a particular player on a team had a batting average across each game the player played that day. The data processing system can combine the event data across records to generate aggregated data. The data processing system can compare the aggregated data to criteria to identify a set of criteria that is satisfied based on the aggregated data.

In some embodiments, the data processing system can aggregate data for individual teams. For example, the data processing system can identify different types of data that correspond to specific teams from the collected data (e.g., points scored in individual games, number of games sessions won, number of game sessions lost, number of runs scored, number made shots, etc.). The data processing system can sum or aggregate data of the same type between the different game sessions to generate aggregated data for the team. The data processing system can aggregate any number of types of data for a team. The data processing system can compare the aggregated data with criteria in memory to determine satisfied criteria for the team. In some embodiments, the data processing system can aggregate the data for the team for which the data processing system is generating the media content item.

In some embodiments, the data processing system can aggregate data for individual players (e.g., participants in the game sessions). For example, the data processing system can identify data that corresponds to individual players from the collected data. The data processing system can identify data of any type for the player similar to the data identified for the team as described above. The data processing system can sum or aggregate statistics of the same type between the different game sessions for the individual players to generate aggregated data for the individual players. The data processing system can aggregate any number of types of data for any number of individual players. The data processing system can compare the aggregated data with criteria in memory to determine satisfied criteria for the players.

The criteria that can be satisfied based on aggregated data (e.g., event data of multiple game sessions) can be different from the criteria that can be satisfied based on unaggregated data of a single game session. For example, criteria that can be satisfied based on aggregated data can be satisfied for cross-game session events, such as a player hits a home run two days or games in a row or a team wins three games in a row. Examples of criteria that can be satisfied based on unaggregated data of individual game sessions can be or include a player scored a number of points above a threshold for a game or a player hit a game winning shot at the buzzer. Criteria in both categories can be satisfied based on any type or amount of data.

In determining the set of criteria that is satisfied, the data processing system may first determine criteria to compare with the retrieved data. The data processing system can do so, for example, based on characteristics of the participants of the game sessions in the manner as described above. The data processing system can select and/or generate different criteria (e.g., thresholds) based on characteristics of the participants of the game sessions and compare the aggregated and/or unaggregated data with the satisfied criteria to determine the set of satisfied criteria.

At step 708, the data processing system can select one or more media segments based on the satisfied set of criteria. The data processing system can select the one or more media segments based on the one or media segments being associated with the set of satisfied criteria. For example, responsive to determining the set of satisfied criteria, the data processing system can identify the media segments that are associated with the set of satisfied criteria. The data processing system can select the identified media segments to use to generate a media content item.

The data processing system can populate the media segments that correspond with the satisfied criteria. The data processing system can populate portions (e.g., populatable portions) of the media segments (e.g., strings) with values that correspond to portions of the data in the records for the game sessions. For example, a media segment may include a populatable portion that corresponds to a name of an individual and a populatable portion that corresponds to an amount of points the named individual scored over multiple game sessions. The data processing system can retrieve a value of a name of a player and a value indicating the amount of points the player scored over the multiple game sessions and populate the respective populatable portions in the media segment. In another example, a media segment may include a populatable portion that corresponds to name of a team and a populatable portion that corresponds to a number of wins the team has for a defined time period and/or competition. The data processing system can retrieve a value of a name of the team and a value indicating the number of wins the team had during the defined time period and/or competition. The data processing system may similarly populate any number of media segments from the media segments that correspond with the satisfied criteria of the set of criteria.

The data processing system can generate the media content item from media segments that correspond within individual game sessions of a time period or otherwise a set of game sessions for which the data processing system is generating the media content item. For example, in addition to or instead of comparing aggregated data to criteria to determine the set of satisfied criteria, the data processing system can compare unaggregated data of individual game sessions to the criteria (e.g., to criteria that is specific to event data of individual game sessions). In doing so, the data processing system can identify one or more satisfied criteria for each game session. The data processing system can identify media segments that correspond with the satisfied criteria and populate any populatable portions of the media segments as described above.

At step 710, the data processing system can generate a media content item. The data processing system can generate the media content item for the one or more game sessions (e.g., the one or more game sessions of the defined time period for which the data processing system retrieved event data). The data processing system can generate the media content item based on the selected one or more media segments.

The data processing system can generate the media content item based at least on the populated media segments and/or other media segments associated with satisfied criteria. For example, the data processing system can identify the populated media segments and/or any media segments without populatable portions that correspond to the satisfied criteria of the set of criteria. The data processing system can concatenate, merge, stitch, append, or otherwise join the populated media segments and/or any other media segments that are associated with satisfied criteria together to generate a media content item.

In some embodiments, the data processing system can generate the media content item with a combination of media segments that correspond to aggregated data of multiple game sessions and media segments that correspond to individual game sessions. For example, the data processing system can identify media segments that correspond with criteria of the set of criteria that was satisfied based on unaggregated data and, separately, criteria of the set of criteria that was satisfied based on aggregated data. The data processing system can identify a media segment (e.g., a single media segment) for each game session from which the unaggregated data was collected and include the media segment in the media content item. The data processing system can identify one or more media segments that correspond to criteria that was satisfied based on aggregated data and include the one or more media segments in the media content item. Accordingly, the data processing system can generate the media content item to include a description of what occurred in individual game sessions as well as an overall description of what occurred in the game sessions for which the data processing system queried data.

In some embodiments, the data processing system can generate the media content item for the game sessions in response to detecting a generation condition is satisfied. A generation condition can be satisfied, for example, at the end of a defined time period or time interval (e.g., a day, a week, a month, a year, etc.), at the end of the last game session of a competition, upon receipt of a user input (e.g., a request to generate a media content item), etc. Such generation conditions can correspond to specific competitions and/or organizations (e.g., the data processing system can determine different generation conditions are satisfied for different competitions and/or organizations). In response to a generation condition being satisfied, the data processing system can retrieve data from the records for a media content item and generate the media content item based on the retrieved data. The data processing system may perform any of the steps of the method 700 in response to determining a generation condition is satisfied.

In some embodiments, the data processing system can automatically generate one or more graphics based on retrieved event data. The data processing system can generate the one or more graphics for individual game sessions and/or for multiple game sessions for which the data processing system retrieved data. The graphics can be graphs, charts, or any other illustration of aggregated or unaggregated data. For example, the data processing system can generate a line graph illustrating the number of points a player scored in different games over a defined time period. In another time period, the data processing system can generate a bar graph comparing the amounts of points individual players of the same and/or different teams scored in a game session. The data processing system can generate any type of graphic for any type of data. The data processing system can automatically generate such graphics when generating media content items and/or upon receiving a request for such graphics. The data processing system can include the graphics in the generated media content item and a separate file or record. The data processing system can transmit the graphic to a client device, which can display or present the graphic on a display.

In some embodiments, the data processing system can select the type of graphic(s) to generate and/or the type of data to use based on the type of game session or game sessions for which the graphic is being generated and/or the characteristics of the participants of such game sessions. For example, in some embodiments, the data processing system may generate line graphs for baseball games and/or bar graphs for basketball games. In another example, in some embodiments, the data processing system can generate line graphs for game sessions in which the participants are below the age of 21 and bar graphs for game sessions in which the participants are above the age of 21. The data processing system can determine and/or generate any type of graphics based on any type of game session and/or characteristic of participants of the game sessions.

In some embodiments, the data processing system can use generative machine learning techniques based on the retrieved data and/or media content items that the data processing system generates. For example, the data processing system can store a generative machine learning model (e.g., a neural network, a transformer, etc.) that is configured or has been trained to automatically generate videos or other media content items based on input data and/or media content items. The data processing system can execute the generative machine learning model to generate an image, a video clip, an audio clip, and/or any other type of content based on retrieved data and/or a media content item that the data processing system generated based on retrieved data. In one example, the data processing system can input retrieved data for a single game session into the generative machine learning model. The data processing system can execute the generative machine learning model and the generative machine learning model can output a video depicting a representation of the game session (e.g., an artificial generated video of a game session that would cause the retrieved data to be generated). In some embodiments, the data processing system can execute the generative machine learning model using a media content item that the data processing system generated for the game session as input to generate a video or another media content item. The data processing system can transmit the video or other media content item to a client device. The client device can display or play the video or other media content item. This can be useful, for example, to depict a game session to an individual who could not attend the game session and/or who wishes to watch playback of the game session.

Figure 8:
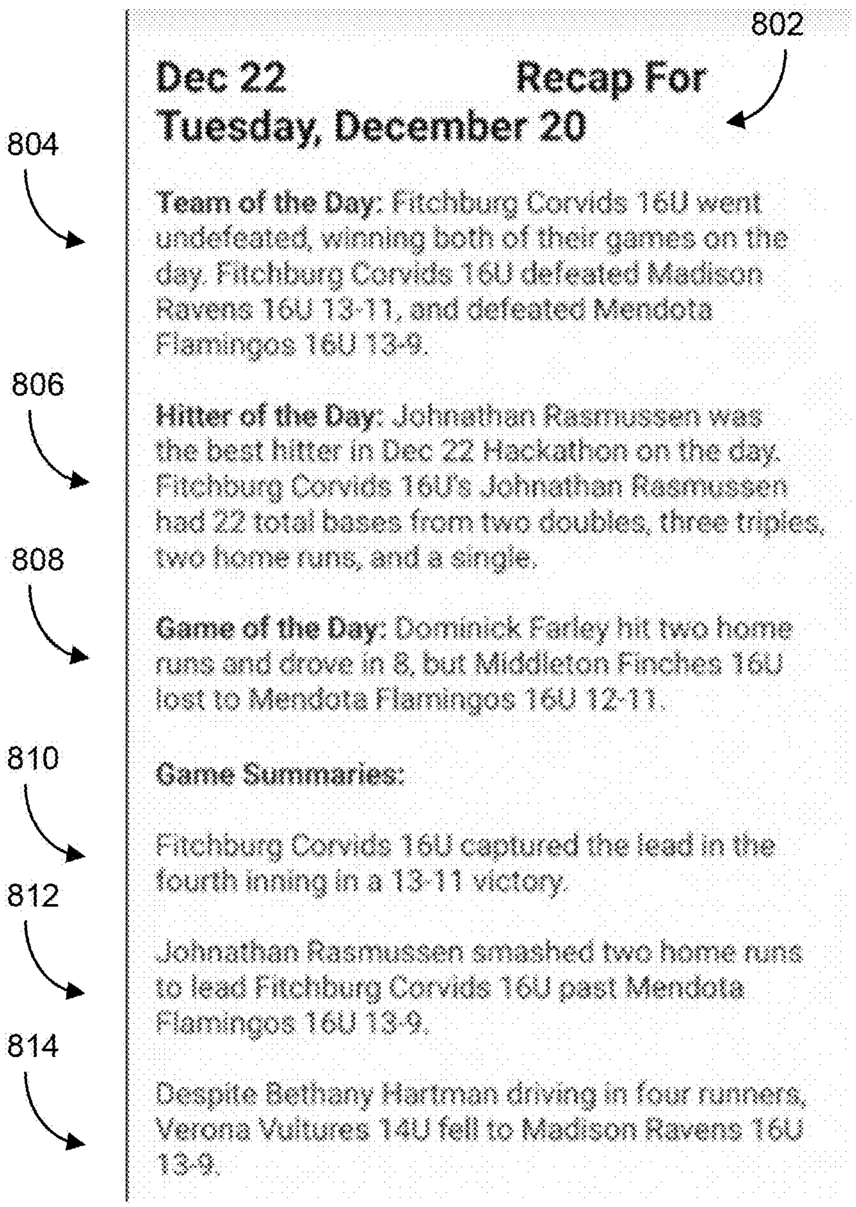
FIG. 8 depicts an example text summary for game sessions occurring within a time period generated by a system for automatic media generation, according to some implementations.

FIG. 8 depicts an example text summary 800 generated by a system for media generation, according to some implementations. The text summary 800 can be generated by a data processing system (e.g., the automatic media generator 102). The text summary 800 can include a summary of game sessions that occurred for a time period 802 (e.g., Tuesday, December 20). The data processing system can generate the text summary 800 responsive to detecting the end of the time period and/or responsive to receiving a request (e.g., a request including the time period 802) from a client device to generate the text summary 800. The data processing system can generate the text summary from event data that the data processing system retrieves from records for game sessions that occurred during the time period 802. The data processing system may compare the retrieved data to criteria in unaggregated and/or aggregated form. The data processing system can identify satisfied criteria based on the comparison and select media segments that correspond with the satisfied criteria. The data processing system can populate the media segments and include the populated media segments in the text summary 800. The data processing system can transmit the text summary 800 to a client device. The client device can receive the text summary 800 and display the text summary 800. The text summary 800 is an example of a media content item that the data processing system can generate. The data processing system can generate any type of media content item.

The data processing system can generate the text summary 800 to include a team identifier portion 804. Team identifier portions of text summaries or other media content items can each include one or more media segments that correspond to specific teams. The data processing system can generate the team identifier portion 804 based on data that the data processing system retrieves from records of game sessions in which a specific team participates. The data processing system can generate team identifier portions responsive to determining data of a particular team compared to data of another or any other team (e.g., any other team of a competition or organization) for which data was retrieved for a time period satisfies a condition. The data processing system can generate the team identifier portion 804 to identify a "team of the day" in Fitchburg Corvids 16U responsive to determining that Fitchburg Corvids won the most games and/or otherwise performed better than other teams from data of game sessions in which Fitchburg Corvids 16U participated for which data was retrieved.

The data processing system can generate the text summary 800 to include a player identifier portion 806. Player identifier portions of text summaries or other media content items can each include one or more media segments that correspond to specific players or participants in game sessions. The data processing system can generate the player identifier portion 806 based on data that the data processing system retrieves from records of game sessions in which a specific player participates. The data processing system can generate player identifier portions responsive to determining data of a particular player compared to data of another or any other player (e.g., any other player of a competition or organization) for which data was retrieved for a time period satisfies a condition (e.g., a player performs the best compared to any other player). The data processing system can generate the player identifier portion 806 to identify a "player of the day" in Johnathan Rasmussen based on the number of hits and bases Johnathan Rasmussen captured in game sessions during the time period 802.

The data processing system can generate the text summary 800 to include a game session identifier portion 808. Game session identifier portions of text summaries or other media content items can each include one or more media segments that correspond to specific game sessions that occurred during the defined time periods for which the media content items are generated. The data processing system can generate the game session identifier portion 808 based on data that the data processing system retrieves from records of game sessions that occurred during the defined time period 802. The data processing system can generate game session identifier portions responsive to determining data of a game session compared to data of another or any other game session (e.g., any other game session of a competition or organization) for which data was retrieved for a time period satisfies a condition (e.g., a game session satisfies specific conditions that indicate the game session was the most exciting compared with other game sessions for the time period). The data processing system can generate the game session identifier portion 808 to identify a "game of the day" in a game session in which a player, Dominick Farley, hit two home runs and drove in 8, but Middleton Finches 16U lost to Mondota Flamingos 16U 12-11. Johnathan Rasmussen based on the number of hits and bases Johnathan Rasmussen captured in game sessions during the time period 802.

The data processing system can generate the text summary 800 to include one or more game session summaries 810, 812, and 814. Game session summary portions of text summaries or other media content items can each include one or more media segments that correspond to specific game sessions that occurred during the defined time periods for which the media content items are generated. The data processing system can generate the game session summaries 810, 812, and 814 based on data the data processing system retrieves from records of game sessions that occurred during the defined time period 802. The data processing system can generate game session summaries based on unaggregated data for the individual game sessions. For example, the data processing system can generate the game session summary 810 based on event data of a first game session that satisfies one or more criteria. The data processing system can generate the game session summary 812 based on event data of a second game session that satisfies one or more criteria. The data processing system can generate the game session summary 814 based on event data of a third game session that satisfies one or more criteria.

The data processing system can generate game session portions of media content items to include a defined number (e.g., one or two) of media segments (e.g., sentences or clips of audio or video). The data processing system can select the media segments a set of media segments that correspond with satisfied criteria based on data of the individual game sessions. The data processing system can select the media segments, for example, by selecting the media segments that correspond with highest priority media segments of the media segments that correspond with satisfied criteria.

A computer implementing the systems and methods described herein can automatically generate media content items including previews of future game sessions between entities. For example, responsive to a request or determining there is an upcoming game session between two entities (e.g., two baseball teams), the computer can retrieve event data of game sessions in which one or both of the entities participated. The computer can implement a template that includes different sections or portions in which to place media segments (e.g., text segments or sentences) to generate a preview of the upcoming game session. Each section can correspond to a different set or subset of criteria that can be satisfied by event data involving one or both of the entities. For example, one section can include criteria that can only be satisfied by event data regarding a single participant from one of the entities and can configured to present media segments of or regarding the single participant. Another section can include criteria that can only be satisfied by event data (e.g., aggregated and/or unaggregated event data) of one of the entities. Another section can include criteria that only be satisfied by event data (e.g., aggregated and/or unaggregated event data) of the other entity of the entities of the future game session. The template can include any number of sections. The computer can identify criteria that is satisfied by event data for each of the sections based on one or more previously performed game sessions and select media segments that correspond to the satisfied criteria. The computer can combine or concatenate the selected media segments into a media content item according to the template. The computer can transmit the media content item to users of one or both of the entities of the future game session. In this way, the computer can generate a media content item previewing the future game session using the natural language processing system described herein.

In some embodiments, the computer can include a variation in media content items that the computer generates for the same entity (e.g., the same team). For example, the computer can avoid including event data for the same participant in the section of the template dedicated to individual participants. The computer can do so by retrieving historical media content item previews, the event data that was used to generate the historical media content item previews, and/or the media segments that were populated to generate the historical media content item previews. The computer can identify the participants identified in any of the retrieved data. The computer can then generate the new media content item previewing the future game session by avoiding including any media segments identifying the identified participants. In another example, the computer can identify the segments and/or criteria that was satisfied and used to generate the historical media content items and use different or other media segments and/or criteria to select media segments to generate the media content item for the future game session. The computer can vary media content items generated for the same entity between game sessions in any way.

Figure 9:
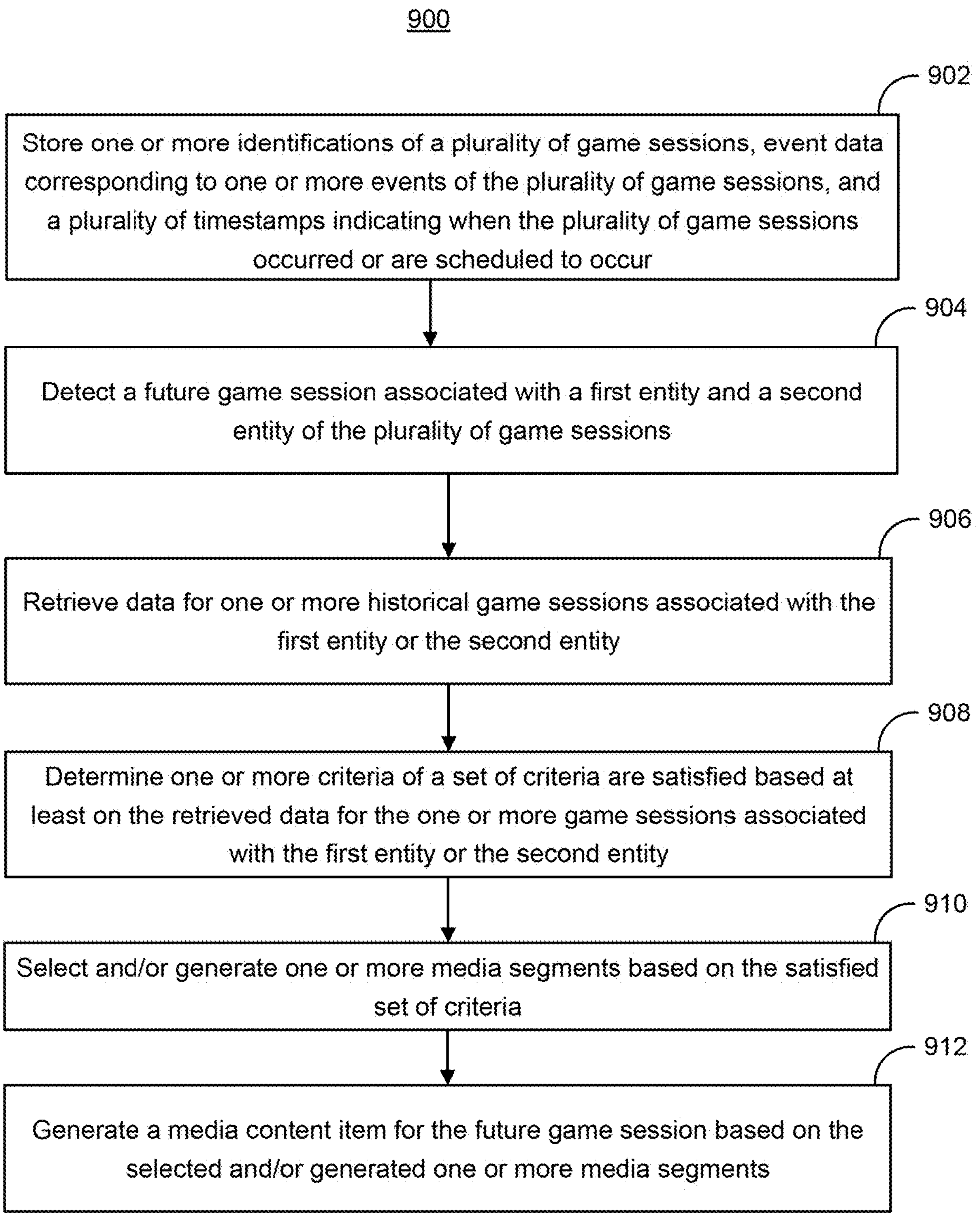
FIG. 9 is a flow chart of an implementation of a method for automatic media generation for a game session preview, according to some implementations.

FIG. 9 is a flow chart of an implementation of a method 900 for automatic media generation for a game session preview, according to some implementations. The method 900 may be performed by individual devices within a natural language processing system. For example, the method 900 may be performed by a data processing system, such as the automatic media generator 102, shown and described with reference to FIG. 1. One or more steps of the method 900 can be similar to or same as corresponding steps (e.g., steps that are performed in the same or a similar manner) described with respect to the method 200, the method 300, the method 400, and/or the method 700. The method 900 may include any number of steps and the steps may be performed in any order. The data processing system may perform the method 900 to automatically and/or preemptively generate game session previews for upcoming game sessions. To do so, the data processing system can monitor an internal clock against timestamps of different future or upcoming game sessions (e.g., timestamps that correspond with identifications of different game sessions) in the future. The data processing system can detect when a current time of the internal clock is within a threshold of a timestamp of a future game session between two different entities (e.g., players, teams, or organizations). Responsive to the detection, the data processing system can initiate generating a preview of the future game. For example, the data processing system can retrieve event data from memory of game sessions in which the two different entities participated. The data processing system can apply a set of criteria to the retrieved event data to determine criteria that are satisfied (e.g., as described above and herein). In some embodiments, the data processing may only retrieve data for a defined number of the most recent game sessions or game sessions that correspond with timestamps within a threshold amount of time of the current time to ensure the media content item is generated using current data. The data processing system can select one or more media segments (e.g., text segments, sentences, video clips, sound clips, etc.) that correspond to the satisfied criteria. The data processing system can concatenate or otherwise combine the one or more media segments into a media content item. The data processing system can transmit the media content item to electronic devices of individuals associated with one or both of the future game session.

For example, at step 902, the data processing system may store data for a plurality of game sessions in memory. The data processing system may do so, for example, by storing identifications of a plurality of game sessions, event data corresponding to one or more events that occurred in the individual game sessions, and timestamps indicating when the individual game sessions occurred (e.g., began) or are scheduled to occur. For example, the data processing system can store identifications for game sessions in memory in response to receiving indications of the game sessions (e.g., indicating the beginnings of the game sessions) from different client devices. The data processing system can receive the identifications for the game sessions from the client devices and generate the identifications for the game sessions. The data processing system can generate the identifications for the game sessions by using a random number generation technique or sequentially based on identifications the data processing system generated for previous game sessions (e.g., previous game sessions of the same type, such as the same sport or activity). In some cases, the data processing system can also receive characteristics of individuals participating in the game session from a client device. The data processing system can store the identification for the game session and/or the characteristics in memory, such as in a record in a database. The data processing system can transmit the identification for the game session to the client device.

Over the course of the game sessions, the data processing system can receive messages from the client devices. Each message can include the identification for the game session for which the message is being generated and event data that corresponds to events that occurred during the game session (e.g., statistics for individual players participating in the game session, statistics for one or more of the teams participating in the game session, the occurrence of defined events of the game session (e.g., end of a defined time period,) etc.).

The data processing system can receive each message. The data processing system can identify or extract the data from the messages and identify the identification for the game session for which the data was generated from each message. For each message, the data processing system can compare the identifications for the game sessions in the messages with identifications for game sessions in memory. The data processing system can identify records that include matching identifications to the identifications for the game sessions in the messages. The data processing system can store the data that corresponds to events in the messages in the records that contain the matching identifications for the game sessions.

The data processing system can store timestamps that indicate when the different game sessions occurred. For example, the data processing system can receive a message indicating a new game session (e.g., a game session for which the data processing system had not previously generated a record to store data) from a client device. The message can include a timestamp. The timestamp can be the time of the beginning of the game session or a time that the client device transmitted the message, for example. The data processing system can generate a record in response to receiving the message and store the timestamp in the record. The data processing system can similarly generate records for game sessions and store timestamps in the records for any number of game sessions. Accordingly, the data processing system can keep track of the game sessions for which the data processing system receives data and when the game sessions began or otherwise occurred.

The data processing system can store timestamps for game sessions that are scheduled to start or begin in the future (e.g., for upcoming game sessions). For example, the data processing system can connect with a computing device (e.g., an administrative computing device) accessed by an administrator or a user. The user or the administrator can provide one or more inputs into the computing device for game sessions. The inputs can include data of schedules for different entities (e.g., schedules for seasons or tournaments). Schedules can include identifications or indications of game sessions and data (e.g., game session data) about the game sessions. The data can include identifications of the entities participating in the respective game sessions, a time (e.g., start time or beginning time) of the respective game sessions, an identification of the competition or league of the respective game sessions, characteristics of the participants of the game session, etc. The user or administrator can input the data on a game-by-game basis, and the computing device can transmit the data to the data processing system for each input, or the user or administrator can input the data for multiple games into a file, and the computing device can transmit the data to the data processing system in the file. The data processing system can receive the data for game sessions and store the data in memory, such as in separate records for each individual game session. The data processing system can store event data for the game sessions in the records for which the game sessions were generated.

At step 904, the data processing system can detect a future game session of the plurality of game sessions. The future game session can be between a first entity (e.g., a first team or participant) and a second entity (e.g., a second team or participant). The data processing system can detect the future game session responsive to determining a current time is within a threshold of a timestamp of the future game session indicating when the future game session is scheduled to occur. For example, the data processing system can maintain an internal clock in memory. The data processing system can increment the internal clock over time. For each increment, or at set intervals of increments (e.g., every five increments), the data processing system can compare a current time of the internal clock to timestamps of game sessions in memory. In doing so, the data processing system may only compare the current time to timestamps of game sessions in the future (e.g., timestamps of game sessions that are scheduled to start after or subsequent to the current time), such as to reduce the computing resources that are required to perform the method 900. For each comparison, the data processing system can determine whether the current time is within a threshold of the timestamp to which the data processing system is comparing the current time. The threshold can be a predetermined threshold or a threshold input by a user or an administrator. The data processing system can iteratively compare the current time of the internal clock to the timestamps of future game sessions in this way until determining or identifying a future game session with an identification stored in memory that corresponds to a timestamp that is within the threshold of the current time.

At step 906, the data processing system can retrieve data (e.g., event data) of one or more game sessions from memory. The data processing system can retrieve the data responsive to detecting the future game session with the identification stored in memory that corresponds to the timestamp that is within the threshold of the current time. The data processing system can retrieve the data from the one or more game sessions responsive to the one or more game sessions corresponding to an identification of one or both of the entities of the detected future game session. For example, the data processing system can query memory for records that contain identifications of one or both of the entities of the detected future game session. The data processing system can identify any records that contain an identification of at least one of the identifications of one or both of the entities. The data processing system can retrieve data from the identified records.

For example, the future game session can be between the first entity and a second entity. The data processing system can identify one or both of the identifications of the first entity or the second entity from the record for the future game session (e.g., the record containing the timestamp for the future game session). The data processing system can use the identification or identifications to query memory or a database containing records of game sessions with timestamps prior to the current time (e.g., timestamps of game sessions that previously occurred) using a look-up technique. Based on the query, the data processing system can identify records in memory for the queried game sessions involving one or both of the first entity and the second entity. The data processing system can retrieve data from the identified records.

The data processing system can query memory for data of the most recent game session between the first entity and the second entity. For example, the data processing system can use the identifications of both of the first entity and the second entity to query memory for records that contain matching identifications. The data processing system can identify one or more records for game sessions between the first and second entities based on the query. The data processing system can identify the timestamps of or that are stored in the identified records. The data processing system can identify the record for the game session that includes the latest or the most recent timestamp compared with the timestamps of any other records of the one or more records. The data processing system can retrieve data from the identified record. The data processing system can retrieve any amount of data using any number of queries.

At step 908, the data processing system can determine that a set of criteria is satisfied. The set of criteria can be or include one or more criteria similar to the criteria described above that can be satisfied based on data for different game sessions. The data processing system can determine the set of criteria is satisfied by comparing the data (e.g., values of the data) that corresponds to events of the game sessions of the retrieved data to criteria stored in a database (e.g., the database in which the records are stored or a different database). Based on the comparison, the data processing system can identify which of the criteria is satisfied to determine the set of criteria that is satisfied.

The different criteria of the set of criteria (e.g., the set of satisfied criteria) can correspond to different media segments. For example, each criterion of the set of criteria can have a stored association with a media segment in the database. One or more of such media segments (e.g., text strings) can include one or more portions that can be populated with values (e.g., names, words, and/or numerical values). Such media segments can be populated and/or used to generate media content items.

In one example, the data processing system can determine at least one criterion of the set of criteria is satisfied based on retrieved data for a previous game session between the entities of the future game session. For example, the data processing system can identify retrieved data from a record for a game session between the first entity and the second entity. The data processing system can compare the retrieved data to one or more criteria that can be satisfied (e.g., only satisfied) based on data from the most recent game session between two entities of an upcoming or future game session. The data processing system can determine a set or subset of the one or more criteria are satisfied based on the data from the most recent game session between the first and second entities. The data processing system can use the identified set or subset of criteria to generate a media content item as described below.

In some embodiments, the data processing system can use aggregated data from the retrieved records to determine one or more criteria of the set of criteria are satisfied. In doing so, the data processing system can aggregate data that the data processing system retrieved from multiple records. For example, the data processing system can identify multiple records of game sessions in which the first entity participated by querying memory using an identifier of the first entity. The data processing system can retrieve data from the identified multiple records. The data processing system can combine or aggregate the retrieved data into aggregated data. In one example, the data processing system can combine the data for the first entity such as by indicating when the same team won multiple games in a row, indicating a win-loss record of the first entity, or indicating that a particular player on a team had a batting average across each game the player played that day. The data processing system can aggregate the retrieved data in any manner using any type of data of the first entity as a whole and/or of individual players or participants of the first entity. The data processing system can compare the aggregated data to one or more criteria that corresponds to aggregated data to identify a set or subset of the one or more criteria that is satisfied.

The criteria that can be satisfied based on aggregated data (e.g., data of multiple game sessions) can be different from the criteria that can be satisfied based on unaggregated data of a single game session. For example, criteria that can be satisfied based on aggregated data can be satisfied for cross-game session events, such as a player hits a home run two days or games in a row or a team wins three games in a row. Examples of criteria that can be satisfied based on unaggregated data of individual game sessions can be or include a player scored a number of points above a threshold for a game or a player hit a game winning shot at the buzzer. Criteria in both categories can be satisfied based on any type or amount of data.

In determining the set of criteria that is satisfied, the data processing system may first determine criteria to compare with the retrieved data. The data processing system can do so, for example, based on characteristics (e.g., age, age range, gender, or experience level), of the participants of the future game session in the same or a similar manner to the manner described above. The data processing system can select and/or generate different criteria (e.g., thresholds) based on characteristics of the participants of the future game session and compare the aggregated and/or unaggregated data with the satisfied criteria to determine the set of satisfied criteria.

The set of criteria can include a plurality of subsets of criteria. Each subset of criteria can correspond to a different section of a media content item template. For example, the data processing system may store a media content item template. The media content item template may identify one or more sections and/or one or more static portions that the data processing system can use to generate media content items. Each section can correspond to a different subset of criteria of the set of criteria. For instance, one section can correspond to criteria that can be satisfied by data of a single most recent game session between the entities of the future game session, another section can correspond to criteria that can be satisfied by data or aggregated data of one or more game sessions involving one entity of the future game session, another section correspond to criteria that can be satisfied by data or aggregated data of one or more game session involving the other entity of the future game session, and another section can correspond to criteria that can be satisfied by data or aggregated data involving a single participant of one of the entities of the future game session. The data processing system can apply the different subsets of criteria to retrieved data of different game sessions that corresponds to the respective subsets of criteria to identify criteria within the subsets that are satisfied. The data processing system can identify the satisfied criteria within the subsets and the corresponding media segments to the satisfied criteria to use to populate sections of the media content item that correspond to the respective subsets of criteria.

At step 910, the data processing system can select and/or generate one or more media segments based on the satisfied set of criteria. The data processing system can select the one or more media segments based on each of the one or media segments being associated with (e.g., having a stored association with) a satisfied criterion. For example, responsive to determining the set of satisfied criteria, the data processing system can identify the media segments that are associated with the set of satisfied criteria. The data processing system can select the identified media segments to use to generate a media content item.

The data processing system can populate the media segments that correspond with the satisfied criteria. The data processing system can populate portions (e.g., populatable portions) of the media segments (e.g., strings) with values that correspond to portions of the data in the records for the game sessions. For example, a media segment may include a populatable portion that corresponds to a name of an individual and a populatable portion that corresponds to an amount of points the named individual scored over multiple game sessions. The data processing system can retrieve a value of a name of a player and a value indicating the amount of points the player scored over the multiple game sessions and populate the respective populatable portions in the media segment. In another example, a media segment may include a populatable portion that corresponds to name of a team and a populatable portion that corresponds to a number of wins the team has for a defined time period and/or competition. The data processing system can retrieve a value of a name of the team and a value indicating the number of wins the team had during the defined time period and/or competition. The data processing system may similarly populate any number of media segments from the media segments that correspond with the satisfied criteria of the set of criteria.

In some cases, the selected media segments can correspond to text indicating a combination of potential data of the future game session and one or more historical game sessions (e.g., game sessions that were previously completed or that have already begun). For example, the data processing system can select a text media segment such as "Pope will look to extend their 14-game hitting streak," based on aggregated data across 13 or 14 game sessions in which Pope secured a hit and has the opportunity in the future game session to extend the streak. In another example the data processing system can select a text media segment such as "Wanneroo Giants (A) will look to add to their 4-game winning streak," based on aggregated data across three or four game sessions in which the Wanneroo Giants (the away team) won three games in a row and have the opportunity in the future game session to extend the winning streak to four games. The data processing system can select text media segments in any manner using any data.

In some embodiments, the data processing system can generate (e.g., automatically generate) the one or more media segments. The data processing system can generate the media segments using a machine learning model (e.g., a generative machine learning model, such as a large language model, a neural network, a transformer model, etc.). The machine learning model may be trained or configured to generate media segment outputs (e.g., text strings, video clips, sound clips, etc.) that describe, depict, or otherwise correspond to sets of data of game sessions. The data processing system can generate the media segments by inputting data that was used to determine the satisfied criteria into the machine learning model. The data processing system can input the data in separate sets of data that each correspond to a different satisfied criterion. The data processing system can execute the machine learning model based on the input data. Based on the execution, the machine learning model can output individual media segments that each correspond to a different set of data that satisfied a criterion.

At step 912, the data processing system can generate a media content item. The data processing system can generate the media content item for the future game session. The data processing system can generate the media content item based on the selected and/or generated one or more media segments.

The data processing system can generate the media content item based at least on the populated media segments, generated media segments, and/or other media segments associated with satisfied criteria. For example, the data processing system can identify the populated media segments and/or any media segments without populatable portions that correspond to the satisfied criteria of the set of criteria. The data processing system can concatenate, merge, stitch, append, or otherwise join the populated media segments and/or any other media segments that are associated with satisfied criteria together to generate a media content item.

The data processing system can generate the media content item by generating text. The data processing system can generate a block of text that contains one or more paragraphs and/or headings between the paragraphs. The data processing system can include a title at the top of the text.

The data processing system can generate the media content item according to a media content item template. The media content item template can include one or more paragraphs or sections that each correspond to a different subset of criteria that can be satisfied by or based on data and correspond to media segments that can be placed within the defined paragraphs or sections of the media content item template. For example, the data processing system can include a preview paragraph or section in the media content. The preview paragraph or section can correspond to criteria that can be satisfied based on (e.g., based only on) aggregated data of the first entity or otherwise the entity of the game session for which the data processing system is generating the media content item. By using (e.g., only using) aggregated data of the first entity, the data processing system can include one or more media segments in the preview paragraph or section that corresponds to the criteria and/or that indicates how the first entity has been performing and/or what to expect in the future game session for which the data processing system is generating the media content item previewing the future game session.

In another example, the data processing system can include a previous game session paragraph or section in the media content item. The previous game session paragraph or section can correspond to criteria that can be satisfied based on (e.g., based only on) data retrieved from the record for the most recent game session between the first entity and the second entity. By using (e.g., only using) data of the most recent game session between the first entity and the second entity, the data processing system can include one or more media segments in the previous game session paragraph or section that indicates events or data regarding the previous game session between the first entity and the second entity.

In another example, the data processing system can include a highlighted participant game session paragraph or section in the media content item. The highlighted participant game session paragraph or section can correspond to criteria that can be satisfied based on (e.g., based only on) data retrieved from the record that involves a particular participant or player of the first entity. For example, the data processing system can retrieve data for player A of the first entity from the most recent game session between the first and second entities and/or one or more (e.g., a defined number or percentage or all of the game sessions) of the game sessions of the first entity in which player A participated or has stored data. The data for player A can be data of events in which player A was involved. The data processing system can compare the retrieved data for player A to a set or subset of criteria for individual participants or players. The data processing system can identify criteria that is satisfied based on the comparison and use media segments (e.g., text segments) that correspond to the satisfied criteria to generate the media content item for the future game session. By using (e.g., only using) data of a particular participant or player, the data processing system can include one or more media segments in the highlighted participant paragraph or section that indicates events or data regarding the player or participant.

In another example, the data processing system can include an informational paragraph or section about the first entity in the media content item. The informational paragraph or section about the first entity can correspond to criteria that can be satisfied based on (e.g., based only on) data retrieved from the record that involves a particular participant or player of the first entity. The informational paragraph or section about the first entity can correspond to criteria that can be satisfied based on (e.g., based only on) aggregated data of the first entity or otherwise the entity of the game session for which the data processing system is generating the media content item. The criteria used to generate the informational paragraph or section about the first entity can differ from the preview paragraph or section because the criteria may correspond to media segments that only describe information regarding the first entity while the criteria for the preview paragraph or section can correspond to text that predicts an impact of aggregated data on the future game session. By using (e.g., only using) aggregated data of the first entity, the data processing system can include one or more media segments in the informational paragraph or section about the first entity that corresponds to the criteria and/or that indicates how the first entity has been performing. The data processing system can similarly generate an information paragraph or section in the media content item about the second entity.

In some embodiments, the data processing system can retrieve data from records for a team in response to receiving a request for a media content item of a preview for a future game session for an entity. For example, the data processing system can receive a request for a media content item for team A that previews a future game session between team A and team B. The data processing system can retrieve records containing data of historical or previous game session in which team A and/or team B participated as described herein, data of a participant of team A or team B, etc., The data processing system can use the retrieved data to generate a media content item comprising a preview for the future game session as requested by the client device. The data processing system can transmit the generated media content item to the requesting client device that requested the preview.

In some embodiments, the data processing system can include one or more headers between the paragraphs of the media content item template. The headers can each be or include a defined media segment or text string. The headers can correspond to the paragraphs or sections below the respective headers. For example, the data processing system can include a "Last Time Out" media segment above the previous game session paragraph or section in the media content item, a "Player Highlight" media segment above the highlighted participant game session paragraph or section, an "About {Entity A}" media segment above the informational paragraph or section about the first entity, and/or an "About {Entity B}" media segment above the informational paragraph or section about the second entity. The data processing system can replace placeholders in the headers for the informational paragraphs, or any other paragraphs or sections, with corresponding values or data (e.g., replace the {Entity A} placeholder with an identification or name of Entity A. The headers can include any type of text or contain any data. The data processing system can generate the media content item by placing the defined headers at locations above the paragraphs or sections of the media content item (e.g., in respective sets of text segments or sentences) that the respective headers define (e.g., between the respective paragraphs or sections of the media content item) and/or placing the paragraphs or sections of the media content item at their locations below the respective headers.

In some embodiments, the data processing system can include a title (e.g., a headline) in the media content item. The data processing system can include the title at the top of the media content item (e.g., above the game preview paragraph or section of the media content item), as may be indicated in the media content item template that the data processing system is using to generate the media content item. The data processing system can generate the title using criteria that is specific to generating titles and/or that only corresponds to media segments for the title. The data processing system can generate the title based on a criterion that is satisfied based on aggregated data for the first entity to give an overview of how the first entity is performing, for example, or based on any other type of collected data (e.g., participant only data and/or data only from a previous game session, such as from the most recent game session in which the first entity participated or the most recent game session in which both the first entity and the second entity participated). The data processing system can determine a criterion is satisfied that corresponds to the title, select a media segment that corresponds to the satisfied criterion, populate the media segment based on data that satisfied the criterion and insert the title in the location for the title as specified in the media content item template.

In some embodiments, the data processing system can generate the media content item based on media content items that the data processing system previously generated for the first entity. For example, the data processing system can query memory of the data processing system based on or using an identifier of the first entity using a look-up technique for one or more historical media content items that the data processing system generated for the first entity. The data processing system can retrieve the historical media content items, data that was used to generate the historical media content items, and/or satisfied criteria that corresponds to the media segments of the media content item. In some cases, the data processing system can only retrieve data of the most recently generated media content item for the first entity. The data processing system can identify one or more participants that are identified in any of the identified data. The data processing system can then generate the media content item for the future game session by including media segments in the media content item that do not include or identify the one or more participants. In doing so, the data processing system can increase the variation between media content items to stop the media content items from becoming stale.

The data processing system can avoid including a participant identified in a historical media content item in one of a few manners. For example, the data processing system can identify the participant from the historical media content item and then not compare data involving the participant or specific to the participant to criteria when determining which criteria is satisfied for media segment selection. Doing so can reduce the processing resources required to generate the media content item because the data processing system performs the comparison operation in fewer cycles. In another example, the data processing system may compare the data involving the participant or that is specific to the participant to criteria to determine satisfied criteria, but may not select any media segments that correspond to criteria satisfied by the data of the participant or that otherwise identify the participant. Thus, the data processing system can increase the participants that are mentioned between media content items that the data processing system generates.

In some embodiments, the data processing system can use generative machine learning techniques based on the retrieved data and/or media content items that the data processing system generates. For example, the data processing system can store a generative machine learning model (e.g., a neural network, a transformer, etc.) that is configured or has been trained to automatically generate videos or other media content items based on input data and/or media content items. The data processing system can execute the generative machine learning model to generate an image, a video clip, an audio clip, text, and/or any other type of content based on retrieved data and/or a media content item that the data processing system generated based on retrieved data. In one example, the data processing system can input retrieved data for a single game session into the generative machine learning model. The data processing system can execute the generative machine learning model and the generative machine learning model can output a text preview of an upcoming game session between two or more entities.

The data processing system can transmit the media content item to client devices associated with the future game session. For example, the data processing system can store a record of electronic accounts, client devices, or users that are associated with the entities of the future game session (e.g., family members, participants, or other viewers or stakeholders of the future game session). The record can include identifying information of the electronic accounts or client devices (e.g., email addresses, phone numbers, Internet Protocol (IP) addresses, etc.) that the data processing system can use to transmit messages to the respective electronic accounts or client devices. The data processing system can generate the media content item and transmit the generated media content item to the electronic accounts or client devices using the stored identifying information of the respective electronic accounts or client devices.

The data processing system can additionally or instead store the generated media content item in memory. The data processing system can store the generated media content item in the record for the future game session. In doing so, the data processing system may enable the media content item to be available to users of a platform provided by the data processing system. For example, users with permissions (e.g., users linked or associated with the entities of the future game session as described above) may access the media content item for the future game session (e.g., before or after the future game session occurs) to view the preview for the future game session.

Figure 10:
FIG. 10 depicts an example text summary for a game session preview generated by a system for automatic media generation, according to some implementations.

FIG. 10 depicts an example text summary 1000 for a game session preview generated by a system for automatic media generation, according to some implementations. The text summary 1000 can be generated by a data processing system (e.g., the automatic media generator 102). The text summary 1000 can include a preview of information for a future or upcoming game session between two entities (e.g., two teams), a first entity and a second entity. The first entity can be indicated by the name "Pears" in the text summary 1000 and the second entity can be indicated by the name "Oranges" in the text summary 1000. The data processing system can generate the text summary 1000 responsive to determining or detecting that the current time is within a threshold of a timestamp indicating the time (e.g., the start time or scheduled beginning) of the future game session between the first and second entities and/or responsive to receiving a request from a client device to generate the text summary 1000. The data processing system can generate the text summary from data that the data processing system retrieves from records for game sessions that occurred and involved one or both of the first entity and the second entity. The data processing system may compare the retrieved data to sets or subsets of criteria in unaggregated and/or aggregated form and/or that correspond to different types of text segments or portions or paragraphs of a template. The data processing system can identify satisfied criteria of each of the sets or subsets of criteria based on the comparison and select media segments that correspond with the satisfied criteria. The data processing system can populate the media segments and include the populated media segments in the text summary 1000. The data processing system can transmit the text summary 1000 to a client device. The client device can receive the text summary 1000 and display the text summary 1000. The text summary 1000 is an example of a media content item that the data processing system can generate. The data processing system can generate any type of media content item.

The data processing system can generate the text summary 1000 according to a template. The media content item template can include dynamic sections that each correspond to a different set or subset of criteria and static sections that include static text or strings of text. For example, the media content item template can include a title section 1002. The title section 1002 can be located at the top of the media content item template (e.g., above each other section of the media content item template). The title section 1002 can be a dynamic section that corresponds to a set or subset of criteria that can be satisfied by one or both of unaggregated or aggregated data from game sessions involving the first entity. For instance, the title section 1002 of the text summary 1000 can include the text string "Pears Takes Timely Hitting Into Game Against Oranges 16U." The data processing system can include this text string in the title section 1002 based on the aggregated data for the first entity indicating that the Pears have increased their batting percentage with runners on base or in scoring position.

The media content item template can include a game preview section 1004. The game preview section 1004 can be located below the title section 1002 in the media content item template and/or contain one or more text segments that preview the future game session with the second entity. The data processing system can select text segments to include in the game preview section 1004 based on the text segments corresponding to the same or at least partially the same satisfied criteria and/or data that satisfies the criteria. Doing so can allow the data processing system to cause the text summary 1000 to flow from the title section 1002 to the game preview section 1004.

The media content item template can include a previous game session section 1006. The previous game session section 1006 can be located below the game preview section 1004 in the media content item template and/or contain one or more text segments describing the most recent game session between the first entity and the second entity. The data processing system can select text segments to include in the previous game session section 1006 based on the text segments corresponding to criteria that is satisfied by data from the most recent game session between the first and second entities.

The media content item template can include a highlighted participant section 1008. The highlighted participant section 1008 can be located below the previous game session section 1006 in the media content item template and/or contain one or more text segments describing how a particular participant from the first entity has performed in one or more previous game sessions with the first entity. The data processing system can select text segments to include in the highlighted participant section 1008 based on the text segments corresponding to criteria that is satisfied by data involving the participant from the most recent game session and/or any number (e.g., any defined number) of previous game sessions of the first entity in which the participant was involved. The data processing system can generate the highlighted participant section 1008 using aggregated and/or unaggregated data of the participant between one or more game sessions.

The media content item template can include a first entity informational section 1010. The first entity informational section 1010 can be located below the highlighted participant section 1008 in the media content item template and/or contain one or more text segments describing data of the first entity. The data processing system can select text segments to include in the first entity informational section 1010 based on the text segments corresponding to criteria that are satisfied by data involving the first entity in one or more previous game sessions involving the first entity. The data processing system can determine the criteria is satisfied based on unaggregated and/or aggregated data of the first entity between one or more game sessions.

The media content item template can include a second entity informational section 1012. The second entity informational section 1012 can be located below the first entity informational section 1010 in the media content item template and/or contain one or more text segments describing data of the second entity. The data processing system can select text segments to include in the second entity informational section 1012 based on the text segments corresponding to criteria that is satisfied by data involving the second entity in one or more previous game sessions involving the second entity. The data processing system can determine the criteria is satisfied based on unaggregated and/or aggregated data of the second entity between one or more multiple game sessions.

The media content item template can include headers 1014, 1016, 1018, and 1020. The headers can be static headers that describe the sections below (e.g., directly below) the respective headers. The data processing system can include the headers 1014-1020 in the text summary 1000 by retrieving the text of the headers 1014-1020 and inserting the text into the text summary 1000 in their corresponding locations.

B. Computing Environment

Having discussed specific embodiments of the present solution, it may be helpful to describe aspects of the operating environment as well as associated system components (e.g., hardware elements) in connection with the methods and systems described herein.

Figure 11A:
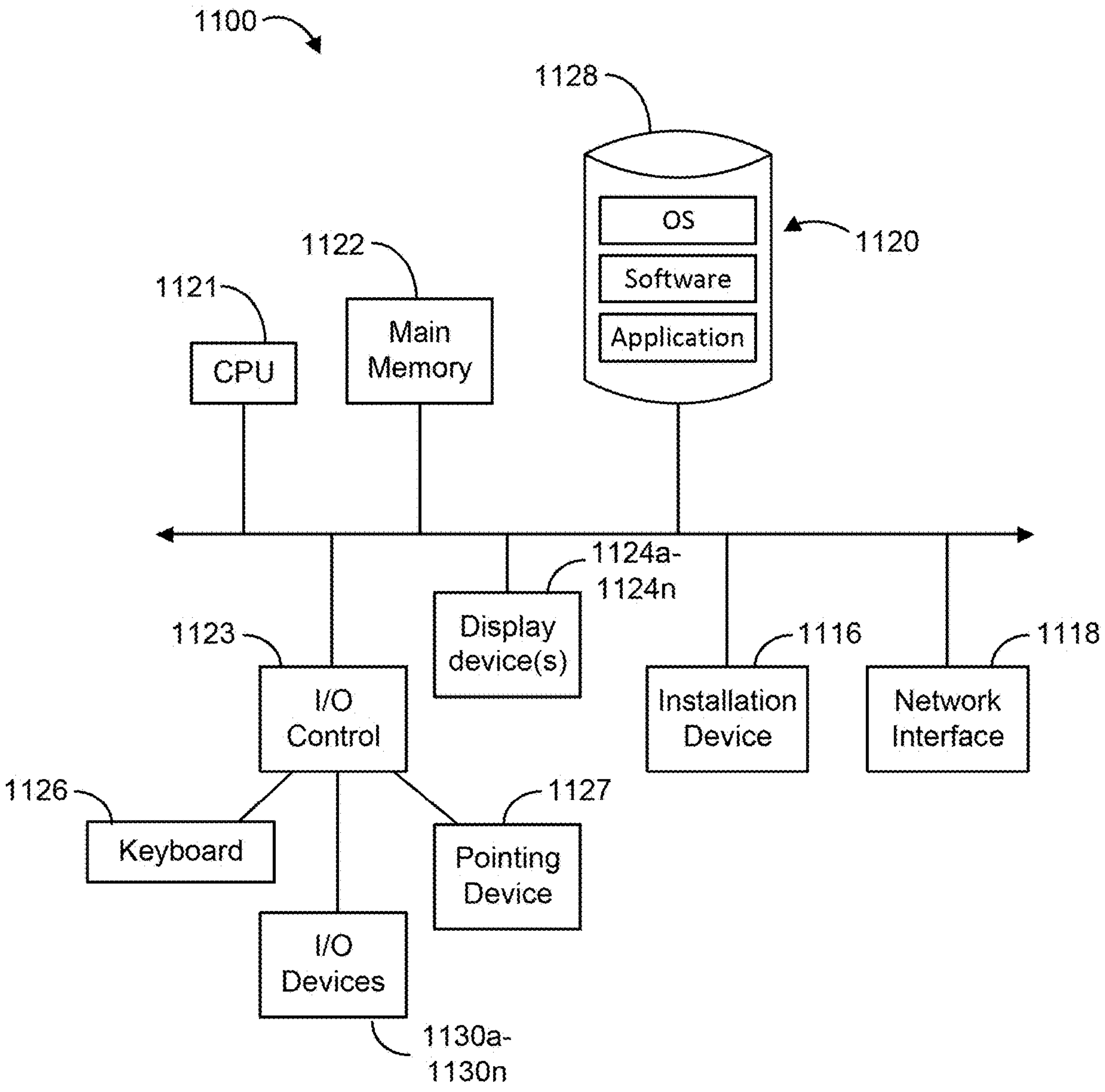
FIGS. 11A and 11B are block diagrams depicting embodiments of computing devices that can be used in connection with the methods and systems described herein.
Figure 11B:
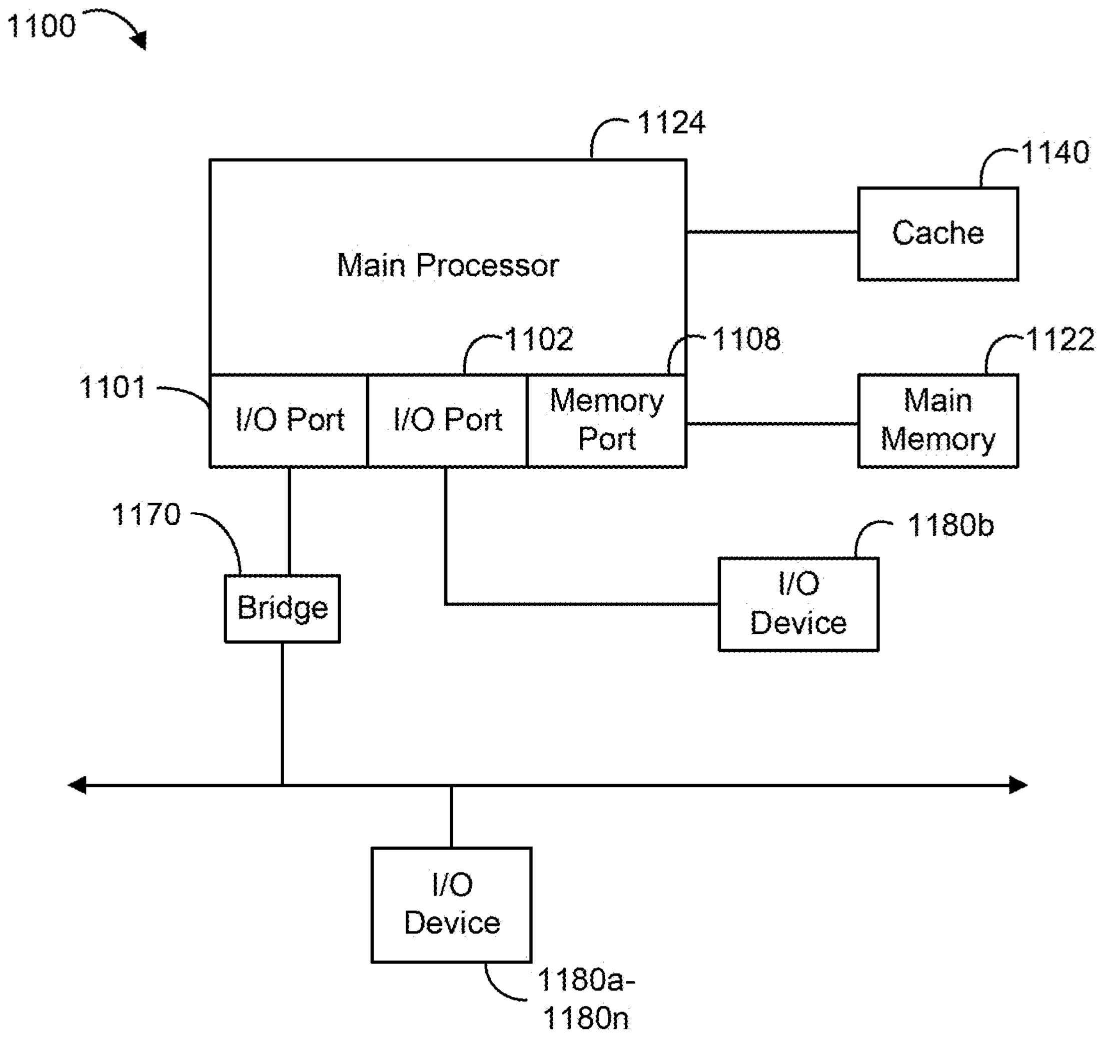

The systems discussed herein may be deployed as and/or executed on any type and form of computing device, such as a computer, network device or appliance capable of communicating on any type and form of network and performing the operations described herein. FIGS. 11A and 11B depict block diagrams of a computing device 1100 useful for practicing an embodiment of the systems and methods described herein. As shown in FIGS. 11A and 11B, each computing device 1100 includes a central processing unit 1121, and a main memory unit 1122. As shown in FIG. 11A, a computing device 1100 may include a storage device 1128, an installation device 1116, a network interface 1118, an I/O controller 1123, display devices 1124*a*-1124*n*, a keyboard 1126 and a pointing device 1127, such as a mouse. The storage device 1128 may include, without limitation, an operating system and/or software. As shown in FIG. 11B, each computing device 1100 may also include additional optional elements, such as a memory port 1103, a bridge 1170, one or more input/output devices 1130*a*-1130*n* (generally referred to using reference numeral 1130), and a cache memory 1140 in communication with the central processing unit 1121.

The central processing unit 1121 is any logic circuitry that responds to and processes instructions fetched from the main memory unit 1122. In many embodiments, the central processing unit 1121 is provided by a microprocessor unit, such as: those manufactured by Intel Corporation of Mountain View, California; those manufactured by International Business Machines of White Plains, New York; or those manufactured by Advanced Micro Devices of Sunnyvale, California. The computing device 1100 may be based on any of these processors, or any other processor capable of operating as described herein.

Main memory unit 1122 may be one or more memory chips capable of storing data and allowing any storage location to be directly accessed by the microprocessor 1121, such as any type or variant of Static random access memory (SRAM), Dynamic random access memory (DRAM), Ferroelectric RAM (FRAM), NAND Flash, NOR Flash and Solid State Drives (SSD). The main memory 1122 may be based on any of the above described memory chips, or any other available memory chips capable of operating as described herein. In the embodiment shown in FIG. 11A, the processor 1121 communicates with main memory 1122 via a system bus 1180 (described in more detail below). FIG. 11B depicts an embodiment of a computing device 1100 in which the processor communicates directly with main memory 1122 via a memory port 1103. For example, in FIG. 11B the main memory 1122 may be DRDRAM.

FIG. 11B depicts an embodiment in which the main processor 1121 communicates directly with cache memory 1140 via a secondary bus, sometimes referred to as a backside bus. In other embodiments, the main processor 1121 communicates with cache memory 1140 using the system bus 1180. Cache memory 1140 typically has a faster response time than main memory 1122 and is provided by, for example, SRAM, BSRAM, or EDRAM. In the embodiment shown in FIG. 11B, the processor 1121 communicates with various I/O devices 1130 via a local system bus 1180. Various buses may be used to connect the central processing unit 1121 to any of the I/O devices 1130, for example, a VESA VL bus, an ISA bus, an EISA bus, a MicroChannel Architecture (MCA) bus, a PCI bus, a PCI-X bus, a PCI-Express bus, or a NuBus. For embodiments in which the I/O device is a video display 1124, the processor 1121 may use an Advanced Graphics Port (AGP) to communicate with the display 1124. FIG. 11B depicts an embodiment of a computer 1100 in which the main processor 1121 may communicate directly with I/O device 1130*b*, for example via HYPERTRANSPORT, RAPIDIO, or INFINIBAND communications technology. FIG. 11B also depicts an embodiment in which local busses and direct communication are mixed: the processor 1121 communicates with I/O device 1130*a* using a local interconnect bus while communicating with I/O device 1130*b* directly.

A wide variety of I/O devices 1130*a*-1130*n* may be present in the computing device 1100. Input devices include keyboards, mice, trackpads, trackballs, microphones, dials, touch pads, touch screens, and drawing tablets. Output devices include video displays, speakers, inkjet printers, laser printers, projectors and dye-sublimation printers. The I/O devices may be controlled by an I/O controller 1123 as shown in FIG. 11A. The I/O controller may control one or more I/O devices such as a keyboard 1126 and a pointing device 1127, e.g., a mouse or optical pen. Furthermore, an I/O device may also provide storage and/or an installation device 1116 for the computing device 1100. In still other embodiments, the computing device 1100 may provide USB connections (not shown) to receive handheld USB storage devices such as the USB Flash Drive line of devices manufactured by Twintech Industry, Inc., of Los Alamitos, California.

Referring again to FIG. 11A, the computing device 1100 may support any suitable installation device 1116, such as a disk drive, a CD-ROM drive, a CD-R/RW drive, a DVD-ROM drive, a flash memory drive, tape drives of various formats, USB device, hard-drive, a network interface, or any other device suitable for installing software and programs. The computing device 1100 may further include a storage device, such as one or more hard disk drives or redundant arrays of independent disks, for storing an operating system and other related software, and for storing application software programs such as any program or software 1120 for implementing (e.g., configured and/or designed for) the systems and methods described herein. Optionally, any of the installation devices 1116 could also be used as the storage device. Additionally, the operating system and the software can be run from a bootable medium.

Furthermore, the computing device 1100 may include a network interface 1118 to interface to a network through a variety of connections including, but not limited to, standard telephone lines, LAN or WAN links (e.g., 802.11, T1, T3, 56 kb, X.25, SNA, DECNET), broadband connections (e.g., ISDN, Frame Relay, ATM, Gigabit Ethernet, Ethernet-over-SONET), wireless connections, or some combination of any or all of the above. Connections can be established using a variety of communication protocols (e.g., TCP/IP, IPX, SPX, NetBIOS, Ethernet, ARCNET, SONET, SDH, Fiber Distributed Data Interface (FDDI), RS232, IEEE 802.11, IEEE 802.11a, IEEE 802.11b, IEEE 802.11g, IEEE 802.11n, IEEE 802.11ac, IEEE 802.11ad, CDMA, GSM, WiMax and direct asynchronous connections). In one embodiment, the computing device 1100 communicates with other computing devices 1100' via any type and/or form of gateway or tunneling protocol such as Secure Socket Layer (SSL) or Transport Layer Security (TLS). The network interface 1118 may include a built-in network adapter, network interface card, PCMCIA network card, card bus network adapter, wireless network adapter, USB network adapter, modem or any other device suitable for interfacing the computing device 1100 to any type of network capable of communication and performing the operations described herein.

In some implementations, the computing device 1100 may include or be connected to one or more display devices 1124*a*-1124*n*. As such, any of the I/O devices 1130*a*-1130*n* and/or the I/O controller 1123 may include any type and/or form of suitable hardware, software, or combination of hardware and software to support, enable or provide for the connection and use of the display device(s) 1124*a*-1124*n* by the computing device 1100. For example, the computing device 1100 may include any type and/or form of video adapter, video card, driver, and/or library to interface, communicate, connect or otherwise use the display device(s) 1124*a*-1124*n*. In one embodiment, a video adapter may include multiple connectors to interface to the display device(s) 1124*a*-1124*n*. In other embodiments, the computing device 1100 may include multiple video adapters, with each video adapter connected to the display device(s) 1124*a*-1124*n*. In some implementations, any portion of the operating system of the computing device 1100 may be configured for using multiple displays 1124*a*-1124*n*. One ordinarily skilled in the art will recognize and appreciate the various ways and embodiments that a computing device 1100 may be configured to have one or more display devices 1124*a*-1124*n*.

In further embodiments, an I/O device 1130 may be a bridge between the system bus 1180 and an external communication bus, such as a USB bus, an Apple Desktop Bus, an RS-232 serial connection, a SCSI bus, a Fire Wire bus, a Fire Wire 500 bus, an Ethernet bus, an AppleTalk bus, a Gigabit Ethernet bus, an Asynchronous Transfer Mode bus, a FibreChannel bus, a Serial Attached small computer system interface bus, a USB connection, or a HDMI bus.

A computing device 1100 of the sort depicted in FIGS. 11A and 11B may operate under the control of an operating system, which control scheduling of tasks and access to system resources. The computing device 1100 can be running any operating system, such as any of the versions of the MICROSOFT WINDOWS operating systems, the different releases of the Unix and Linux operating systems, any version of the MAC OS for Macintosh computers, any embedded operating system, any real-time operating system, any open source operating system, any proprietary operating system, any operating systems for mobile computing devices, or any other operating system capable of running on the computing device and performing the operations described herein. Typical operating systems include, but are not limited to, Android, produced by Google Inc.; WINDOWS 7 and 8, produced by Microsoft Corporation of Redmond, Washington; MAC OS, produced by Apple Computer of Cupertino, California; WebOS, produced by Research In Motion (RIM); OS/2, produced by International Business Machines of Armonk, New York; and Linux, a freely-available operating system distributed by Caldera Corp. of Salt Lake City, Utah, or any type and/or form of a Unix operating system, among others.

The computer system 1100 can be any workstation, telephone, desktop computer, laptop or notebook computer, server, handheld computer, mobile telephone or other portable telecommunications device, media playing device, a gaming system, mobile computing device, or any other type and/or form of computing, telecommunications or media device that is capable of communication. The computer system 1100 has sufficient processor power and memory capacity to perform the operations described herein.

In some implementations, the computing device 1100 may have different processors, operating systems, and input devices consistent with the device. For example, in one embodiment, the computing device 1100 is a smart phone, mobile device, tablet or personal digital assistant. In still other embodiments, the computing device 1100 is an Android-based mobile device, an iPhone smart phone manufactured by Apple Computer of Cupertino, California, or a Blackberry or WebOS-based handheld device or smart phone, such as the devices manufactured by Research In Motion Limited. Moreover, the computing device 1100 can be any workstation, desktop computer, laptop or notebook computer, server, handheld computer, mobile telephone, any other computer, or other form of computing or telecommunications device that is capable of communication and that has sufficient processor power and memory capacity to perform the operations described herein.

Although the disclosure may reference one or more “users”, such “users” may refer to user-associated devices or stations (STAs), for example, consistent with the terms “user” and “multi-user” typically used in the context of a multi-user multiple-input and multiple-output (MU-MIMO) environment.

Although examples of communications systems described above may include devices operating according to an 802.11 standard, it should be understood that embodiments of the systems and methods described can operate according to other standards and use wireless communications devices other than devices configured as devices and APs. For example, multiple-unit communication interfaces with cellular networks, satellite communications, vehicle communication networks, and other non-802.11 wireless networks can utilize the systems and methods described herein to achieve improved overall capacity and/or link quality without departing from the scope of the systems and methods described herein.

It should be noted that certain passages of this disclosure may reference terms such as “first” and “second” in connection with devices, mode of operation, transmit chains, antennas, etc., for purposes of identifying or differentiating one from another or from others. These terms are not intended to merely relate entities (e.g., a first device and a second device) temporally or according to a sequence, although in some cases, these entities may include such a relationship. Nor do these terms limit the number of possible entities (e.g., devices) that may operate within a system or environment.

It should be understood that the systems described above may provide multiple ones of any or each of those components and these components may be provided on either a standalone machine or, in some implementations, on multiple machines in a distributed system. In addition, the systems and methods described above may be provided as one or more computer-readable programs or executable instructions embodied on or in one or more articles of manufacture. The article of manufacture may be a floppy disk, a hard disk, a CD-ROM, a flash memory card, a PROM, a RAM, a ROM, or a magnetic tape. In general, the computer-readable programs may be implemented in any programming language, such as LISP, PERL, C, C++, C #, PROLOG, Python, Ruby, Go, Rust, Swift, Kotlin, or in any byte code language such as JAVA. The software programs or executable instructions may be stored on or in one or more articles of manufacture as object code.

While the foregoing written description of the methods and systems enables one of ordinary skill to make and use what is considered presently to be the best mode thereof, those of ordinary skill will understand and appreciate the existence of variations, combinations, and equivalents of the specific embodiment, method, and examples herein. The present methods and systems should therefore not be limited by the above-described embodiments, methods, and examples, but by all embodiments and methods within the scope and spirit of the disclosure.

What is claimed is:

1. One or more non-transitory computer-readable media for automatic media generation for game sessions, the non-transitory computer readable media comprising instructions which, when executed by one or more processors, causes the one or more processors to:

store one or more identifications of a plurality of game sessions, data corresponding to one or more events of the plurality of game sessions, and a plurality of timestamps indicating when the plurality of game sessions occurred or are scheduled to occur;

determine a future game session of the plurality of game sessions scheduled to occur at time subsequent to a current time, the future game session between a first entity and a second entity;

query memory based on an identifier of the first entity;

retrieve data for a set of historical game sessions involving the first entity based on the query;

aggregate data generated for a second plurality of game sessions of the set of historical game sessions;

determine one or more criteria of a set of criteria are satisfied based at least on the retrieved data for the set of historical game sessions involving the first entity, wherein different criteria of the set of criteria correspond to different text segments, and wherein the set of criteria comprises a plurality of subsets of criteria each corresponding to a different section of a media content item template;

select and/or generate one or more text segments based on the satisfied one or more criteria; and generate a media content item for the future game session with the selected and/or generated one or more text segments according to the media content item template by:

generating a first set of text segments of the one or more text segments based only on the retrieved data for a previous game session between the first entity and the second entity;

generating a second set of text segments of the one or more text segments based only on the aggregated data generated for a second plurality of game sessions associated with the first entity; and inserting the first set of text segments in a first section of the media content item and the second set of text segments in a second section of the media content item.

2. The one or more non-transitory computer-readable media of claim 1, wherein execution of the instructions further causes the one or more processors to:

retrieve a media content item previously generated for a game session involving the first entity based on the query; and identify a participant that was identified in the previously generated media content item, wherein the instructions cause the one or more processors to select the one or more text segments by selecting the one or more text segments based at least on the identification of the participant that was identified in the previously generated media content item.

3. The one or more non-transitory computer-readable media of claim 2, wherein execution of the instructions causes the one or more processors to select the one or more text segments by selecting the one or more text segments based at least on the one or more text segments not identifying the identified participant.

4. The one or more non-transitory computer-readable media of claim 1, wherein execution of the instructions causes the one or more processors to generate the text by:

separating the first set of text segments from the second set of text segments with a text header corresponding to the second set of text segments.

5. The one or more non-transitory computer-readable media of claim 1, wherein execution of the instructions causes the one or more processors to generate the text by generating a title separate from the first set of text segments and the second set of text segments identifying the first entity and based on the aggregated data.

6. The one or more non-transitory computer-readable media of claim 1, wherein execution of the instructions further causes the one or more processors to:

select the one or more text segments based on each of the one or more text segments corresponding to a satisfied criterion of the set of satisfied criteria with a stored association in memory.

7. The one or more non-transitory computer-readable media of claim 1, wherein execution of the instructions causes the one or more processors to:

identify the set of criteria for selecting a set of text segments based on one or more characteristics of individuals participating in the future game session.

8. A method for automatic media generation for game sessions, comprising:

storing, by one or more processors, one or more identifications of a plurality of game sessions, data corresponding to one or more events of the plurality of game sessions, and a plurality of timestamps indicating when the plurality of game sessions occurred or are scheduled to occur;

determining, by the one or more processors, a future game session of the plurality of game sessions scheduled to occur at time subsequent to a current time, the future game session between a first entity and a second entity;

querying, by the one or more processors, memory based on an identifier of the first entity;

retrieving, by the one or more processors, data for a set of historical game sessions involving the first entity based on the query;

aggregating, by the one or more processors, data generated for a second plurality of game sessions of the set of historical game sessions;

determining, by the one or more processors, one or more criteria of a set of criteria are satisfied based at least on the retrieved data for the set of historical game sessions involving the first entity, wherein different criteria of the set of criteria correspond to different text segments, and wherein the set of criteria comprises a plurality of subsets of criteria each corresponding to a different section of a media content item;

selecting and/or generating, by the one or more processors, one or more text segments based on the satisfied one or more criteria; and generating, by the one or more processors, a media content item for the future game session with the selected and/or generated one or more text segments by:

generating, by the one or more processors, a first set of text segments of the one or more text segments based only on the retrieved data for a previous game session between the first entity and the second entity;

generating, by the one or more processors, a second set of text segments of the one or more text segments based only on the aggregated data generated for a second plurality of game sessions associated with the first entity; and inserting, by the one or more processors, the first set of text segments in a first section of the media content item and the second set of text segments in a second section of the media content item.

9. The method of claim 8, wherein execution of the instructions further causes the one or more processors to:

retrieving, by the one or more processors, a media content item previously generated for a game session involving the first entity based on the query; and identifying, by the one or more processors, a participant that was identified in the previously generated media content item, wherein selecting the one or more text segments comprises selecting, by the one or more processors, the one or more text segments based at least on the identification of the participant that was identified in the previously generated media content item.

10. The method of claim 9, wherein selecting the one or more text segments comprises selecting, by the one or more processors, the one or more text segments based at least on the one or more text segments not identifying the identified participant.

11. A system for automatic media generation for game sessions, comprising:

one or more processors coupled to one or more computer-readable storage media, the one or more processors configured to execute instructions stored on the one or more computer-readable storage media to:

store one or more identifications of a plurality of game sessions, data corresponding to one or more events of the plurality of game sessions, and a plurality of timestamps indicating when the plurality of game sessions occurred or are scheduled to occur;

determine a future game session of the plurality of game sessions scheduled to occur at time subsequent to the current time, the future game session between a first entity and a second entity;

query memory based on an identifier of the first entity;

retrieve data for a set of historical game sessions involving the first entity based on the query;

aggregate data generated for a second plurality of game sessions of the set of historical game sessions;

determine, based on one or more characteristics of the first entity or the second entity, a set of criteria for selecting a set of text segments, wherein different criteria of the set of criteria correspond to different text segments, and wherein the set of criteria comprises a plurality of subsets of criteria each corresponding to a different section of a media content item template;

determine one or more criteria of the set of criteria are satisfied based at least on the retrieved data for the set of historical game sessions involving the first entity;

select and/or generate one or more text segments based on the satisfied one or more criteria; and generate a media content item for the future game session with the selected and/or generated one or more text segments by:

generating a first set of text segments of the one or more text segments based only on the retrieved data for a previous game session between the first entity and the second entity;

generating a second set of text segments of the one or more text segments based only on the aggregated data generated for a second plurality of game sessions associated with the first entity; and inserting the first set of text segments in a first section of the media content item and the second set of text segments in a second section of the media content item.

* * * * *